United States Patent [19]
Habara et al.

[11] Patent Number: 6,055,124
[45] Date of Patent: Apr. 25, 2000

[54] RECORDING AND/OR PLAYBACK APPARATUS AND RECORDING MEDIUM RECORDING AND/OR PLAYBACK APPARATUS

[75] Inventors: Yasuhiro Habara, Kanagawa; Tadami Nakamura, Saitama; Kazuhito Kurita, Kanagawa, all of Japan

[73] Assignee: Sony Corporation, Tokyo, Japan

[21] Appl. No.: 09/103,600

[22] Filed: Jun. 24, 1998

[30] Foreign Application Priority Data

Jun. 30, 1997 [JP] Japan .................................... 9-174605
Jun. 30, 1997 [JP] Japan .................................... 9-174614

[51] Int. Cl.[7] ............................ G11B 5/016; G11B 33/02
[52] U.S. Cl. ....................................... 360/99.02; 369/77.2
[58] Field of Search .............................. 360/97.02, 97.03, 360/97.04, 99.02, 96.5, 96.6; 369/77.2, 75.1

[56] References Cited

U.S. PATENT DOCUMENTS

| 4,948,182 | 8/1990 | Ishikawa | 292/30 |
| 5,898,536 | 4/1999 | Won | 360/96.5 |

*Primary Examiner*—David D. Davis
*Attorney, Agent, or Firm*—Limbach & Limbach L.L.P.

[57] ABSTRACT

A recording and/or playback apparatus using a disc cartridge that accommodates a disc-shaped recording medium has an apparatus main body, a loading mechanism, a lock mechanism, and a lid body. The apparatus main body has a recording and/or playback section for performing recording and/or playback on a disc that is accommodated in the disc cartridge, and an opening portion through which the disc cartridge is to be inserted into and ejected from the apparatus main body. The loading mechanism mounts the disc accommodated in the disc cartridge that has been inserted through the opening portion on the recording and/or playback section, and ejects, through the opening portion, the disc that is mounted on the recording and/or playback section and accommodated in the disc cartridge. The lid body, which opens or closes the opening portion, is rotatably provided on the apparatus main body. The lock mechanism locks the lid body at a position for closing the opening portion. Specifically, the lock mechanism locks the lid body at the position for closing the opening portion in a state that the disc accommodated in the disc cartridge has been mounted on the recording and/or playback section by the loading mechanism. When the disc cartridge is ejected through the opening portion, the lid body is turned in a direction of opening the opening portion by the disc cartridge being ejection-operated by the loading mechanism, and then moved further in the direction of opening the opening portion by the lock mechanism.

14 Claims, 52 Drawing Sheets

210

210

210

RECORDING AND/OR PLAYBACK APPARATUS AND RECORDING MEDIUM RECORDING AND/OR PLAYBACK APPARATUS

BACKGROUND

1. Field of the Invention

The present invention relates to a recording/playback apparatus and a recording medium recording and/or playback apparatus. More specifically, the invention relates to a recording/playback apparatus and a recording medium recording and/or playback apparatus having a lid body for opening and closing an opening portion.

2. Background of the Invention

For example, there is a recording/playback apparatus which performs recording/playback on an optical disc that is an example of a disc-shaped recording medium on which recording or playback or both of them are performed. And there is a version of the recording/playback apparatus in which a cover body is supported by a chassis so as to be openable and closable in a state that the cover body is urged by rotational force in a direction from an open position to a closed position. In this type of recording/playback apparatus, a disc cartridge accommodating an optical disc is inserted into the chassis in such a manner that at the time of the insertion the front surface of the cover body is pressed and thereby the cover body is turned toward the open position.

However, in the above recording/playback apparatus, since the cover body can always be turned irrespective of whether a disc cartridge exists in the chassis, there is a possibility that another disc cartridge is inserted even in a state that the optical disc of a disc cartridge is already mounted on a turn table of a mounting portion that is provided inside the apparatus.

For example, there is known a recording/playback apparatus which prevents the above-mentioned erroneous insertion by automatically placing, in the vicinity of an insertion/removal mouth, a preventive plate for preventing insertion of another disc cartridge through the insertion/removal mouth in a state that one disc cartridge or an optical disc is already mounted. However, the apparatus that prevents erroneous insertion by means of the preventive plate needs a mechanism for moving the preventive plate inside the chassis, and hence its size is increased. In particular, if such a mechanism is used in a portable recording/playback apparatus, the portability of the apparatus is impaired by its increase in size.

The above-mentioned rotational force for urging the cover body toward the closed position is produced by, for instance, a tension coiled spring that is tensely provided between the cover body and the chassis. To allow smooth insertion of a disc cartridge into the chassis, the resilient force of the tension coiled spring is set relatively weak. Therefore, particularly in a portable recording/playback apparatus, the cover body clatters due to vibration or the like that occurs during use of the apparatus, causing problems that a user may feel a sense of incongruity while using the apparatus and it may be a source of noise.

In a conventional method in which the cover body is turned by using a disc cartridge in ejecting it through the insertion/removal mouth, the weight of the cover body and the force of pressing the cover body toward the closed position are exerted on a holder via the disc cartridge. Therefore, a heavy load is imposed on the disc cartridge during an ejecting operation.

Therefore, for example, where ejection is effected by manipulating an ejection knob that is slidably provided at the side of the apparatus, it is necessary to manipulate the ejection knob with strong force, which causes a heavy load on the finger. Where ejection is effected by moving the holder with a motor, large motor torque is needed, which causes, for instance, a problem that the size of the motor is increased.

In a conventional method in which the cover body is turned by using a slide lever that is moved in link with an ejection knob during a disc cartridge ejecting operation, a slide lever needs to be moved over a distance corresponding to the rotation amount of the cover body from the closed position to the open position. Since a space for the above movement distance needs to be secured in the recording/playback apparatus, the size of the recording/playback apparatus is increased accordingly.

SUMMARY OF THE INVENTION

An object of the present invention is therefore to provide a recording and/or playback apparatus of a recording medium which resolves the above-mentioned problems.

Another object of the invention is therefore to provide a recording and/or playback apparatus which resolves the above-mentioned problems.

The invention provides a recording and/or playback apparatus of a recording medium, including an apparatus main body, a loading mechanism, a lid body, and a lock mechanism. The apparatus main body has a recording and/or playback section for performing recording and/or playback on a recording medium, and an opening portion through which the recording medium is to be inserted into and ejected from the apparatus main body. The loading mechanism mounts the recording medium that has been inserted through the opening portion on the recording and/or playback section, and ejects the recording medium mounted on the recording and/or playback section through the opening portion. The lid body, which opens or closes the opening portion, is movably provided on the apparatus main body. The lock mechanism locks the lid body at a closing position for closing the opening portion. When the recording medium is ejected through the opening portion, the lid body is moved in a direction of opening the opening portion by the recording medium being ejection-operated by the loading mechanism, and then moved further in the direction of opening the opening portion by the lock mechanism.

The invention also provides a recording and/or playback apparatus using a disc cartridge that accommodates a disc-shaped recording medium. The apparatus includes an apparatus main body, a loading mechanism, a lock mechanism, and a lid body. The apparatus main body has a recording and/or playback section for performing recording and/or playback on a disc that is accommodated in the disc cartridge, and an opening portion through which the disc cartridge is to be inserted into and ejected from the apparatus main body. The loading mechanism mounts the disc accommodated in the disc cartridge that has been inserted through the opening portion on the recording and/or playback section, and ejects, through the opening portion, the disc that is mounted on the recording and/or playback section and accommodated in the disc cartridge. The lid body, which opens or closes the opening portion, is rotatably provided on the apparatus main body. The lock mechanism locks the lid body at a position for closing the opening portion. Specifically, the lock mechanism locks the lid body at the position for closing the opening portion in a state that the disc accommodated in the disc cartridge has been mounted on the recording and/or playback section by the loading mechanism. When the disc cartridge is ejected through the opening portion, the lid body is turned in a direction of opening the opening portion by the disc cartridge being ejection-operated by the loading mechanism, and then moved further in the direction of opening the opening portion by the lock mechanism.

DETAILED DESCRIPTION OF THE PREFERRED EMBODIMENT

A disc recording and/or playback apparatus according to the present invention will be hereinafter described in detail with reference to the accompanying drawings. A disc playback apparatus that uses a disc cartridge accommodating an optical disc of about 64 mm in diameter will be described below as an example of the disc recording and/or playback apparatus. The optical disc accommodated in the disc cartridge is an optical disc dedicated to playback such as what is called a compact disc or a recordable optical disc such as a magneto-optical disc.

First, the appearance of a disc recording/playback apparatus 1 will be described.

Figure 1:
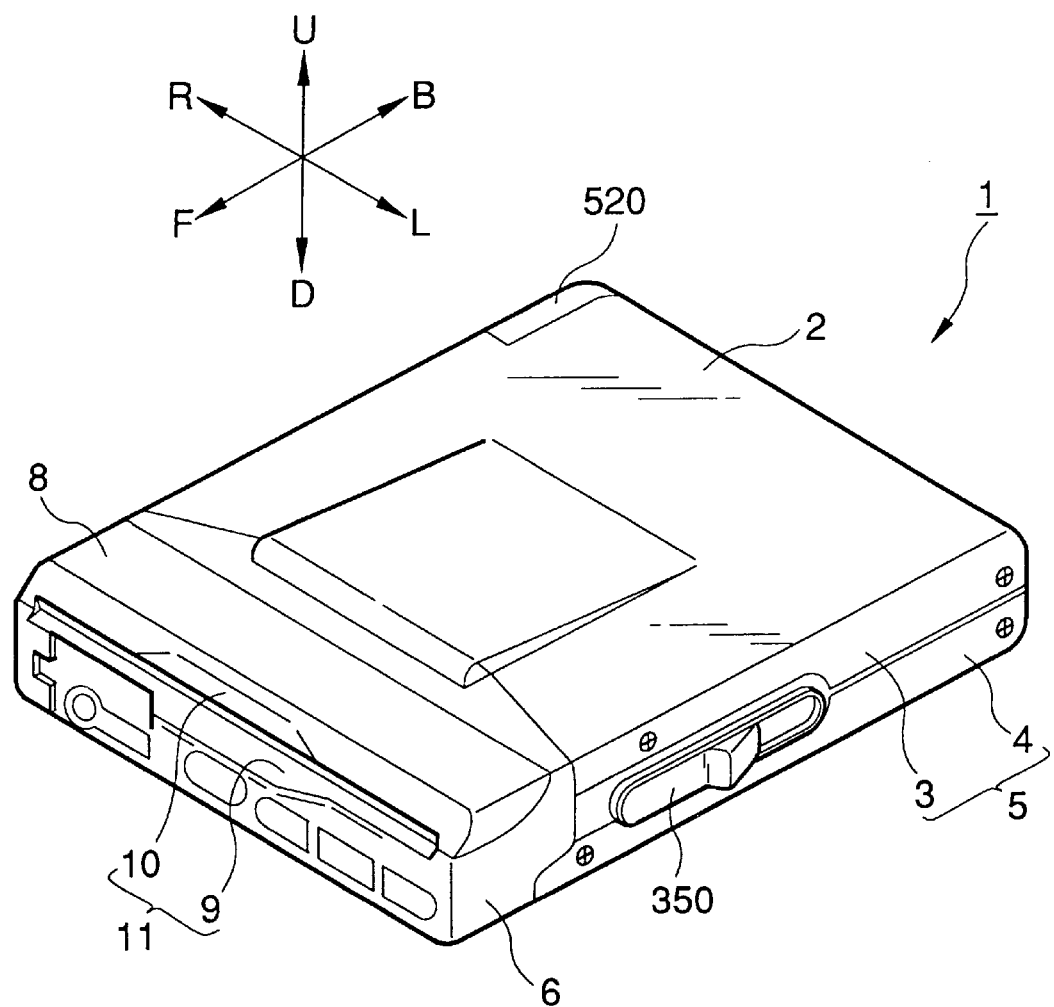
FIG. 1 is a perspective view showing an appearance of a disc playback apparatus according to an embodiment of the present invention in a state that a disc cartridge insertion/removal opening is closed.
Figure 3:
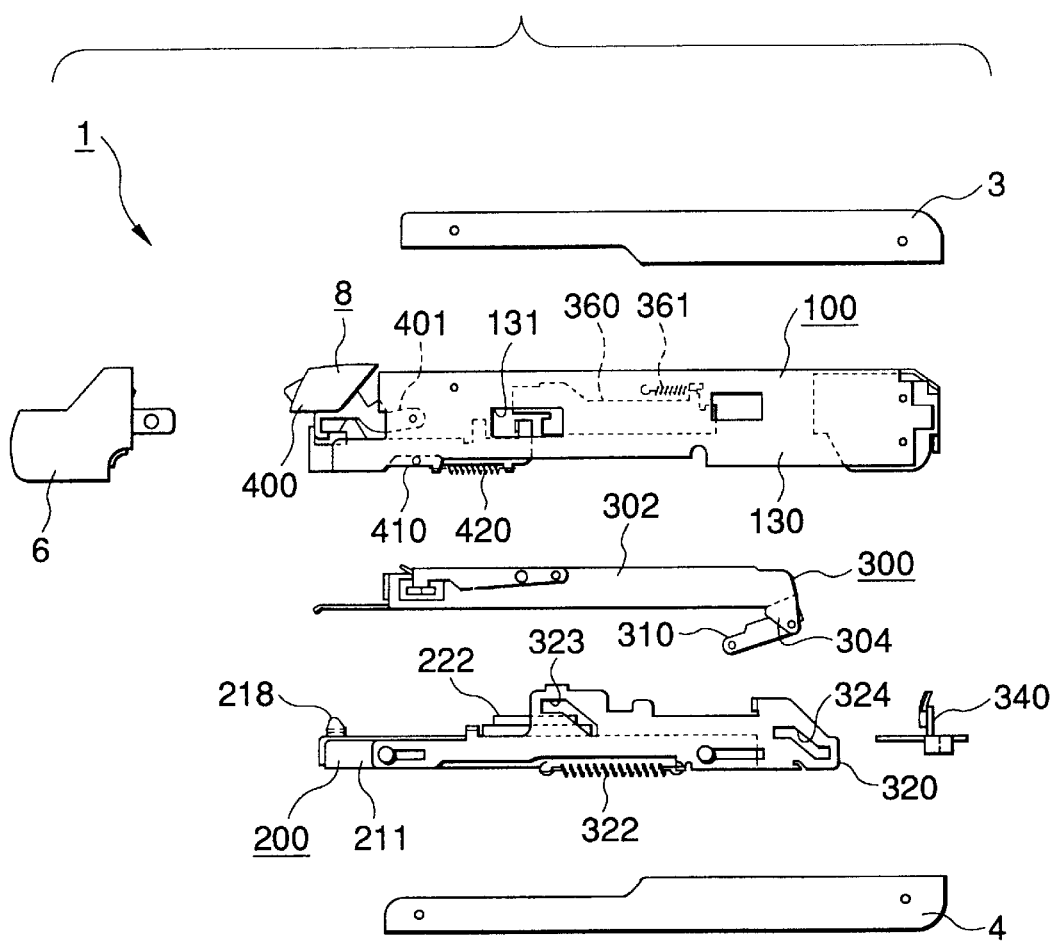
FIG. 3 is an exploded side view of the disc playback apparatus.

An outer chassis 2 of the apparatus 1 is provided with two case bodies, that is, a top case body 3 and a bottom case body 4 as shown in FIG. 3, and an outer chassis main body 5 having an open front end is formed by combining the case bodies 3 and 4 together. As shown in FIG. 1, a front case body 6 is provided at the front end of the outer chassis main body 5, whereby the outer chassis 2 is formed in which a top one-third portion of the front surface and a front end portion of the top surface are opened.

Figure 2:
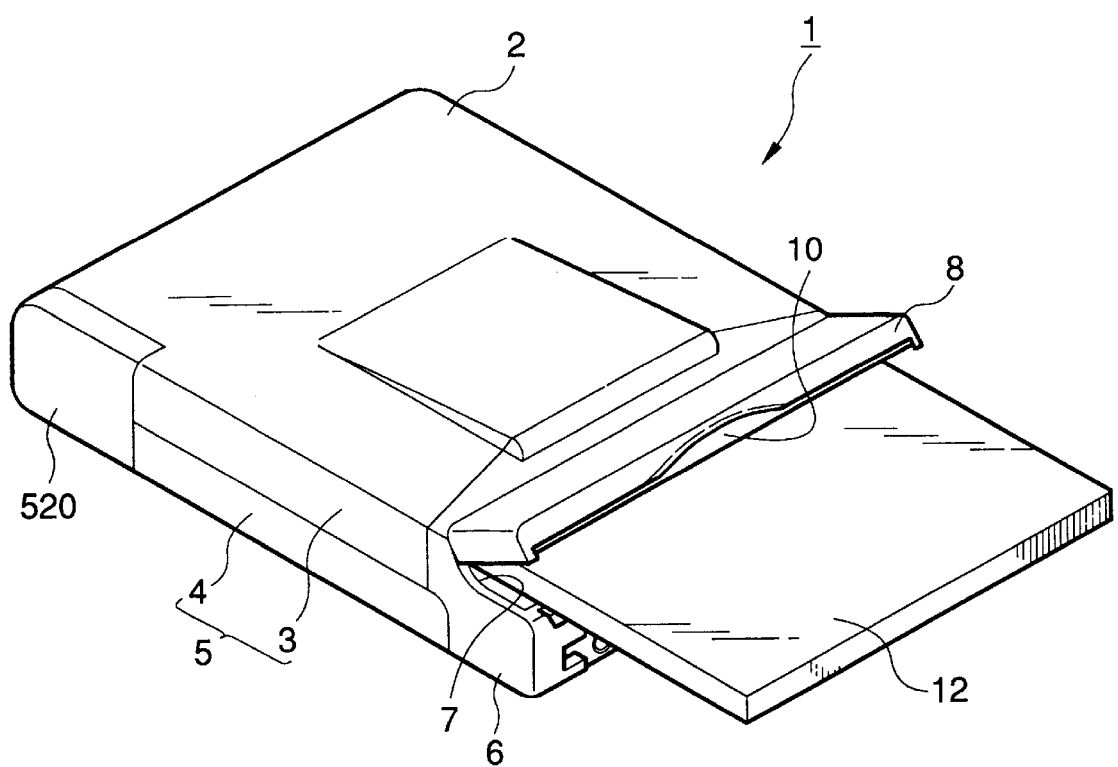
FIG. 2 is a general perspective view showing an appearance of the disc playback apparatus in a state that the disc cartridge insertion/removal opening is opened.

A cover body 8 is rotatably provided which opens and closes an opening 7 that is formed in the front end portion of the outer chassis 2 and serves as a disc cartridge insertion/removal mouth. The cover body 8 is turned between a closed position for closing the opening 7 as shown in FIG. 1 and an open position for opening it as shown in FIG. 2. As described later, the cover body 8 is resiliently urged toward the closed position.

A top-front face 9 of the front case body 6, that is, the bottom opening periphery of the opening 7 is a slant face that goes down toward the front side, and a bottom face 10 of the cover body 8 is a slant face that goes up toward the front side. As a result, an insertion recess 11 that is opened to the front side so as to assume approximately a V-shape is formed in a state that the cover body 8 is located at the closed position.

A disc cartridge 12 as mentioned above that accommodates an optical disc is mounted in the following manner.

The insertion tip of the disc cartridge 12 is caused to butt against the insertion recess 11 and inserted into it, and then the disc cartridge 12 is pushed into the apparatus 1. As a result, the slant face of the cover body 8 is pushed by the pushing force, whereby rotational force for turning the cover body 8 toward the open position acts on the cover body 8. As a result, the cover body 8 is turned as shown in FIG. 2, the opening 7 is opened, and the disc cartridge 12 is inserted into the apparatus 1. After the disc cartridge 12 has been inserted in the apparatus 1 almost entirely, it is pulled in automatically, the cover body 8 is turned to the closed position, and the disc cartridge 12 is mounted at a predetermined mounting position in the apparatus 1.

A main chassis 100 is provided in the outer chassis 2, and a mechanics chassis 200 is supported by the main chassis 100 in a floated manner.

Figure 4:
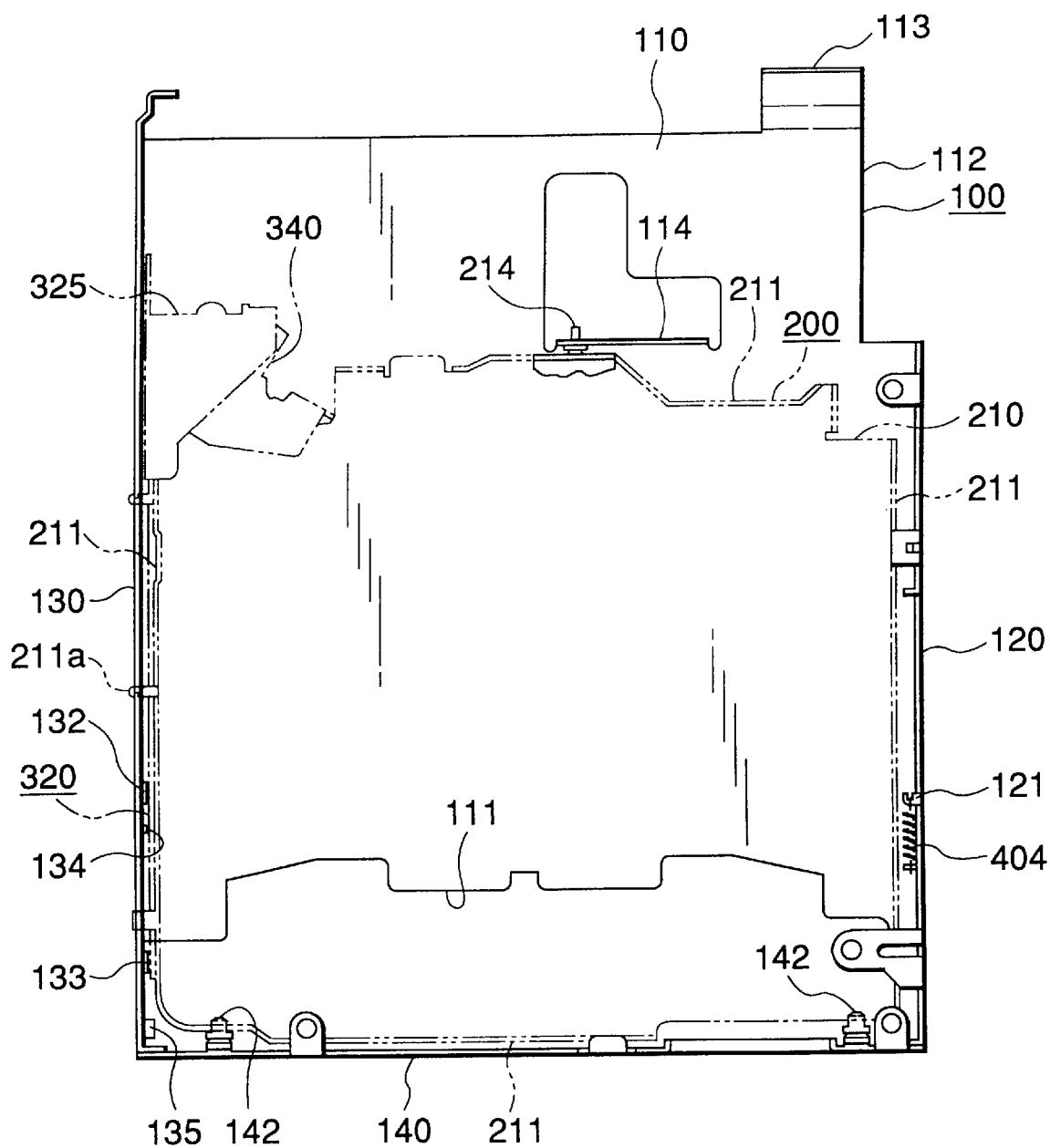
FIG. 4 is a bottom view showing a state that a mechanics chassis and a main chassis are combined with each other.

As shown in FIG. 4, the main chassis 100 is formed by bending a sheet metal material, and is integrally composed of a top plate portion 110, a right side plate portion 120 that erects downward from the right periphery of the top plate portion 110, a left side plate portion 130 that erects downward from the left periphery of the top plate portion 110. Approximately a top half portion of a front end portion of each of the right side plate portion 120 and the left side plate portion 130 of the main chassis 100 and a front end portion of the top plate portion 110 are cut out, and a front plate portion 140 bridges the front ends of the right side plate portion 120 and the left side plate portion 130. In this manner, an opening portion 111 that is opened to the top and front sides is formed in a front end portion of the main chassis 100. A cut 112 is formed in a rear end portion of the right periphery of the top plate portion 110, and the right side plate portion 120 reaches the front periphery of the cut 112. A fixing piece 113 erects downward from the rear periphery of the top plate portion 110 approximately perpendicularly thereto at a right end position.

Figure 5:
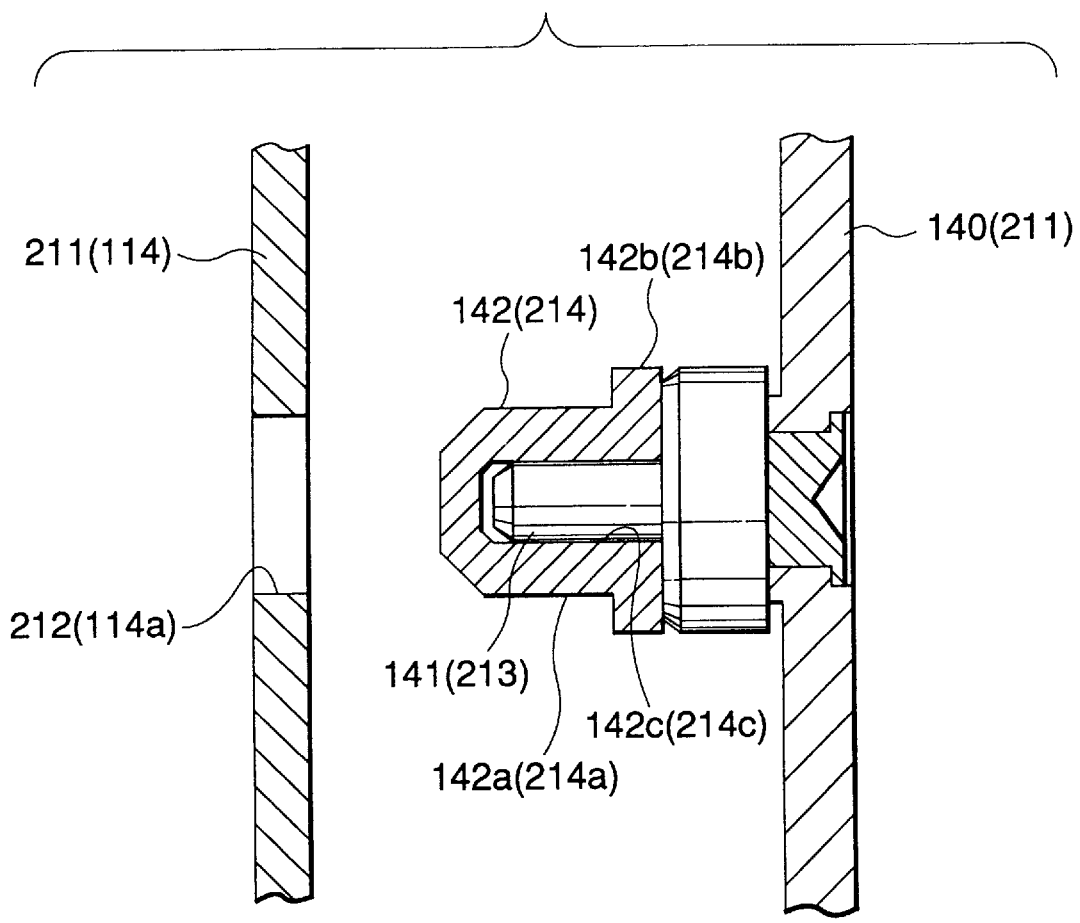
FIG. 5 is an enlarged sectional view showing a damper member and a support hole for supporting it.

A support piece 114 erects downward from the top plate portion 110 approximately perpendicularly thereto at a position close to the rear end and slightly deviated to the right from the center of the top plate portion 110. A support hole 114a is formed in the support piece 114 as shown in FIG. 5.

Two support shafts 141 projecting backward are fixed to the front plate portion 140 at positions close to the left and right ends, respectively. As shown in FIG. 5, two damper members 142 made of an elastic material such as butyl rubber are fitted to the respective support shafts 141 so as to cover their tip portions. As shown in FIG. 5, each damper member 142 is integrally composed of a main portion 142a having an external shape like a long and narrow cone and serving as a portion to be supported and a flange portion 142b projecting from the bottom outer circumferential surface of the main portion 142a and serving as a resilient contact portion. The damper member 142 has a hole 142c that is open on the bottom side. The damper member 142 covers the corresponding support shaft 141 in such a manner that the support shaft 141 is weakly press-fitted into the hole 142c.

The mechanics chassis 200 is also formed by bending a sheet metal material. Bent flanges 211 are bent downward from the four peripheries of a main plate portion 210 at several locations. As shown in FIG. 5, two circular support holes 212 are formed in the two front bent flanges 211 at positions close to the left and right peripheries, respectively, in the same manner as in the main chassis 100. A support shaft 213 projects backward from the rear bent flange 211 at a position slightly deviated to the right from the center.

A damper member 214 similar to the damper member 142 is fitted to the support shaft 213 so as to cover its tip portion. The damper member 214 is made of an elastic material such as butyl rubber, and is integrally composed of a main portion 214a having an external shape like a long and narrow cone and serving as a portion to be supported and a flange portion 214b projecting from the bottom outer circumferential surface of the main portion 214a and serving as a resilient contact portion. The damper member 214 has a hole 214c that is open on the bottom side. The damper member 214 covers the support shaft 213 in such a manner that the support shaft 213 is weakly press-fitted into the hole 214c.

The main portions 142a of the damper portions 142 that are provided on the main chassis 100 are fitted into the support holes 212 of the mechanics chassis 200 until the flange portions 142b butt against the bent flanges 211, respectively. Further, the main portion 214a of the damper member 214 that is provided on the mechanics chassis 200 is fitted into the support hole 114a of the main chassis 100 until the flange portion 214b butts against the support piece 114. In this manner, the mechanics chassis 200 is movably supported by the main chassis 100 by means of the three damper members 142 and 214. That is, vibrations in the direction perpendicular to the support shafts 141 and 213 are damped by the main portions 142a and 214a of the damper members 142 and 214, and vibrations in the longitudinal direction of the support shafts 141 and 213 are damped by the flange portions 142b and 214b, whereby vibrations in any directions applied to the apparatus 1 are hard to travel to the mechanics chassis 200.

Figure 6:
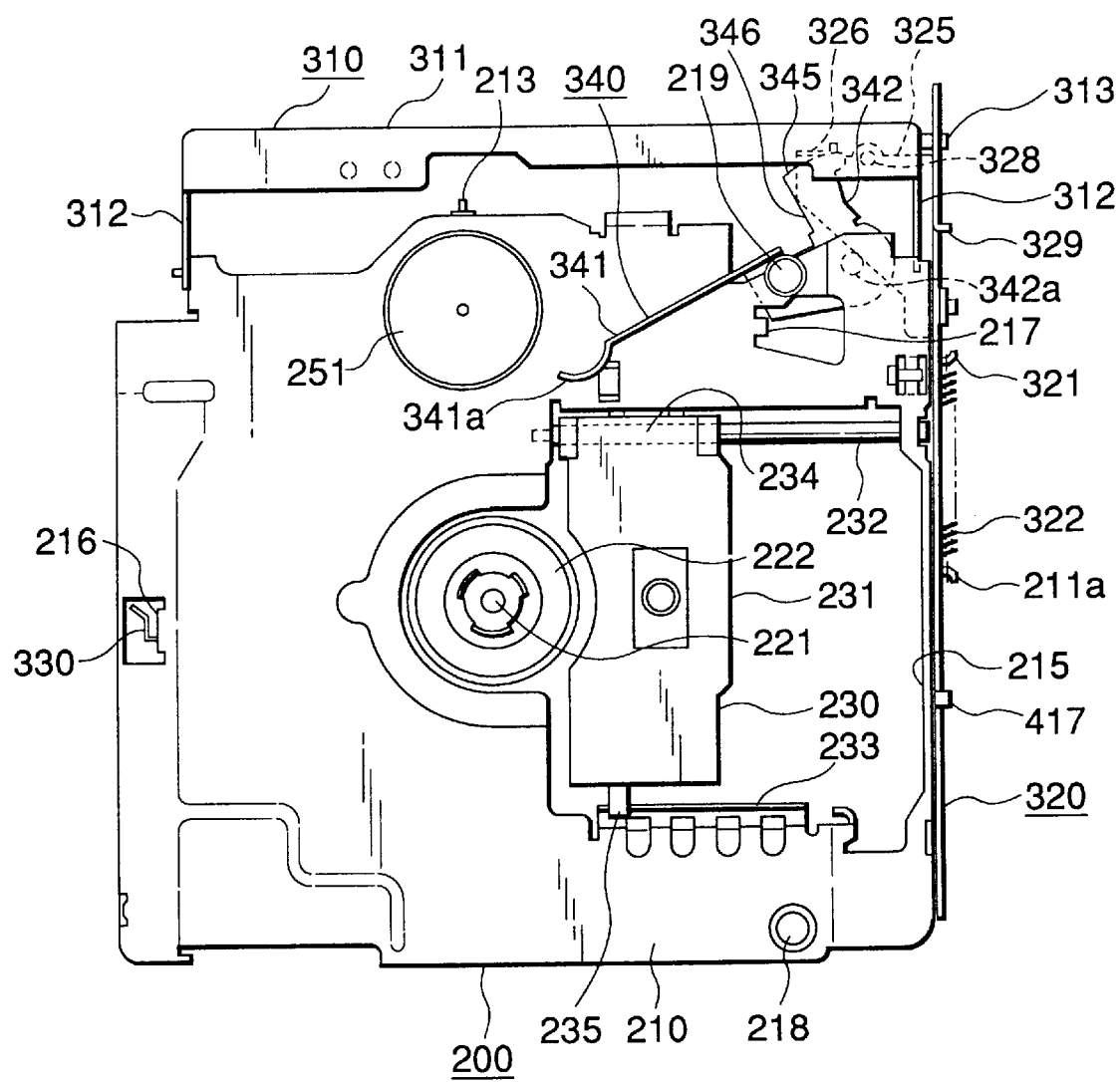
FIG. 6 is a plan view of the mechanics chassis.
Figure 7:
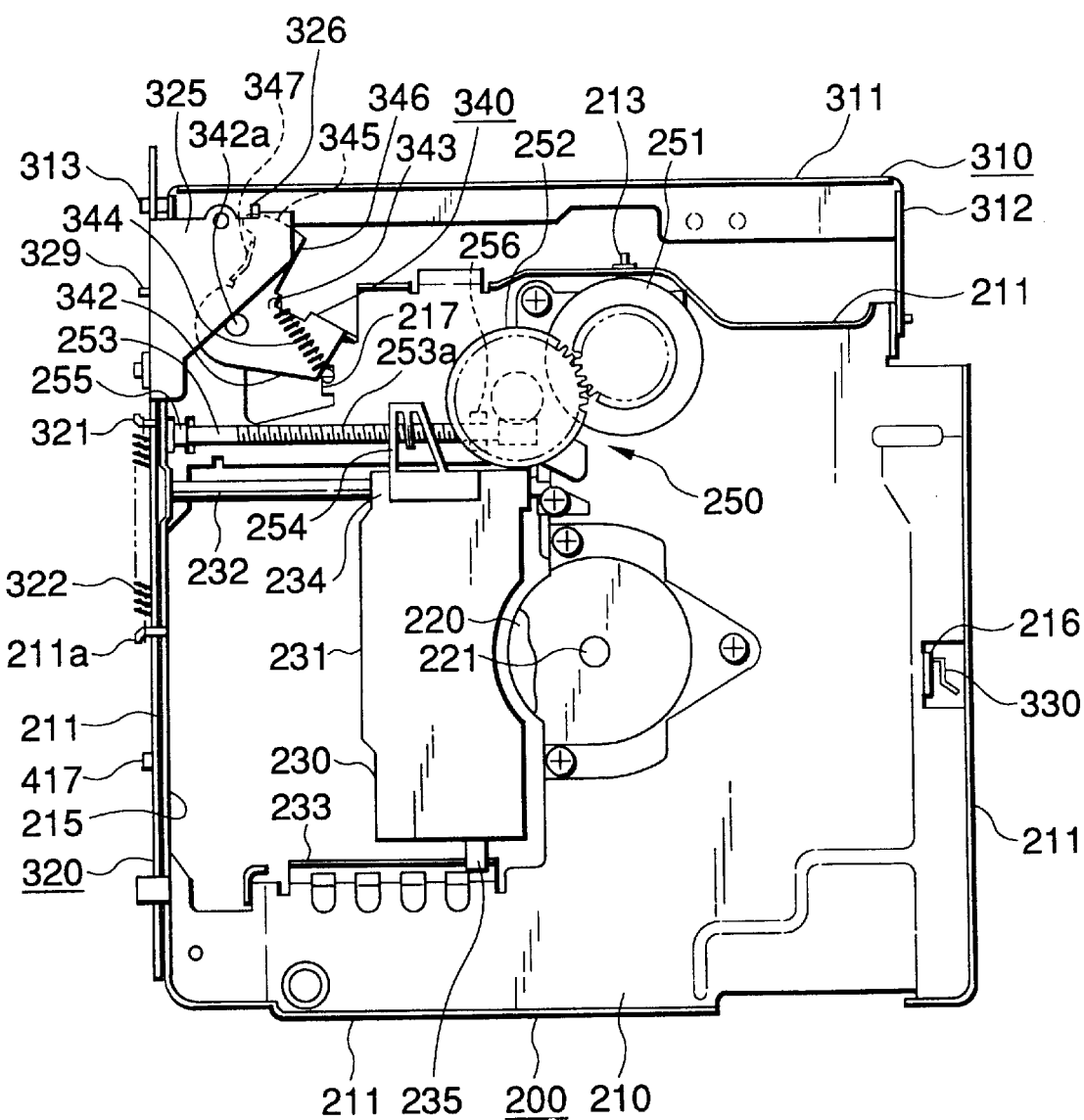
FIG. 7 is a bottom view of the mechanics chassis.

As shown in FIGS. 6 and 7, a spindle motor 220 is provided on the main plate portion 210 of the mechanics chassis 200 at a central position. A turn table 222 as a mounting portion for the optical disc accommodated in the disc cartridge 12 is attached to a rotary shaft 221 of the spindle motor 220.

An optical pickup 230 supported by the main plate portion 210 of the mechanics chassis 200 at a center-left position so as to be movable in the right-left direction, that is, in the radial direction of the optical disc of the disc cartridge 12 mounted on the turn table 222.

A large rectangular opening 215 is formed in the main plate portion 210 of the mechanics chassis 200 on the left of the spindle motor 220 so as to extend from a central position to a position close to the left periphery. The optical pickup 230 as a moving body is disposed in the opening 215 so as to be movable in the direction indicated by arrow L or R in FIG. 6.

The optical pickup 230 is supported by a moving base 231, which is in turn supported by a guide shaft 232 and an auxiliary guide rail 233 so as to be movable in the direction indicated by arrow L or R in FIG. 6 that is parallel with the radial direction of the optical disc.

The guide shaft 232 extends along the rear periphery of the opening 215. And the guide shaft 232 is inserted through a portion 234 to be guided that is formed at the rear end of the moving base 231, whereby the rear end portion of the moving base 231 is slidably supported by the guide shaft 232.

Figure 8:
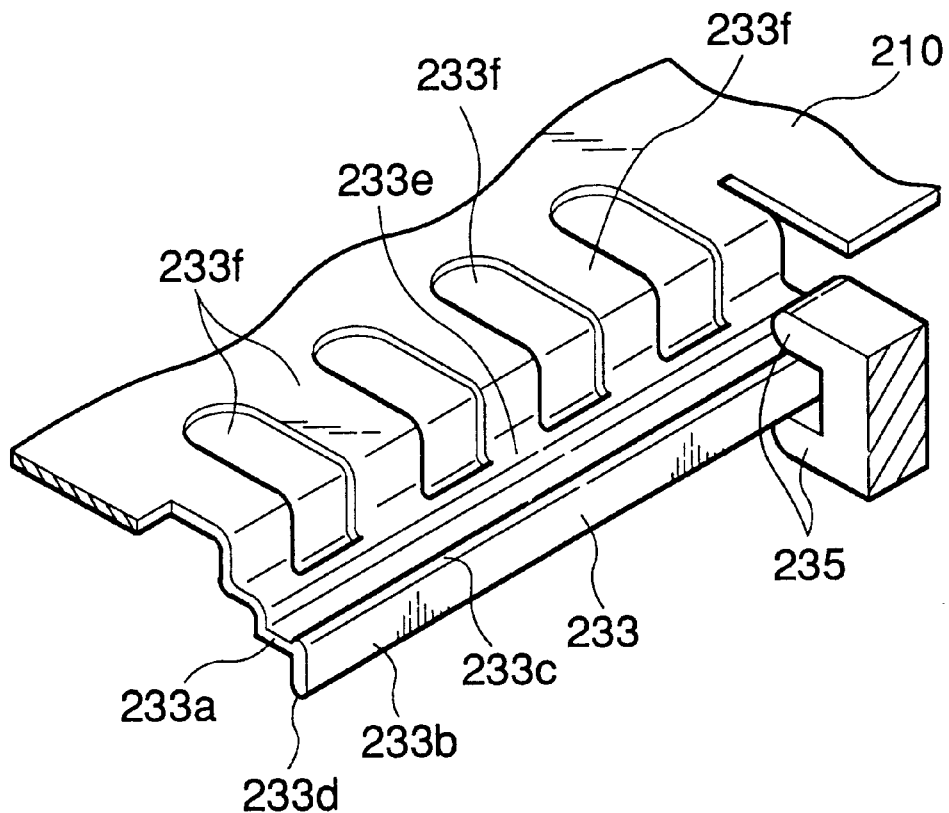
FIG. 8 is an enlarged perspective view of an auxiliary guide rail.

As shown in FIG. 8, the auxiliary guide rail 233 is formed at the front periphery of the opening 215 so as to be integral with the mechanics chassis 200. Specifically, the auxiliary guide rail 233 is formed in such a manner that the top of a portion having a crank-like sectional shape is continuous with, that is, integral with, the front periphery of the opening 215 that is formed in the main plate portion 210 (base portion) of the mechanics chassis 200 as a work subject, and that the top and bottom end faces of the rear end portion of the crank-like portion are formed so as to have circular-arc, that is, convex, sectional shapes.

Figure 10:
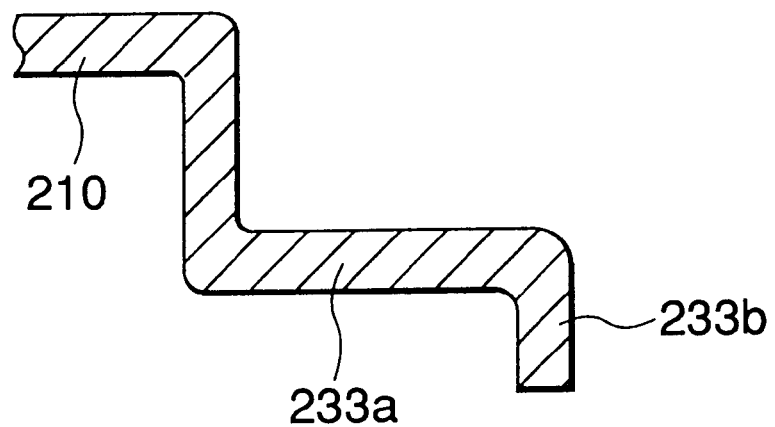
FIG. 10 is an enlarged sectional view showing a state that a bent piece is formed.
Figure 11:
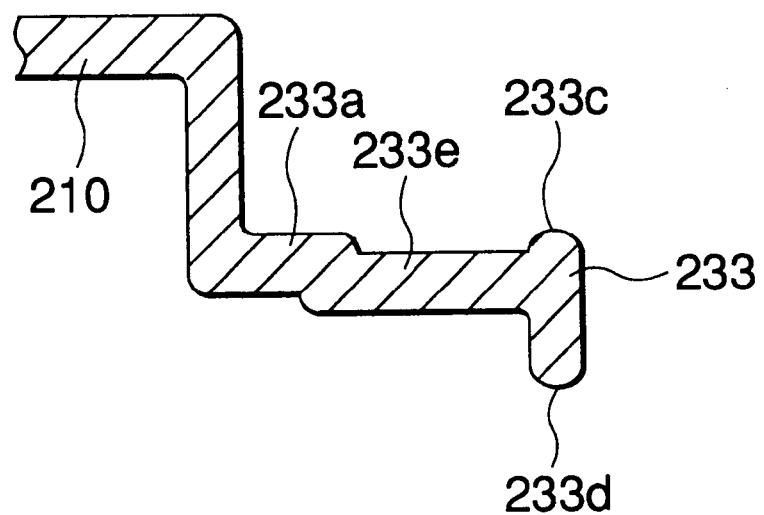
FIG. 11 is an enlarged sectional view showing a state that the auxiliary guide rail is formed by performing press working on part of the L-shaped bent portion.

A method for forming the auxiliary guide rail 233 will be described in detail with reference to FIGS. 9–11.

Figure 9:
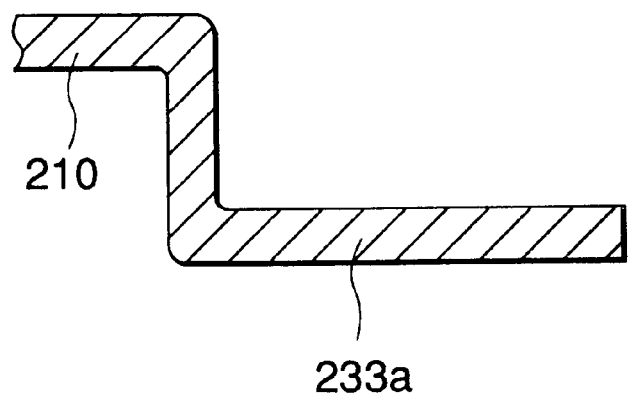
FIG. 9 shows, together with FIGS. 10 and 11, a method of forming the auxiliary guide rail, and is specifically an enlarged sectional view showing a state that an L-shaped bent portion is formed.

First, as shown in FIG. 9, a portion 233a that is bent in an L-shape and is to become a proximal portion is formed when the opening 215 is punched out by press working. Then, as shown in FIG. 10, a bent piece (bent portion) 233b is formed by bending a tip portion of the portion 233a downward. Finally, as shown in FIG. 11, top and bottom faces 233c and 233d of the bent portion 233b are simultaneously worked into circular-arc faces, that is, convex faces. At this time, so that the top circular-arc face 233c is located above the top surface of the portion, adjacent to the circular-arc face 233c, of the portion 233a, press working is performed on a portion 233e of a level part of the portion 233a which portion 233e extends from a position close to the proximal portion to a position contacting the bent piece 233b. As a result, the top surface of the portion 233e is formed with a recess as shown in FIG. 11. The auxiliary guide rail 233 is formed in this manner. The above working can be performed in the process of forming the mechanics chassis 200 by press working. The portion 233a that is bent in an L-shape is formed with reinforcement dents and protrusions 233f as reinforcement ribs in a region excluding the end portion where the bent piece 233b is formed. The reinforcement dents and protrusions 233f are formed at the same time as the L-shaped bent portion 233a is formed.

Figure 12:
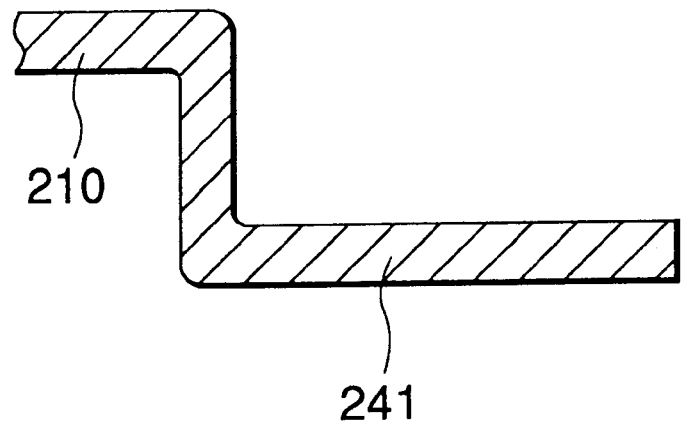
FIG. 12 shows, together with FIGS. 13 and 14, a method of forming another auxiliary guide rail, and is specifically an enlarged sectional view showing a state that an L-shaped bent portion is formed.
Figure 13:
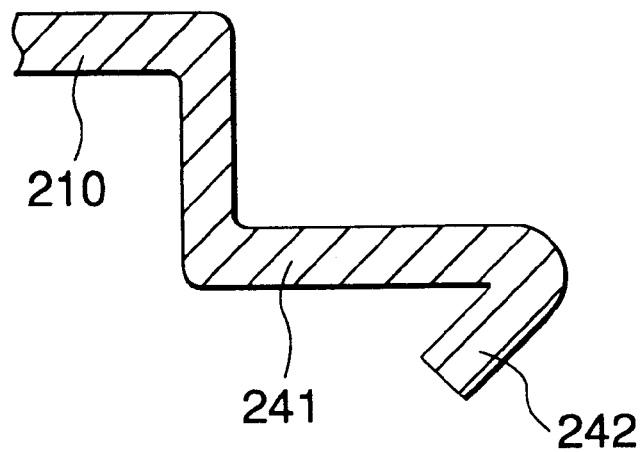
FIG. 13 is an enlarged sectional view showing a state that a folded piece is formed.
Figure 14:
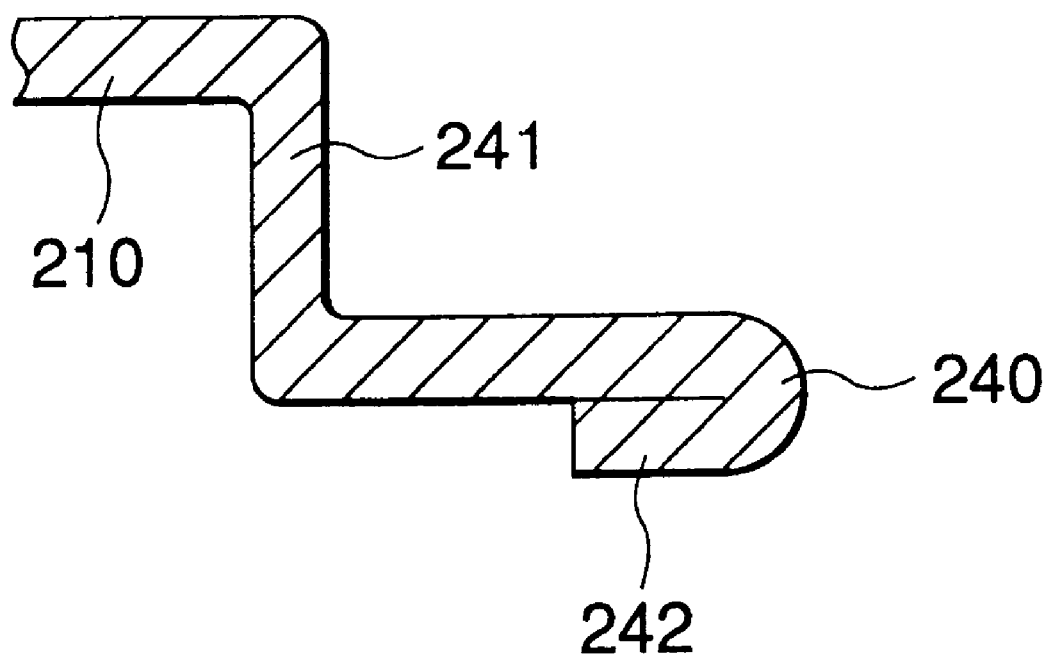
FIG. 14 is an enlarged sectional view showing a state that the auxiliary guide rail is formed by further bending the folded piece so that it is brought into contact with the L-shaped bent portion.

Alternatively, as shown in FIGS. 12–14, an auxiliary guide rail 240 having a different shape than the above auxiliary guide rail 233 can be formed so as to be integral with the mechanics chassis 200.

First, as shown in FIG. 12, a portion 241 that is bent in an L-shape and is to become a proximal portion is formed when the opening 215 is punched out. Then, as shown in FIG. 13, a folded piece (bent portion) 242 is formed by folding a tip portion of the portion 241 downward. Then, as shown in FIG. 14, the auxiliary guide rail 240 is formed by pressing the folded piece 242 and the portion 241 so that they are brought into close contact with each other. This type of auxiliary guide rail 240 can also be formed in the process of forming the mechanics chassis 200 by press working, and hence both of the number of parts and the number of assembling steps can be reduced.

Two pieces 235 to be guided that are engagement portions to engage the auxiliary guide rail 233 project forward from the front end portion of the moving base 231 of the optical pickup 230 so as to be separated in the vertical direction and to be parallel with each other. As shown in FIG. 8, the pieces 235 to be guided individually contact the top and bottom faces 233c and 233d, that is, the sliding faces, of the auxiliary guide rail 233. In this manner, the optical pickup 230 is supported by the guide shaft 232 and the auxiliary guide rail 233 so as to be movable in the direction indicated by arrow L or R in FIG. 6 in the opening 215.

Figure 15:
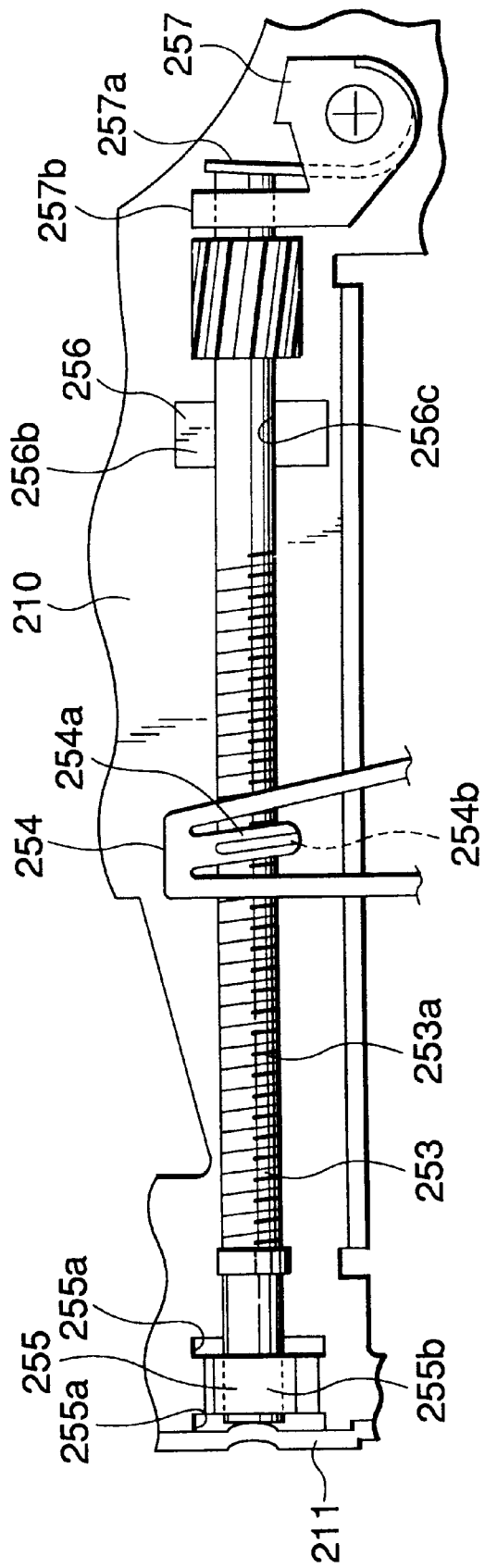
FIG. 15 is an enlarged bottom view showing how a feed screw is supported by the mechanics chassis.

As shown in FIGS. 6, 7, and 15, the optical pickup 230 is moved by a pickup feed mechanism 250 in the direction indicated by arrow L or R in FIG. 6, that is, in the radial direction of the optical disc.

The pickup feed mechanism 250 has a motor 251, a feed screw 253 that is rotated by the motor 251 via a plurality of gears 252, and a nut member 254 that is supported by the moving base 231 of the optical pickup 230 and engaged with the feed screw 253.

The feed screw 253 is rotatably supported by two bearing portions 255 and 256 on the bottom surface of the mechanics chassis 200 so as to extend along the rear periphery of the opening 215. The two bearing portions 255 and 256 are integral with the mechanics chassis 200.

Figure 16:
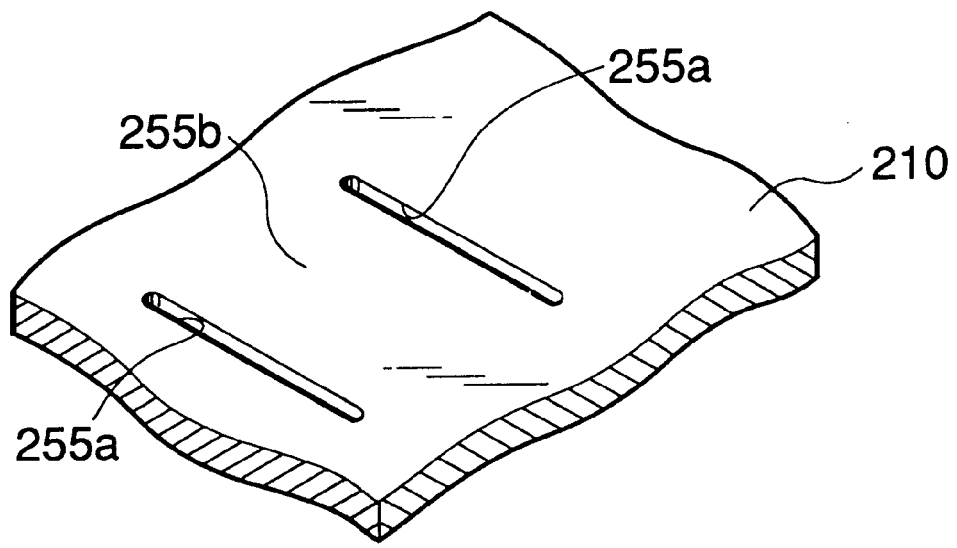
FIG. 16 shows, together with FIGS. 17 and 18, a method of forming a bearing portion, and is specifically an enlarged perspective view showing a state that slits are formed.
Figure 17:
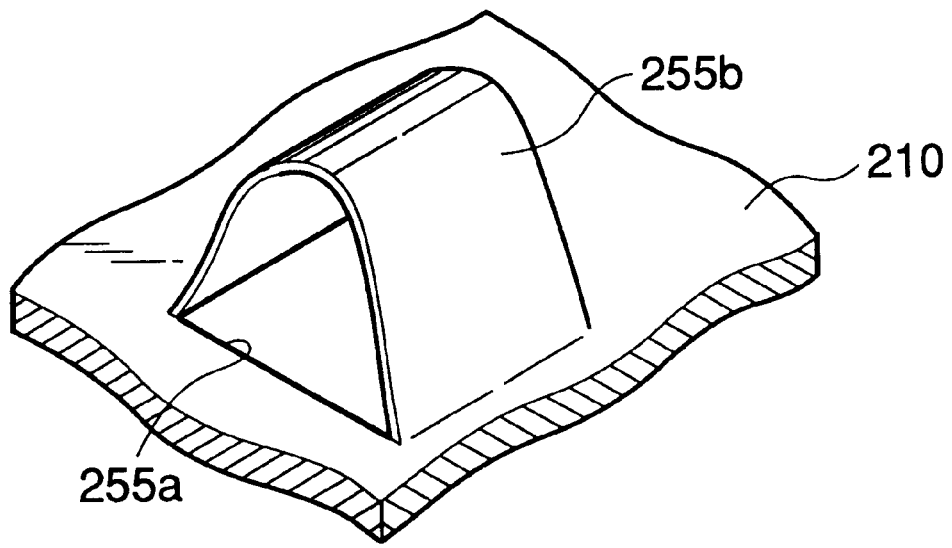
FIG. 17 is an enlarged perspective view showing a state that a U-shaped portion is formed.
Figure 18:
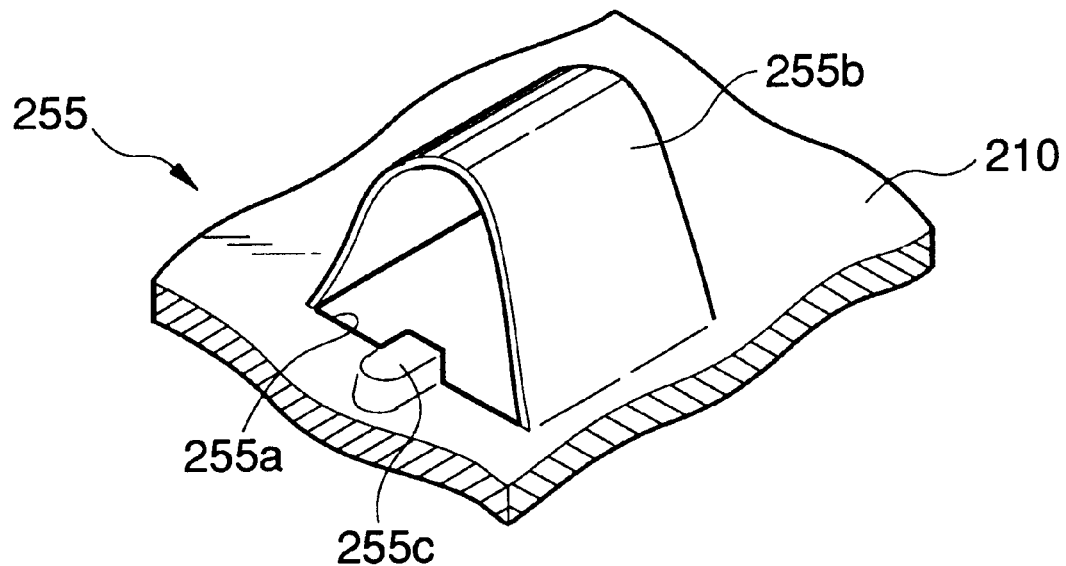
FIG. 18 is an enlarged perspective view showing a state that a receiving portion is formed and a bearing portion is thereby completed.

The bearing portion 255 is formed according to a process shown in FIGS. 16–18 so as to be integral with the mechanics chassis 200.

First, as shown in FIG. 16, two parallel slits 255a are formed in a sheet metal material (i.e., the material of the mechanics chassis 200). Then, as shown in FIG. 17, a portion 255b between the slits 255a (interslit portion) that does not include both end portions is squeezed into approximately a U-shape in several steps. In parallel with the squeezing, as shown in FIG. 18, a protrusion as a receiving portion 255c is pressed out to the same side as the U-shaped portion 255b is drawn at a central portion of a portion adjacent to one of the slits 255a. The bearing portion 255 is thus formed. A left end portion of the feed screw 253 is inserted into the U-shaped portion 255b, and a portion immediately on the right of the portion inserted in the U-shaped portion 255b is received by the receiving portion 255c.

The bearing portion 256 is formed in the following manner so as to be integral with the mechanics chassis 200.

Figure 19:
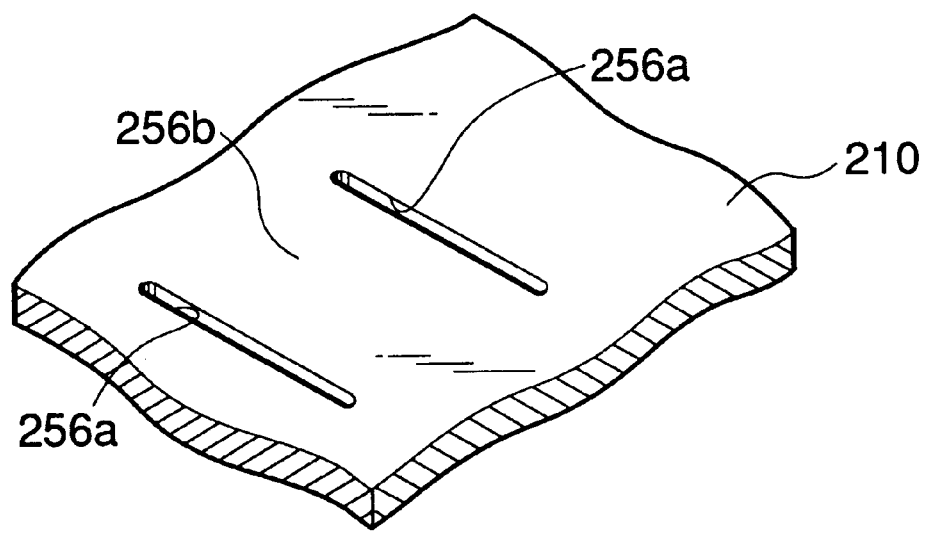
FIG. 19 shows, together with FIGS. 20 and 21, a method of forming another bearing portion, and is specifically an enlarged perspective view showing a state that slits are formed.
Figure 20:
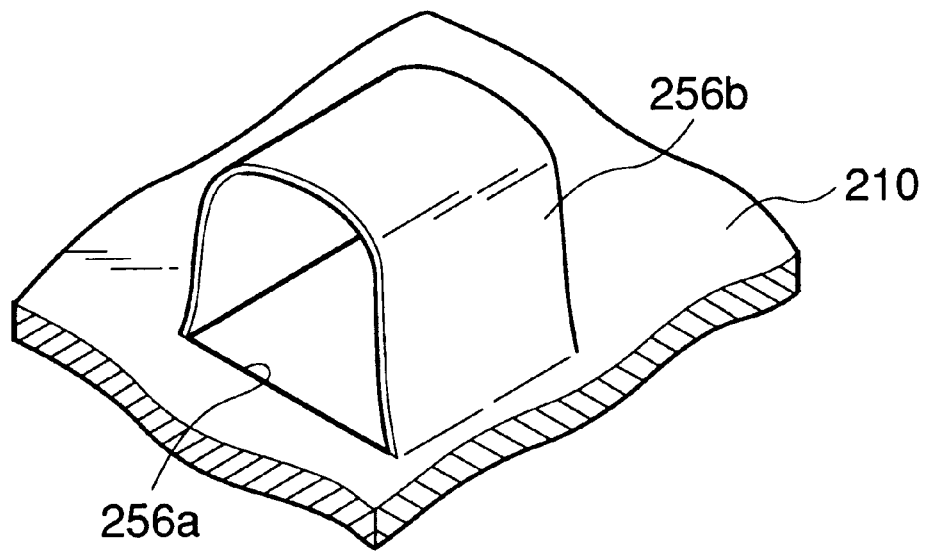
FIG. 20 is an enlarged perspective view showing a state that a U-shaped portion is formed.
Figure 21:
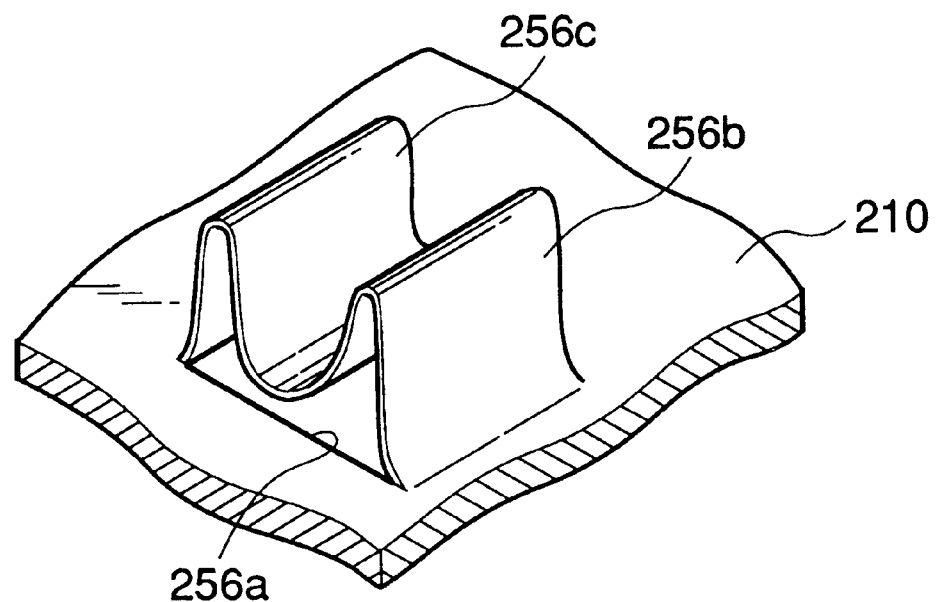
FIG. 21 is an enlarged perspective view showing a state that a receiving portion is formed and a bearing portion is thereby completed.

First, as shown in FIG. 19, two parallel slits 256a are formed in the sheet metal material (i.e., the material of the mechanics chassis 200). Then, as shown in FIG. 20, a portion 256b between the slits 256a (interslit portion) is squeezed into approximately a wide U-shape by several steps of drawing or press working. As shown in FIG. 21, a portion excluding both end portions is formed into a semicircular receiving portion 256c by squeezing it toward the main plate portion 210. The bearing portion 256 is thus formed. A portion of the feed screw 253 close to the right end is supported by the receiving portion 256c.

Like the above-described auxiliary guide rail 233, the above-described bearing portions 255 and 256 can be formed in the process of forming the mechanics chassis 200 by press working. Therefore, both of the number of parts and the number of assembling steps can be reduced.

As shown in FIG. 15, the nut member 254 is made of a leaf spring material. The nut member 254 has a resilient contact piece 254a, which is formed with an engagement protrusion strip 254b that has been pressed out. The nut member 254 having such a structure is fixed to the bottom surface of the moving base 231 at a rear end position in such a manner that the resilient contact piece 254 projects forward, whereby the engagement protrusion strip 254b resiliently engages threads 253a of the feed screw 253 from below.

As shown in FIG. 15, a pre-load spring 257, which is made of a leaf spring material, is fixed to the mechanics chassis 200. The pre-load spring 257 has a pre-load portion 257a for resiliently pressing the feed screw 253 in the direction parallel with the feed screw 253, that is, in the thrust direction, and a press portion 257b for resiliently pressing the feed screw 253 toward the main plate portion 210 of the mechanics chassis 200. A tip portion of the pre-load portion 257a of the pre-load spring 257 resiliently contacts the right end of the feed screw 253, whereby play of the feed screw 253 in the direction parallel with the feed screw 253, that is, in the thrust direction, can be prevented. The left end of the feed screw 253 resiliently contacts the inner surface of the bent flange 211, that is, the left side plate portion, of the mechanics chassis 200; that is, the bent flange 211 serves as a bearing for the direction parallel with the feed screw 253, that is, a thrust bearing.

The press portion 257b of the pre-load spring 257 resiliently contacts a portion of the feed screw 253 adjacent to its right end so as to press that portion toward the main plate portion 210 of the mechanics chassis 200. In this manner, play of the feed screw 253 can be prevented though only the top portion of the portion close to the right end of the feed screw 253 is received by the bearing portion 256.

Figure 22:
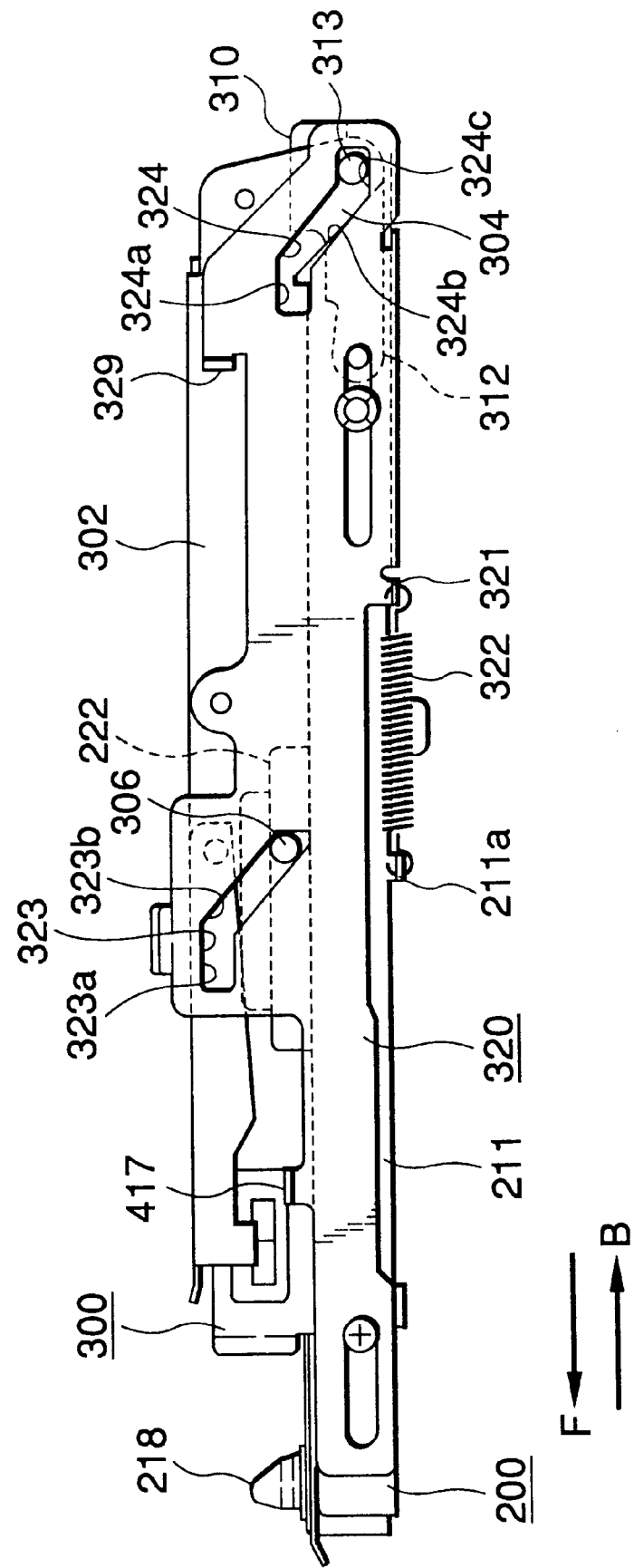
FIG. 22 shows, together with FIG. 23, a medium holder moving mechanism, and is specifically a left side view showing a state that a medium holder is located at a loading position.
Figure 23:
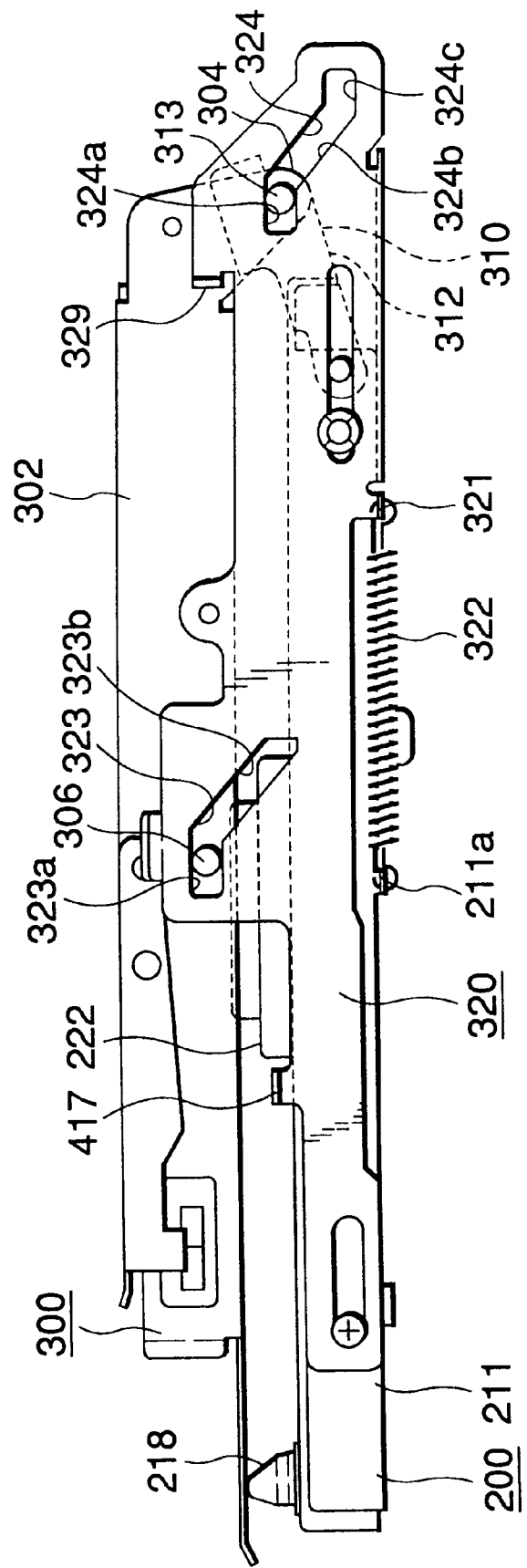
FIG. 23 is a left side view showing a state that the medium holder is located at a waiting position or an unloading position.

As shown in FIGS. 22 and 23, a medium holder 300 serving as a holder for holding the disc cartridge 12 is supported by the mechanics chassis 200 so as to be movable in the direction indicated by arrow U or D in FIG. 22.

As shown in FIGS. 6, 7, and 22–25 a supporting point lever 310 is interposed between a rear end portion of the medium holder 300 and that of the mechanics chassis 200.

The supporting point lever 310 is made of a sheet metal material, and has a joining portion 311 that extends in the right-left direction and serves as a side plate portion and two arms 312 that are joined to left and right end portions of the joining portion 311, respectively, and extend approximately forward. Tip portions of the respective arms 312 are rotatably joined to a rear end portion of the mechanics chassis 200. A slide shaft 313 projects from a rear end portion of the left-side arm 312.

The medium holder 300 is made of a sheet metal material and, as shown in FIGS. 22–25, has a top plate portion 301, two side plate portions 302 that project downward from the left and right peripheries of the top plate portion 301, respectively, and two support pieces 303 that project from the bottom peripheries of the respective side plate portions 302 so as to come close to each other. Two joining legs 304 erect downward from the rear ends of the respective side plate portions 302 of the medium holder 300 as shown in FIG. 3, and tip portions of the respective joining legs 304 are rotatably joined to proximal portions, that is, end portions on the joining portion 311 side, of the respective arms 312 of the supporting point lever 310. The rotary shaft for the supporting point lever 310 of the medium holder 300 has the same axis as the slide shaft 313 that is provided on the supporting point lever 310.

A spring hook piece 305 for supporting one end portion of a toggle spring (described later) is formed by cutting and erecting downward a portion, close to the front end, of the right-side support piece 303 of the medium holder 300.

A slide shaft 306 projects from the outer surface of the left side plate portion 302 of the medium holder 300 approximately at the center in the front-rear direction.

As shown in FIGS. 22 and 23, the medium holder 300 is moved in the vertical direction with respect to the mechanics chassis 200 by a slider 320 as a linear movement body that moves in the front-rear direction.

The slider 320 is made of a sheet metal material, and is supported by the left-side bent flange 211 of the mechanics chassis 200 so as to be slidable in the front-rear direction. The slider 320 is given forward (indicated by arrow F in FIG. 22) moving force by a tension coiled spring 322 that is tensely provided between a spring hook piece 321 formed on the slider 320 and a spring hook piece 211a formed on the bent flange 211.

Cam slits 323 and 324 are formed in the slider 320 so as to be separated in the front-rear direction. The front cam slit 323 has a front horizontal portion 323a that extends approximately horizontally and a slant portion 323b that is continuous with the rear end of the horizontal portion 323a and extends therefrom in a downward/backward direction. The rear cam slit 324 has a front horizontal portion 324a that extends approximately horizontally, a slant portion that is continuous with the rear end of the front horizontal portion 324a and extends therefrom downward/backward, and a rear horizontal portion 324c that is continuous with the rear end of the slant portion 324b and extends therefrom horizontally backward.

The slide shaft 313 that is provided on the supporting point lever 310 is slidably engaged with the rear cam slit 324. A slide shaft 306 that is provided on the medium holder 300 is slidably engaged with the front cam slit 323.

Therefore, as the slider 320 slides in the front-rear direction, the medium holder 300 is moved in the vertical direction (indicated by arrows U and D in FIG. 22) with respect to the mechanics chassis 200.

Specifically, in a state that the slider 320 is located at the front end of its movable range, the slide shaft 313 is located in the rear horizontal portion 324c, and the slide shaft 306 is located at the rear end of the slant portion 323b, the medium holder 300 is lowered, that is, it is closest to the main plate portion 210 of the mechanics chassis 200 as shown in FIG. 22. This state in which the medium holder 300 holds the disc cartridge 12 is a "loading state" (the position of the medium holder 300 in this state is called a "loading position").

As the slider 320 moves backward (indicated by arrow B in FIG. 22) from the above state, the slide shafts 313 and 306 relatively move upward in the respective slant portions 324b and 323b. When the slider 320 reaches the rear end of its movable range, a state is established in which the slide shaft 313 is located in the front horizontal portion and the slide shaft 306 is located in the horizontal portion 323a. As shown in FIG. 23, the medium holder 300 is elevated to the highest position, that is, it is most distant from the main plate portion 210 of the mechanics chassis 200. This state is a waiting state (when it does not hold the disc cartridge 12) or an unloading state (when it holds the disc cartridge 12). (The position of the medium holder 300 in this state is called a "waiting position" or a "unloading position.")

As described above, joining the medium holder 300 to the mechanics chassis 200 via the supporting point lever 310 allows the medium holder 300 to be moved approximately only in the vertical direction (indicated by arrows U and D in FIG. 22) simply by engaging the slide shafts 306 and 313 with the cam slits 323 and 324, respectively (it is not necessary to engage the slide shafts 306 and 313 with vertically extending slits to prevent a front-rear movement). Further, the dimension in the front-rear direction can be reduced.

By causing the medium holder 300 to move in the vertical direction only by the means provided on one side (left side) as described above, the dimension in the width direction can also be reduced. The medium holder 300 is configured in such a manner that its left-side portion is supported by the mechanics chassis 200 at two points via the supporting point lever 310 and the slider 320 and its right-side portion is supported by the mechanics chassis 200 at one point (rear end position) via the supporting point lever 310.

Figure 24:
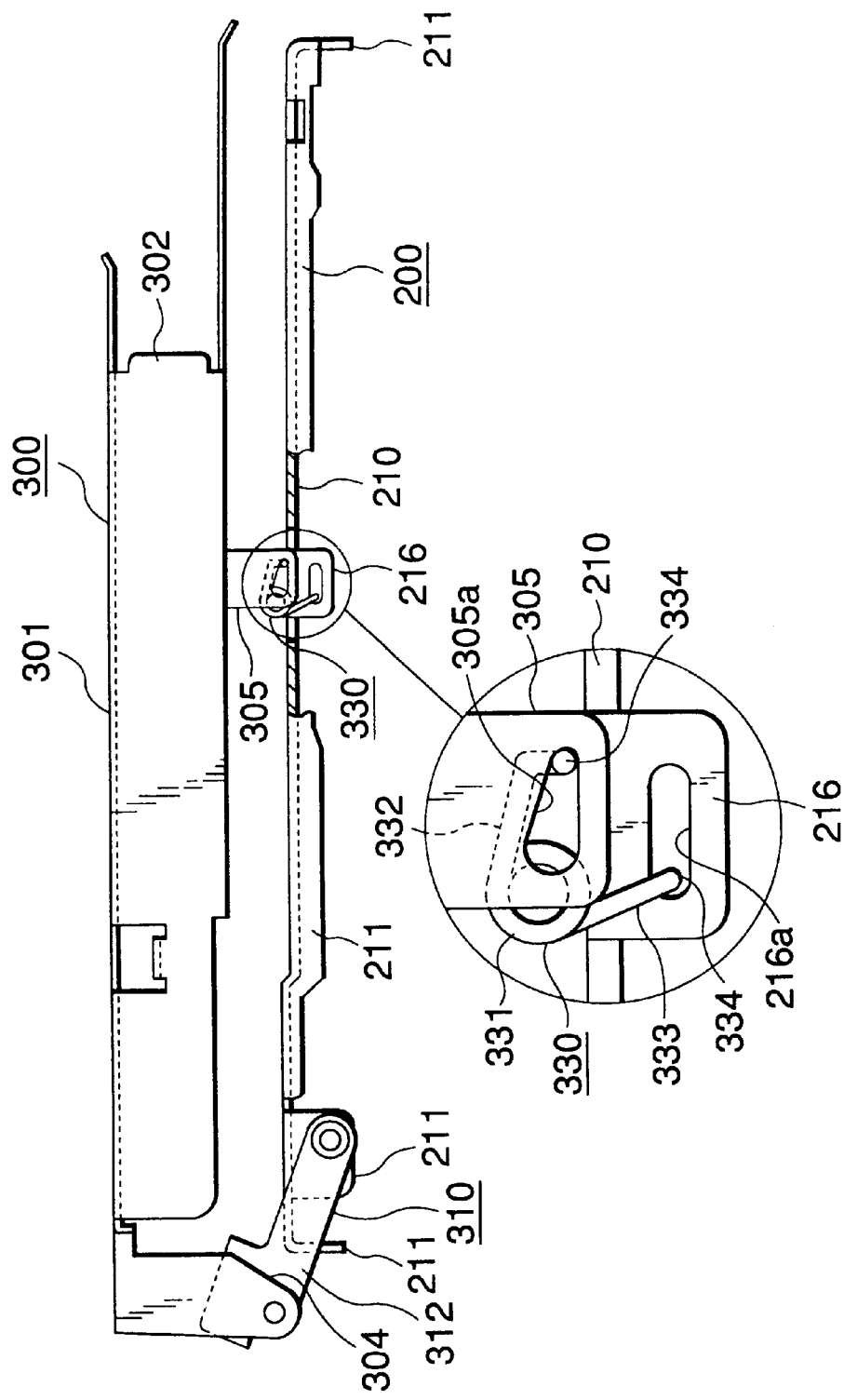
FIG. 24 shows, together with FIG. 25, action of a toggle spring, and is specifically a right side view showing a state that the toggle spring acts in a direction of separating the mechanics chassis and the medium holder from each other.
Figure 25:
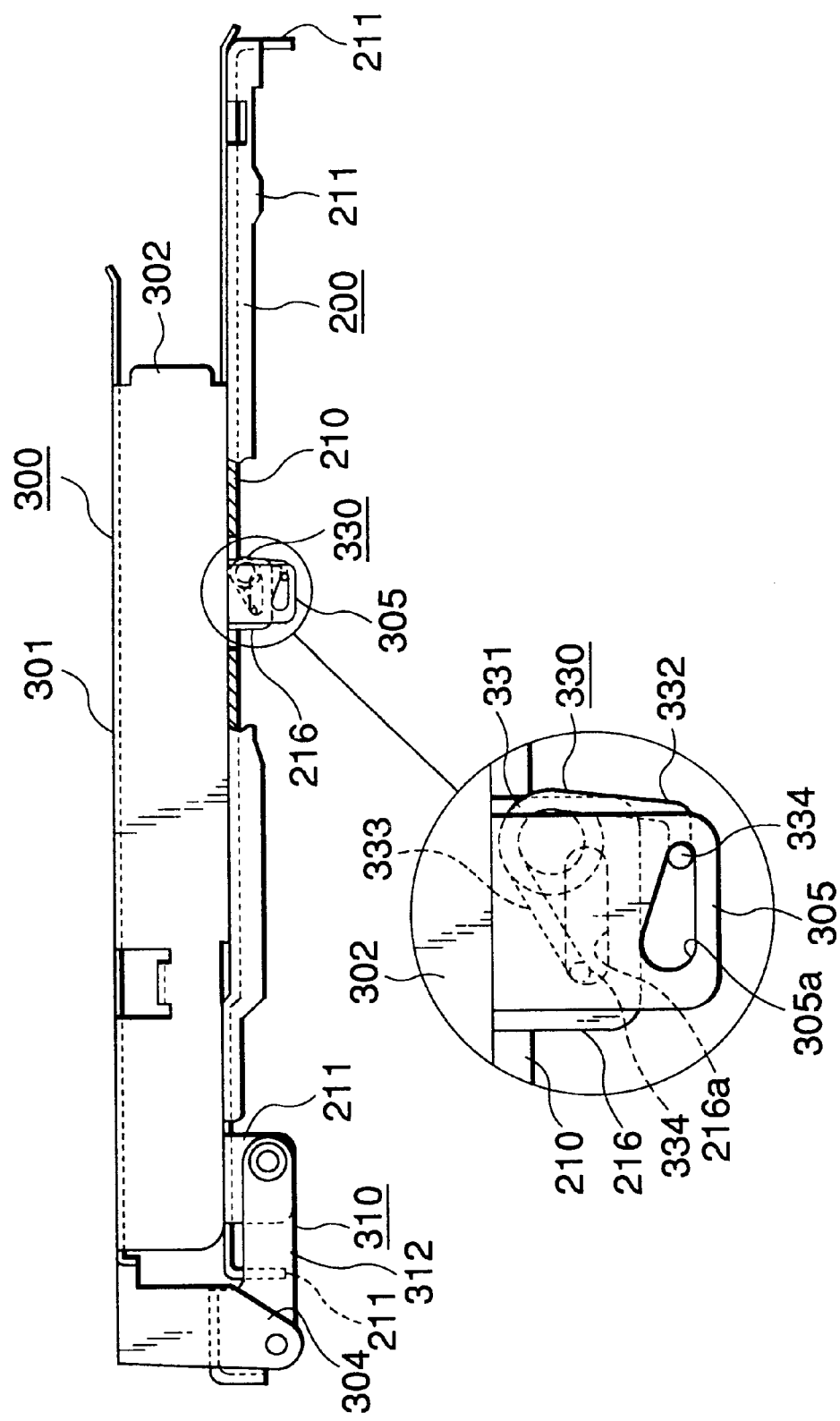
FIG. 25 is a right side view showing a state that the toggle spring acts in a direction of bringing the mechanics chassis and the medium holder closer to each other.

As shown in FIGS. 24 and 25, the right-side portion of the medium holder 300 is supported by the mechanics chassis 200 at another point via a toggle spring 330.

A spring hook piece 216 for supporting the other end portion of the toggle spring (described later) projects downward from the main plate portion 210 of the mechanics chassis 200 at a position that is close to the right periphery of the main plate portion 210 and slightly deviated to the front side from the center in the front-rear direction. A spring hook hole 216a and a spring hook hole 305a as toggle spring support portions that are long in the front-rear direction are formed in the spring hook piece 216 and the spring hook piece 305 of the medium holder 300, respectively.

The toggle spring 330 has a coil portion 331 and two arms 332 and 333, which are formed with engagement portions 334 at the tips, respectively. One of the arms, that is, the arm 332, is formed into an L-shape.

The engagement portion 334 of the one arm 332 of the toggle spring 330 engages the spring hook hole 305a of the spring hook piece 305 of the medium holder 300, and the engagement portion 334 of the other arm 333 engages the spring hook hole 216a of the spring hook piece 216 of the mechanics chassis 200.

When the medium holder 300 is in the waiting state or the unloading state, as shown in FIG. 24 the spring hook hole 305a is located above the spring hook hole 216a, the engagement portion 334 of the arm 332 is located at the front end of the spring hook hole 305a, and the engagement portion 334 of the arm 333 is located at the rear end of the spring hook hole 216a. In the state shown in FIG. 24, the resilient force of the toggle spring 330 acts so as to lift the medium holder 300 upward.

If the medium holder 300 is lowered from the state of FIG. 24, the spring hook hole 305a comes to be located below the spring hook hole 216a as shown in FIG. 25. In this state, conversely, the resilient force of the toggle spring 330 acts so as to press the medium holder 300 against the main plate portion 210 of the mechanics chassis 200.

As described above, if the right-side portion of the medium holder 300 were supported at only one point (rear end position), the position of the front-side portion would be rendered unstable. In view of this, as described above, this portion is supported by means of the toggle spring 330 and the reversal of the acting direction the resilient force of the toggle spring 330 is utilized; that is, the resilient force of the toggle spring 330 is caused to act so as to keep the medium holder 300 at the predetermined height when the medium holder 300 is in the waiting state or the unloading state, and to press the medium holder 300 against the main plate portion 210 of the mechanics chassis 200 when the medium holder 300 is in the loading state. In this manner, the medium holder 300 is rendered stable when it is located at either position.

Next, a description will be made of a mechanism for lowering the medium holder 300 when the disc cartridge 12 is inserted into the medium holder 300 and a mechanism for projecting or ejecting the disc cartridge 12 from the medium holder 300 at the time of ejecting the disc cartridge 12.

Figure 26:
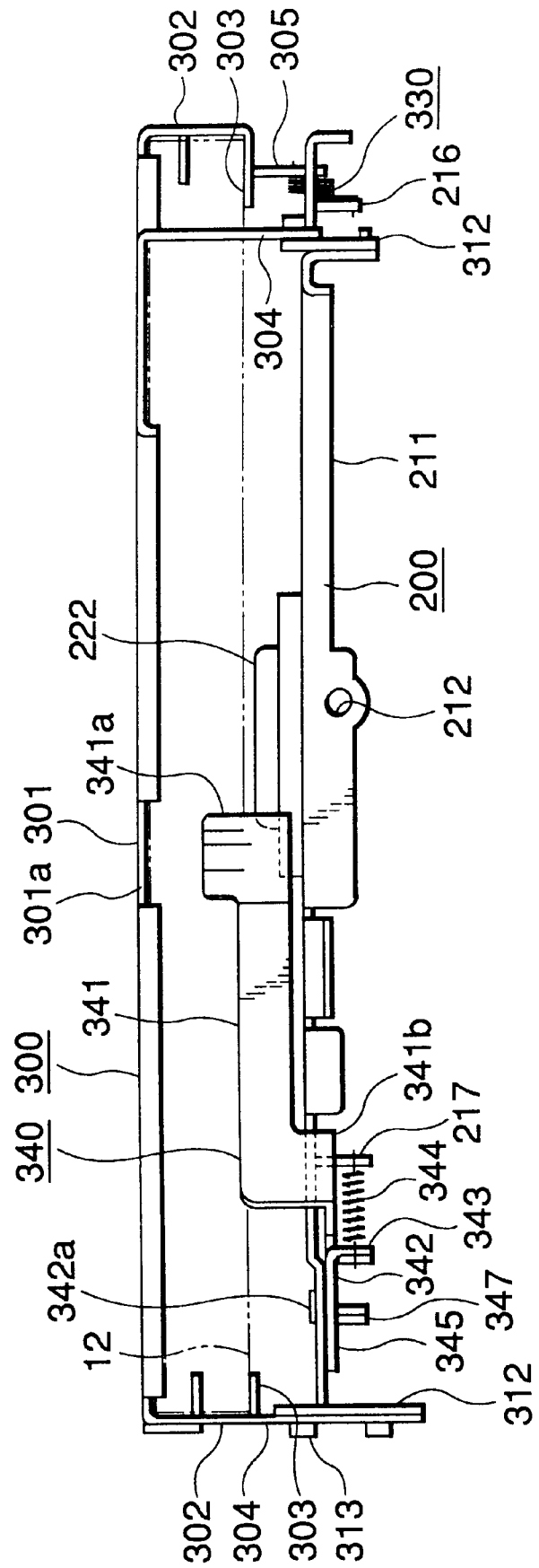
FIG. 26 is a rear view showing a state that the medium holder is located at the waiting position or the unloading position.
Figure 27:
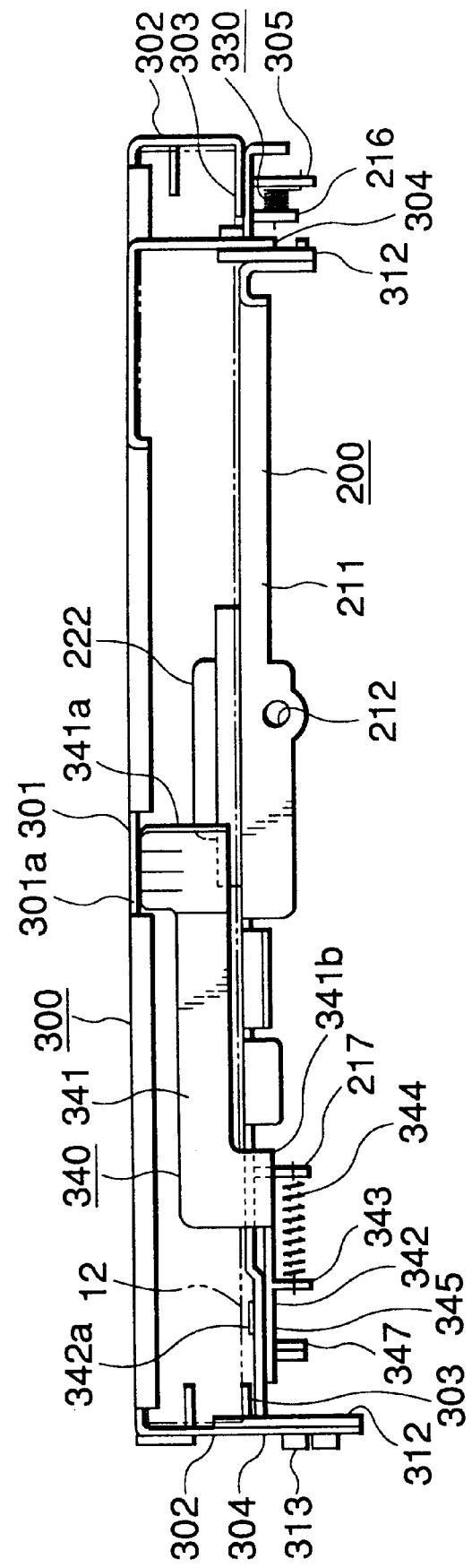
FIG. 27 is a rear view showing a state that the medium holder is located at the loading position.

As shown in FIGS. 6, 26, and 27, an ejection lever 340 as a rotational movement body is rotatably supported by a rear end portion of the main plate portion 210 of the mechanics chassis 200 at a left position. The ejection lever 340 is formed by working a sheet metal material, and is integrally composed of an arm portion 341 and a portion 342 to be controlled. The arm portion 341 extends approximately rightward from the right end of the portion 342 to be controlled, and is formed, at the tip, with a butting portion 341a that is curved so as to be convex toward the front side. A top portion of the butting portion 341a projects upward from the other part of the arm portion 341. When the medium holder 300 is in the loading state, the top of the butting portion 341a is located in a cut 301a that is formed in the rear periphery of the top plate portion 301 of the medium holder 300 as shown in FIG. 27. When the medium holder 300 is in the waiting state or the unloading state, the top of the butting portion 341a is located above the support pieces 303 of the medium holder 300 as shown in FIG. 26.

A proximal portion 341b of the arm portion 341 projects downward, and a bottom portion of the proximal portion 341b is joined to a right end portion of the portion 342 to be controlled. As for the ejection lever 340 having the above structure, the arm portion 341 is located above the main plate portion 210 of the mechanics chassis 200 and the portion 342 to be controlled is located below the main plate portion 210.

The portion 342 to be controlled is approximately L-shaped when viewed from above, and the L-shaped bent portion, which is located under the main plate portion 210 of the mechanics chassis 200, is rotatably supported by the main plate portion 210 via a shaft 342a as shown in FIGS. 28–31. A spring hook piece 343 erects downward from the L-shaped bent portion of the portion 342 to be controlled at the inside bending point. A tension coiled spring 344 is tensely provided between the spring hook piece 343 and a spring hook piece 217 that erects downward from the main plate portion 210 of the mechanics chassis 200. In this manner, the ejection lever 340 is urged counterclockwise (when viewed from above in FIG. 28).

Figure 29:
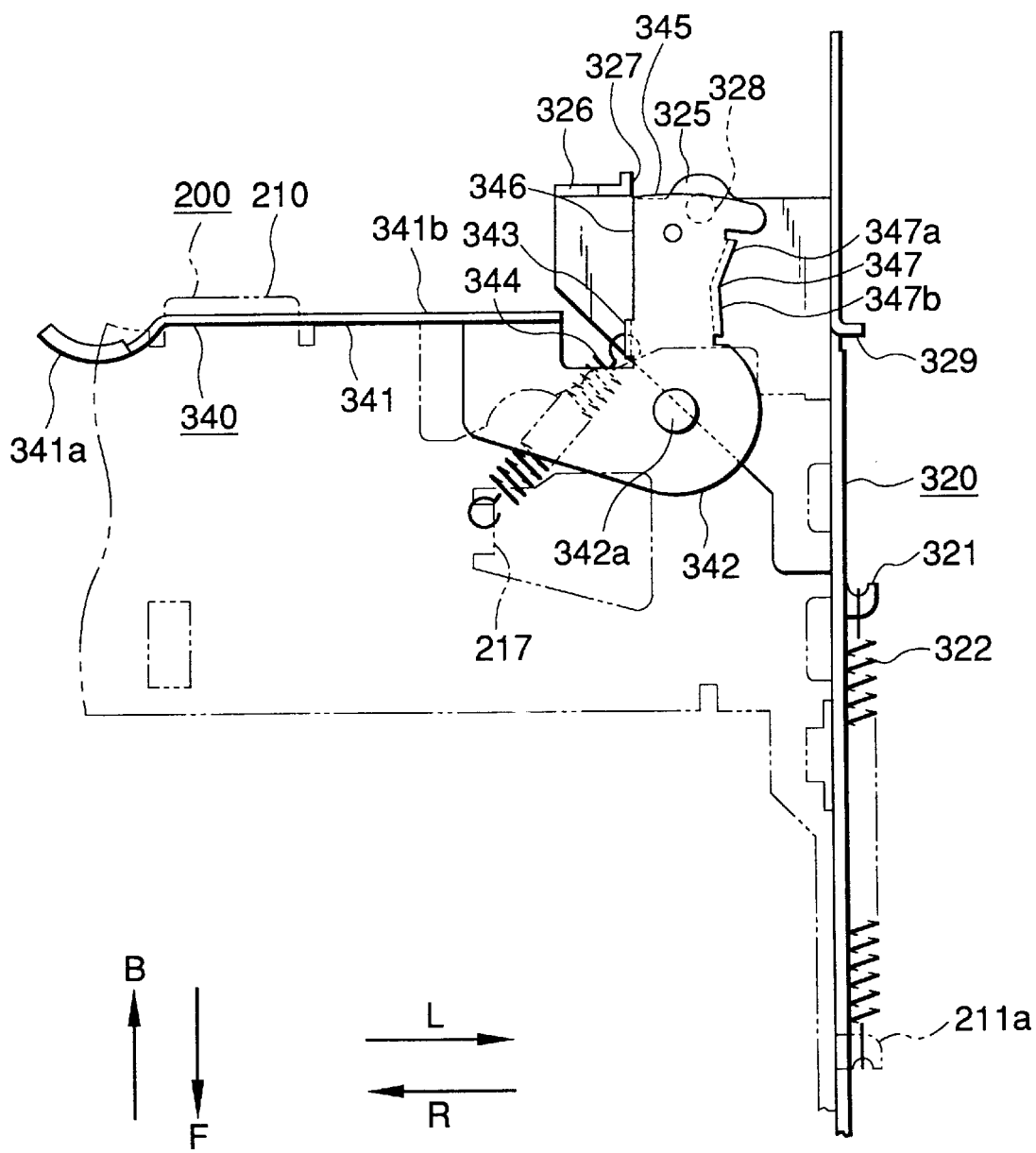
FIG. 29 is an enlarged plan view showing a state that the ejection lever has been turned and the right end of a stopper periphery is located at a position corresponding to the left end of a piece to be stopped.

A rear periphery 345 of the portion, extending approximately backward, of the portion 342 to be controlled is a stopper periphery, and a right periphery 346 of the same backward extending portion of the portion 342 extends approximately in the front-rear direction. A piece 347 to be pressed erects downward from the portion 342 to be controlled along its left periphery. The piece 347 to be pressed is a continuous member composed of a rear half portion 347a and a front half portion 347b. As shown in FIG. 29, in a state that the arm portion 341 extends approximately in the right-left direction (indicated by arrows L and R in FIG. 29), the front half portion 347b extends straightly approximately in the front-rear direction (indicated by arrows F and B in FIG. 29) and the rear half portion 347a extends from the rear end of the front half portion 347b in a direction that is somewhat deviated to the left from the backward direction (indicated by arrow L in FIG. 29).

As shown in FIGS. 28–31, a support plate 325 as a support portion that is integral with the slider 320 and projects rightward from the bottom periphery of a rear end portion of the slider 320. The support plate 325 is located below the portion 342 to be controlled of the ejection lever 340.

A piece 326 to be stopped projects upward from the rear periphery of the support plate 325 at a right end position. A left end portion 327 of the piece 326 to be stopped is bent backward at a right angle. A collar 328 is rotatably supported by the top surface of the support plane 325 at a position somewhat deviated to the left from the left end of the piece 326 to be stopped.

Figure 28:
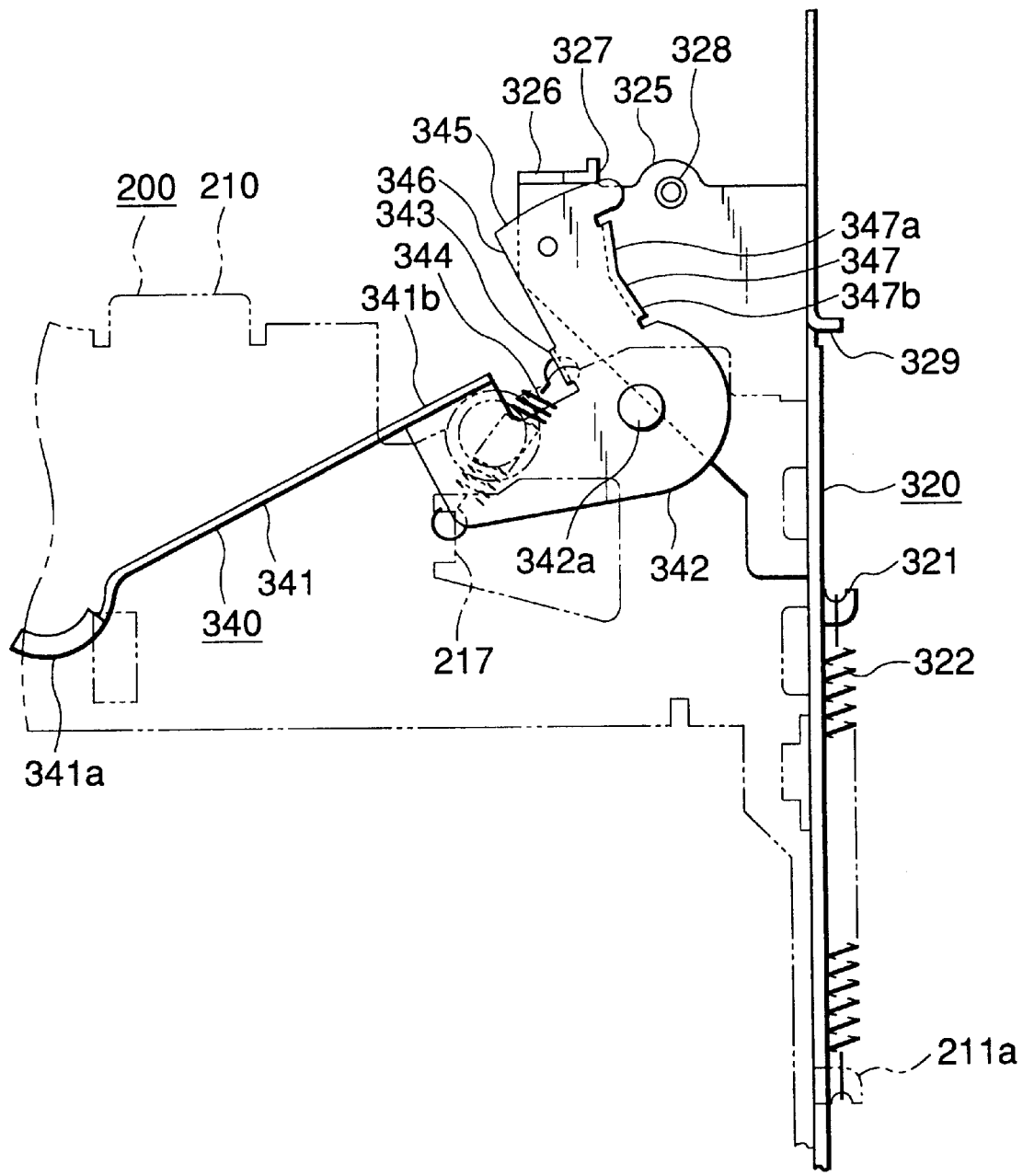
FIG. 28 shows, together with FIGS. 29–31, an operation of an ejection lever, and is specifically an enlarged plan view showing a state before the ejection lever is turned.

In a state that the slider 320 is located at the rear end of its movable range (i.e., the end when it has moved in the direction indicated by arrow B in FIG. 29), that is, when the medium holder 300 is in the waiting state or the unloading state, the ejection lever 340 is located at the position where it is fully turned counterclockwise as shown in FIG. 28. In this state, the stopper periphery 345 of the ejection lever 340 contacts the piece 326 to be stopped of the slider 320 from the front side, and the slider 320 is thus locked at the rear end of its movable range.

When the disc cartridge 12 is inserted into the medium holder 300 in this state, the butting portion 341a of the ejection lever 340 is pressed backward by the insertion-side tip of the disc cartridge 12, whereby the ejection lever 340 is turned clockwise when viewed from above in FIG. 28. As the ejection lever 340 is turned clockwise, its stopper periphery 345 moves approximately leftward and the right end of the stopper periphery 345 comes to be located at a position corresponding to the left end 327 of the piece 326 to be stopped of the slider 320 as shown in FIG. 29. At this time, the collar 328 of the slider 320 is opposed to the right side face of the rear half portion 347a of the piece to be pressed of the ejection lever 340 though the collar 328 is somewhat deviated to the rear side from the rear half portion 347a.

Figure 30:
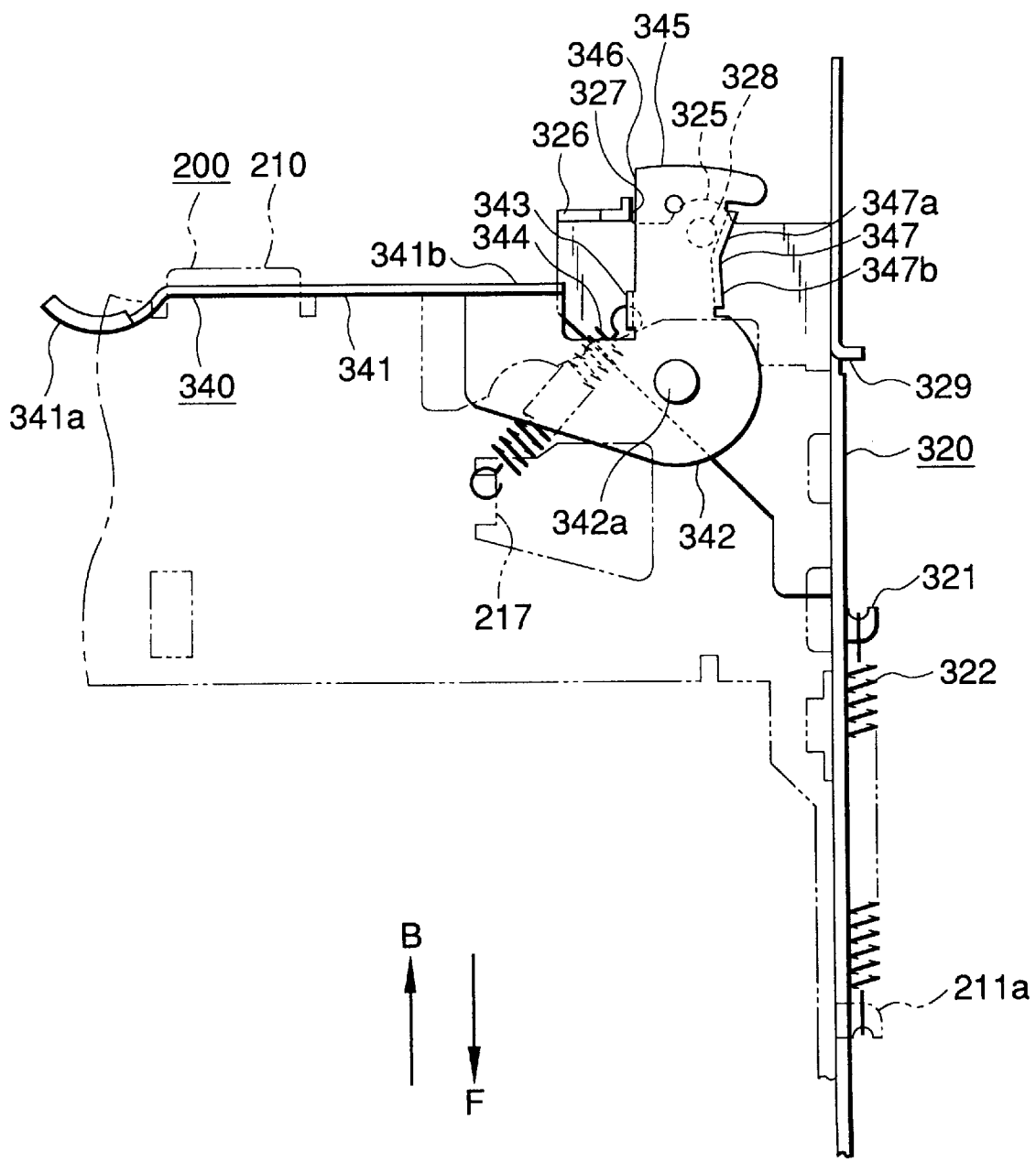
FIG. 30 is an enlarged plan view showing a state that a slider has been moved forward and its collar presses a rear half portion of a piece to be pressed of the ejection lever.

As shown in FIG. 30, when the right end of the stopper periphery 345 of the ejection lever 340 escapes leftward from the left end 327 of the piece 326 to be stopped of the slider 320, the slider 320 is moved forward (indicated by arrow F in FIG. 30) by the pulling force of the tension coiled spring 322 and the collar 328 of the slider 320 butts against the right side face of the rear half portion 347a of the piece 347 to be pressed of the ejection lever 340.

As the slider 320 is further moved forward (indicated by arrow F in FIG. 30) after the collar 328 butted against the right side face of the rear half portion 347a of the piece 347 to be pressed, the collar 328 acts to press the right side face of the rear half portion 347a leftward and hence the ejection lever 340 is somewhat turned clockwise. The reason for this operation is as follows. The rear end portion of the medium holder 300 is joined to the mechanics chassis 200 via the supporting point lever 310. During the loading, the rear end portion where the supporting point lever 310 is joined to the medium holder 300 is turned and lowered from the position somewhat above the main plate portion 210 of the mechanics chassis 200 to the position approximately at the same height as the main plate portion 210, whereby the rear end portion is somewhat moved backward. Accordingly, the medium holder 300 is also somewhat moved backward. If the ejection lever 340 stayed at the position shown in FIG. 29 or 30, as a result of the above-described backward movement of the medium holder 300, the ejection lever 340 would move the disc cartridge 12 forward (indicated by arrow F in FIG. 30). In view of this, the ejection lever 340 is further turned clockwise as described above so that the butting portion 341a escapes backward together with the tip of the disc cartridge 12 that is moving backward. The turn of the ejection lever 340 causes the left end 327 of the piece 326 to be stopped of the slider 320 to separate from the right periphery 346 of the ejection lever 340 that is continuous with the stopper periphery 345.

Figure 31:
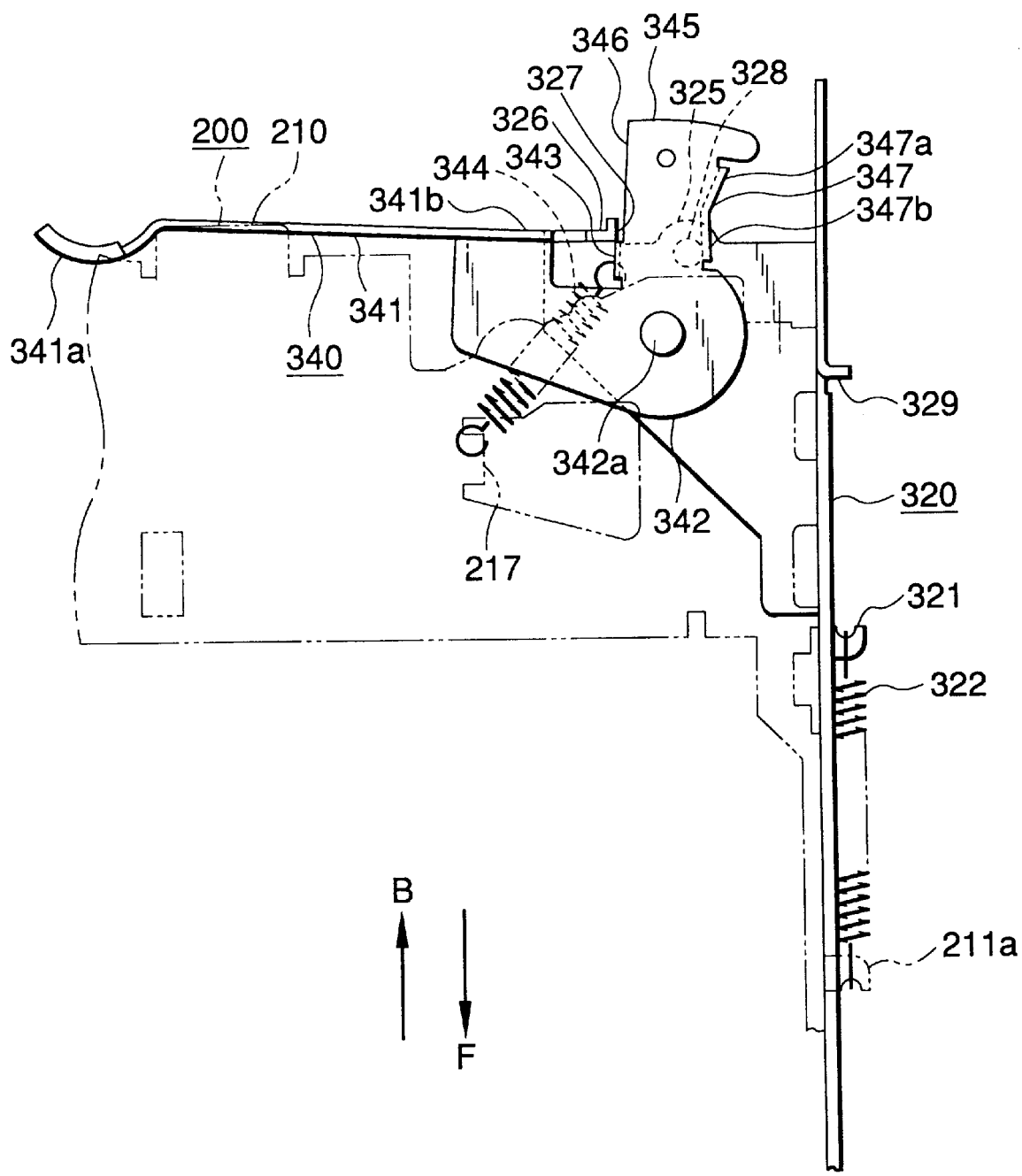
FIG. 31 is an enlarged plan view showing a state that the ejection lever has been turned further.

When the slider 320 reaches the front end of its movable range, the collar 328 contacts the right side face of the front half portion 347b of the piece 347 to be pressed of the ejection lever 340 as shown in FIG. 31, whereby the ejection lever 340 is prevented from turning counterclockwise, that is, it is prevented from making a turn in such a direction as to press forward (indicated by arrow F in FIG. 31) the disc cartridge 12 that is loaded.

The medium holder 300 is rendered into the loading state during the course of the above operation. In the above operation, since the supporting point lever 310 is turned so as to fall backward (i.e., turn clockwise in FIG. 23), the medium holder 300 is lowered as shown in FIG. 22 while being pulled backward. In this manner, the disc cartridge 12 that has been inserted into the medium holder 300 so far manually starts to be pulled in automatically.

When the slider 320 is moved backward (indicated by arrow B in FIG. 30 or 31) from the front end of its movable range, the medium holder 300 is elevated toward the unloading position as described above. When the left end 327 of the piece 326 to be stopped comes to be located behind the rear end of the right side face 346 that is continuous with the stopper periphery 345 of the ejection lever 340, the ejection lever 340 is turned counterclockwise when viewed from above by the pulling force of the tension coiled spring 344. As a result, the stopper periphery 345 engages the piece 326 to be stopped of the slider 320 to lock the slider 320 at the rear end of its movable range. At the same time, the butting portion 341a of the arm portion 341 presses the disc cartridge 12 and thereby projects part of the disc cartridge 12 forward from the medium holder 300, to allow a user to remove the disc cartridge 12 to the outside by gripping the projected part.

The time point when the slider 320 starts to move forward (indicated by arrow F in FIG. 29 etc.) to lower the medium holder 300 toward the loading position can be set accurately because, as described above, it is determined by the relative positional relationship between the right end of the stopper periphery 345 of the ejection lever 340 and the left end of the piece 326 to be stopped of the slider 320. Since the butting portion 341a of the arm portion 341 of the ejection lever 340 is retreated (indicated by arrow B in FIG. 29 etc.) by the action that the collar 328 of the slider 320 presses the right side face of the rear half portion 347a of the piece 347 to be pressed of the ejection lever 340, the required force is weak.

A guide shaft 218 for guiding the disc cartridge 12 to the predetermined mounting position and a positioning protrusion 219 for positioning the disc cartridge 12 at a predetermined position when the disc cartridge 12 is loaded project from the main plate portion 210 of the mechanics chassis 200 as shown in FIGS. 6 and 32–34.

The guide shaft 218, which projects from a front end portion of the main plate portion 210 at a position close to the left (indicated by arrow L) periphery as shown in FIG. 6, is composed of a planar and circular base portion 218a and a guide portion that projects from the base portion 218a. The guide portion has a cylindrical portion 218b that has an outside diameter a little smaller than that of the base portion 218a and is shaped like a short cylinder, and a conical portion 218c that is located above and is continuous with the cylindrical portion 218b and that has approximately a cone shape. The axis of the conical portion 218c is slightly inclined forward as shown in FIG. 32.

Figure 32:
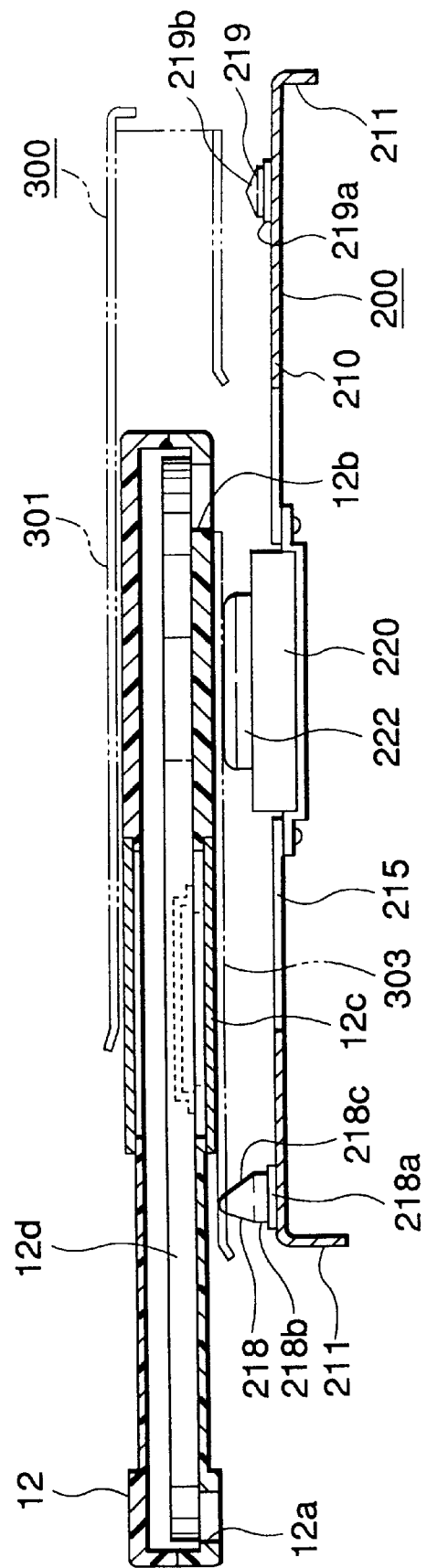
FIG. 32 shows, together with FIGS. 33 and 34, an operation of positioning the disc cartridge with respect to the mechanics chassis, and is specifically a sectional view showing a state that the disc cartridge is being inserted into the medium holder.

The positioning protrusion 219, which projects from a rear end portion of the main plate portion 210 at a position close to the left periphery as shown in FIG. 6, is composed of a planar and circular base portion 219a and a conical portion as a positioning portion 219b that has an outer diameter (proximal portion) a little smaller than that of the base portion 219a and has a short cone shape (see FIG. 32). The positioning protrusion 219 serves as a guide shaft.

Figure 33:
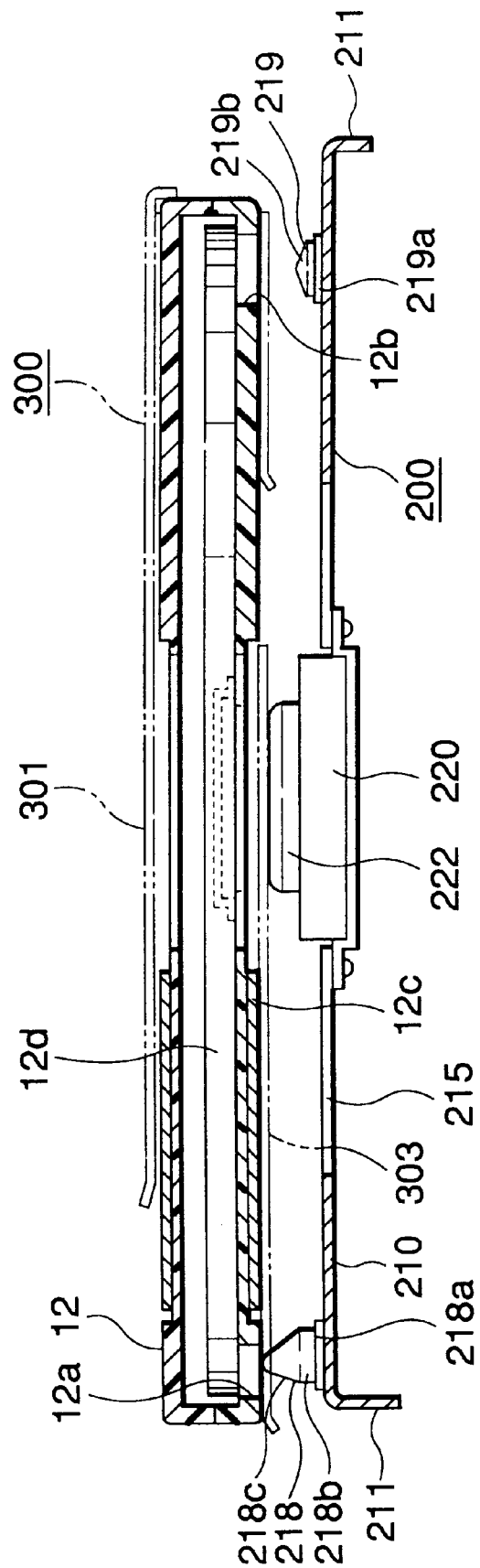
FIG. 33 is a sectional view showing a state that the disc cartridge has been completely inserted in the medium holder and a guide shaft is about to be inserted into a positioning hole.
Figure 34:
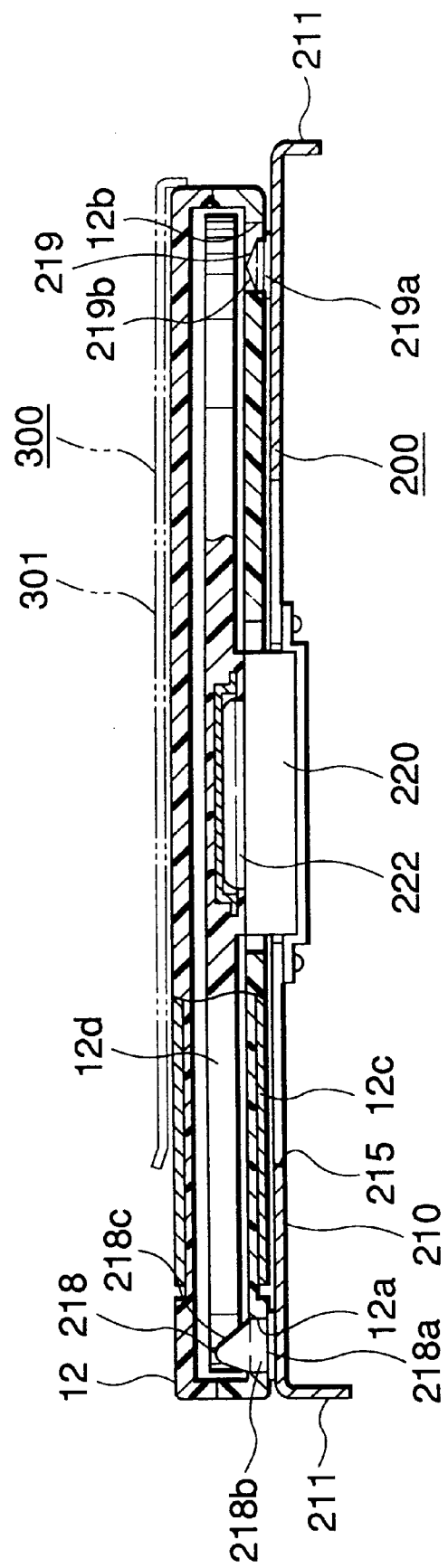
FIG. 34 is a sectional view showing a state that the disc cartridge is positioned with respect to the mechanics chassis.
Figure 35:
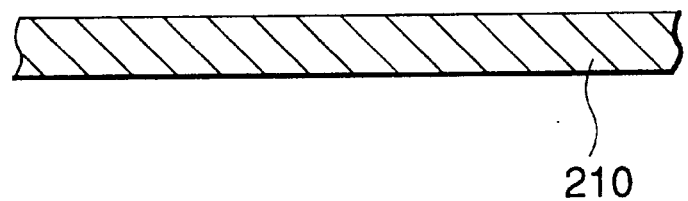
FIG. 35 shows, together with FIGS. 36–39, an example of forming the guide shaft, and is specifically an enlarged sectional view showing a state before a main plate portion of the mechanics chassis is worked.
Figure 36:
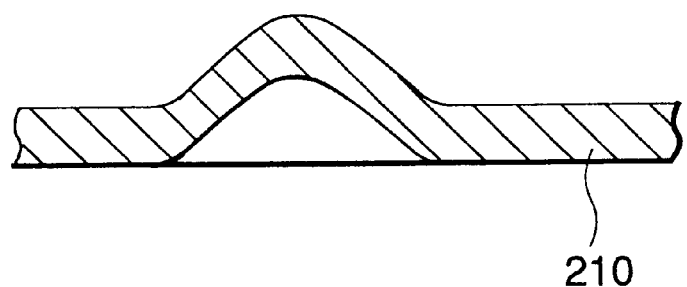
FIG. 36 is an enlarged sectional view showing a state following the state of FIG. 35, that is, a state that a drawing operation has been performed.
Figure 37:
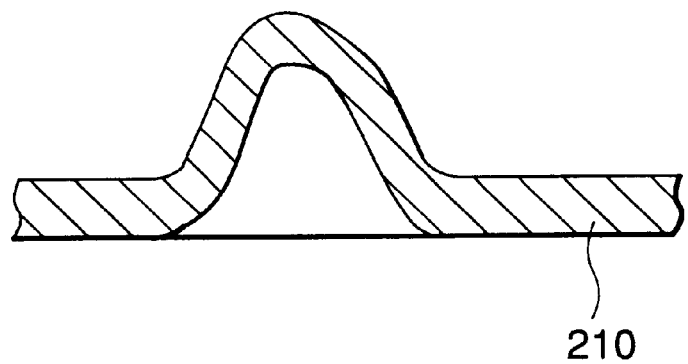
FIG. 37 is an enlarged sectional view showing a state following the state of FIG. 36, that is, a state that another drawing operation has been performed.
Figure 38:
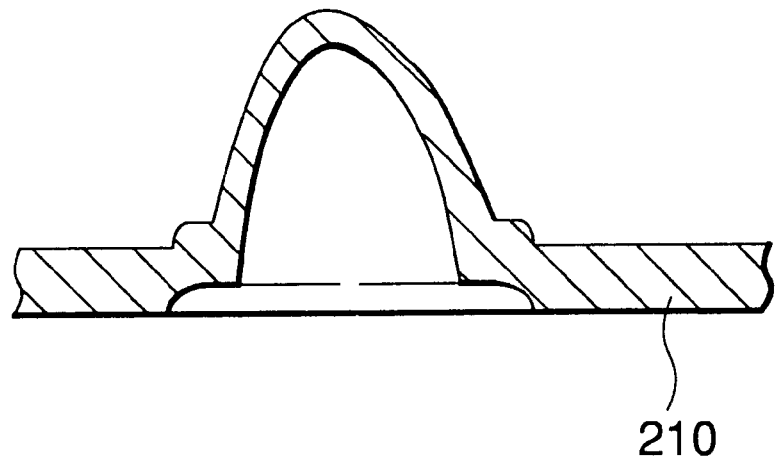
FIG. 38 is an enlarged sectional view showing a state following the state of FIG. 37, that is, a state that a further drawing operation has been performed.
Figure 39:
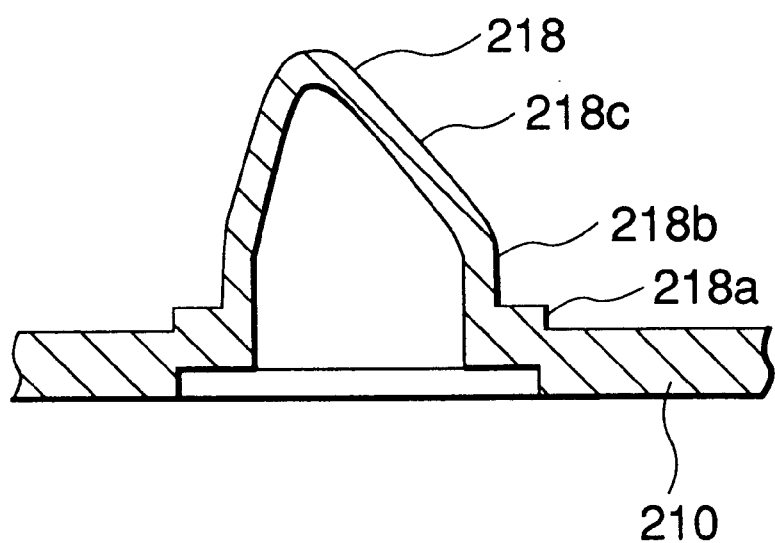
FIG. 39 is an enlarged sectional view showing a state following the state of FIG. 38, that is, a state that still another drawing operation has been performed and the guide shaft has been completed.

In a process that the medium holder 300 holding the disc cartridge 12 reaches the above-mentioned loading position as shown in FIG. 32, first the tip of the conical portion 218c of the guide shaft 218 is relatively inserted into a circular positioning hole 12a serving as a guide hole that is formed in the bottom surface of the disc cartridge 12 as an object to be guided (see FIG. 33). In a process that the medium holder 300 is further lowered, the positioning hole 12a is guided by the conical portion 218c of the guide shaft 218 and is finally engaged with the cylindrical portion 218b (see FIG. 34). At the same time as the positioning hole 12a engages the cylindrical portion 218b, a positioning hole 12b serving as a guide hole that is long in the front-rear direction and is formed in the bottom surface of the disc cartridge 12 at a position opposite to the position of the positioning hole 12a is guided by the positioning portion 219b of the positioning protrusion 219 and is finally engaged with its proximal portion. In this manner, the disc cartridge 12 is positioned with respect to the main plate portion 210 of the mechanics chassis 200.

A shutter 12c of the disc cartridge 12 is opened in the midst of the insertion of the disc cartridge 12 is inserted into the medium holder 300. When the medium holder 300 reaches the loading position, an optical disc 12d of the disc cartridge 12 is placed on and held by the turn table 222.

The above-mentioned guide shaft 218 and positioning protrusion 219 can be formed by press working at the same time as the mechanics chassis 200 is formed by press working. For example, in the case of the guide shaft 218, even the guide shaft 218 having a complex shape can easily be formed by executing several steps of drawing working as shown in FIGS. 35–39 as in the above-described cases of the auxiliary guide rail 233 and the bearing portions 255 and 256. Further, the positional accuracy with respect to the mechanics chassis 200 is higher than in the case of forming the guide shaft by attaching a separate member to the mechanics chassis. This method can easily produce a guide shaft having so complex a shape as to be hard to form by cutting, for instance, a guide shaft in which the axis of a conical portion 218c is inclined as in the case of the guide shaft 218.

The movement of the slider 320 in the ejecting direction, that is, in the backward direction (indicated by arrow B in FIG. 46), is effected through a relay slider 360 that is supported by the left side plate portion 130 of the main chassis 100 so as to be movable in the front-rear direction, by moving backward (indicated by arrow B) an ejection knob 350 that is supported by the left side plate portion of the outer chassis 2 so as to be movable in the front-rear direction as shown in FIG. 1.

The relay slider 360, which is made of a sheet metal material, is supported by the inner surface of the left side plate portion 130 so as to be movable in the front-rear direction and is given forward moving force by a tension coiled spring 361 that is tensely provided between the relay slider 360 and the left side plate portion 130. A press protrusion 362 projects inward from the top periphery of a rear end portion of the relay slider 360. A press piece 363 projects outward from the front periphery of the relay slider 360. The press piece 363 projects to the outside of the left side plate portion 130 through an opening 131 that is long in the front-rear direction and is formed in the left side plate portion 130 of the main chassis 100 as shown in FIG. 3.

Figure 46:
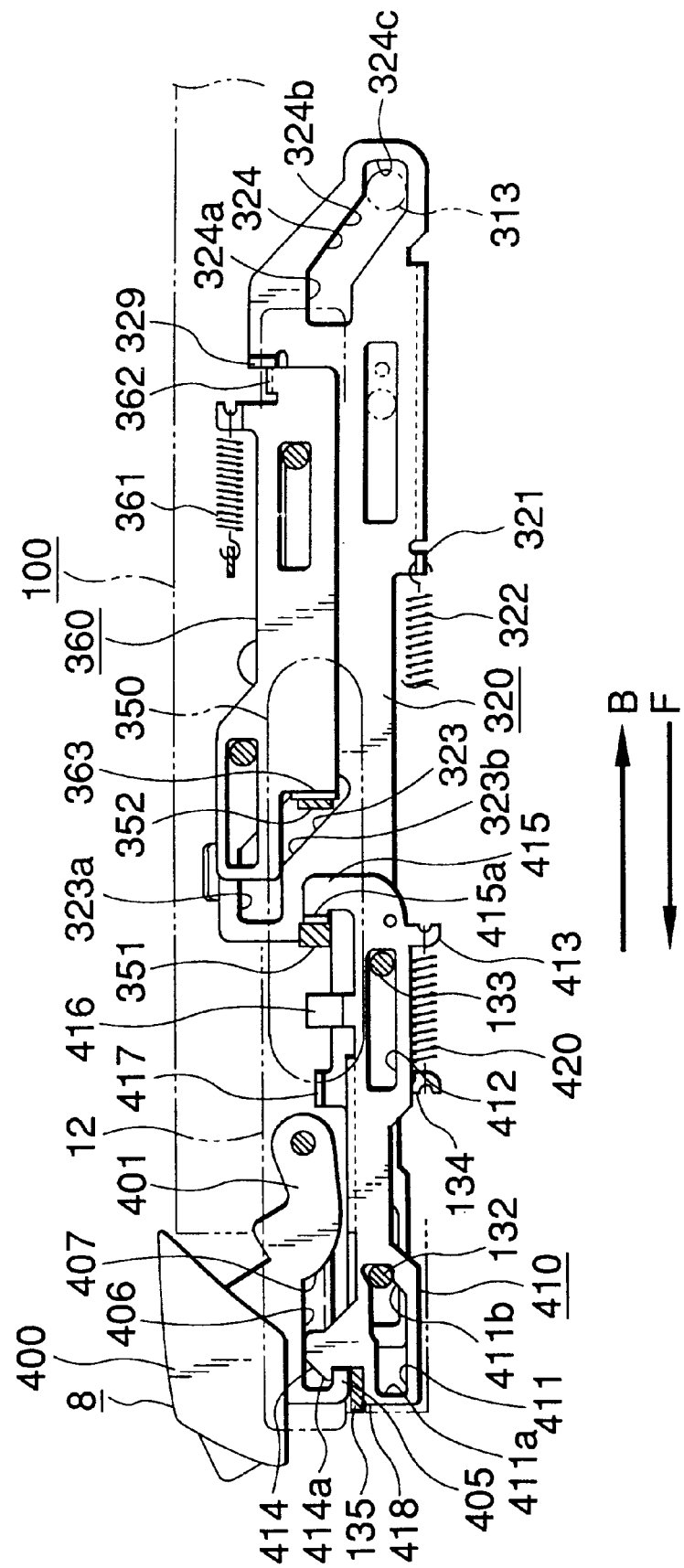
FIG. 46 shows, together with FIGS. 47–51, how respective sliders operate when the disc cartridge is ejected, and is specifically a side view showing a state that the cover body is locked on the lock slider.

Two press protrusions 351 and 352 project from the inner surface of the ejection knob 350 at positions separated in the front-rear direction as shown in FIG. 46, and the rear press protrusion 352 contacts the front face of the press piece 363 of the relay slider 360. A piece 329 to be pressed that projects outward from the top of a portion, close to the rear end, of the slider 320. In a state that the slider 320 is located at the front end of its movable range, that is, the medium holder 300 is located at the loading position, the piece 329 to be pressed contacts the press protrusion 362 of the relay slider 360 from the rear side.

Figure 47:
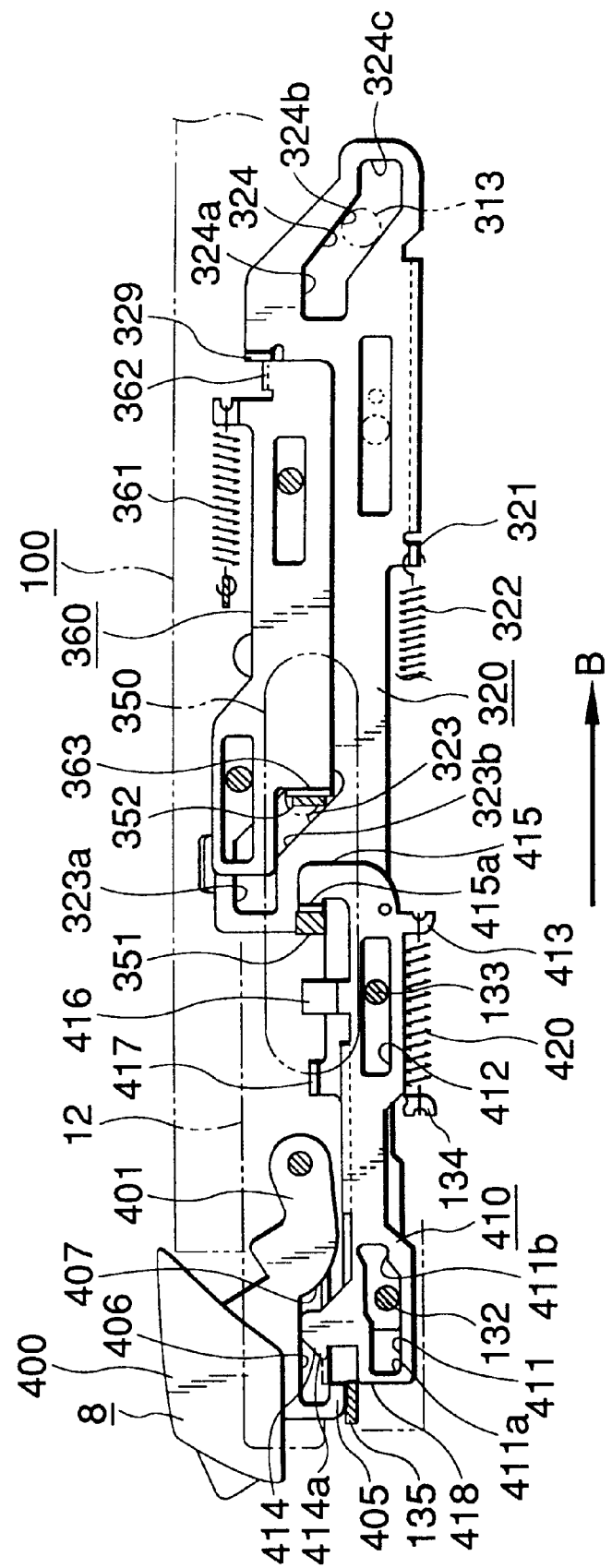
FIG. 47 is a side view showing a state that a manipulation on an ejection knob causes the lock slider and the slider to start moving backward.
Figure 48:
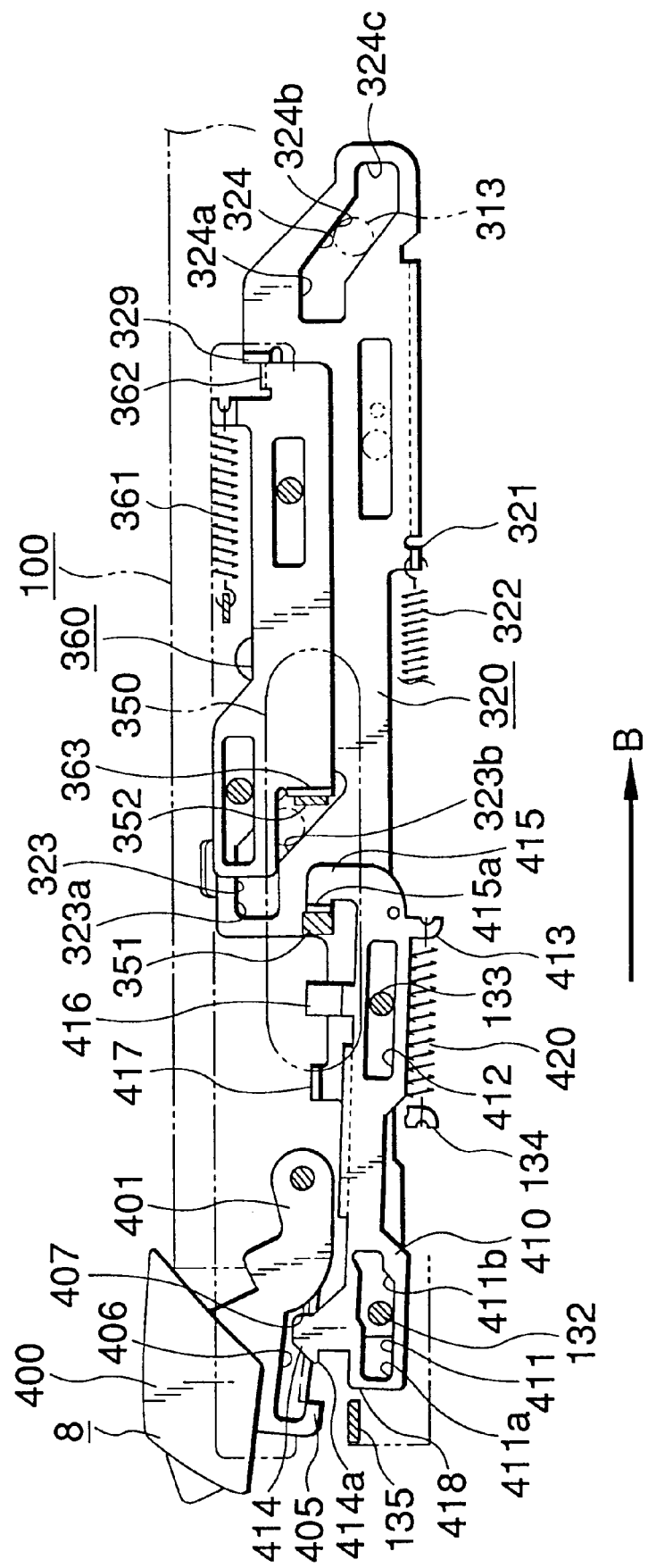
FIG. 48 is a side view showing a state that the lock slider and the slider have further been moved backward and the cover body has been turned slightly.
Figure 49:
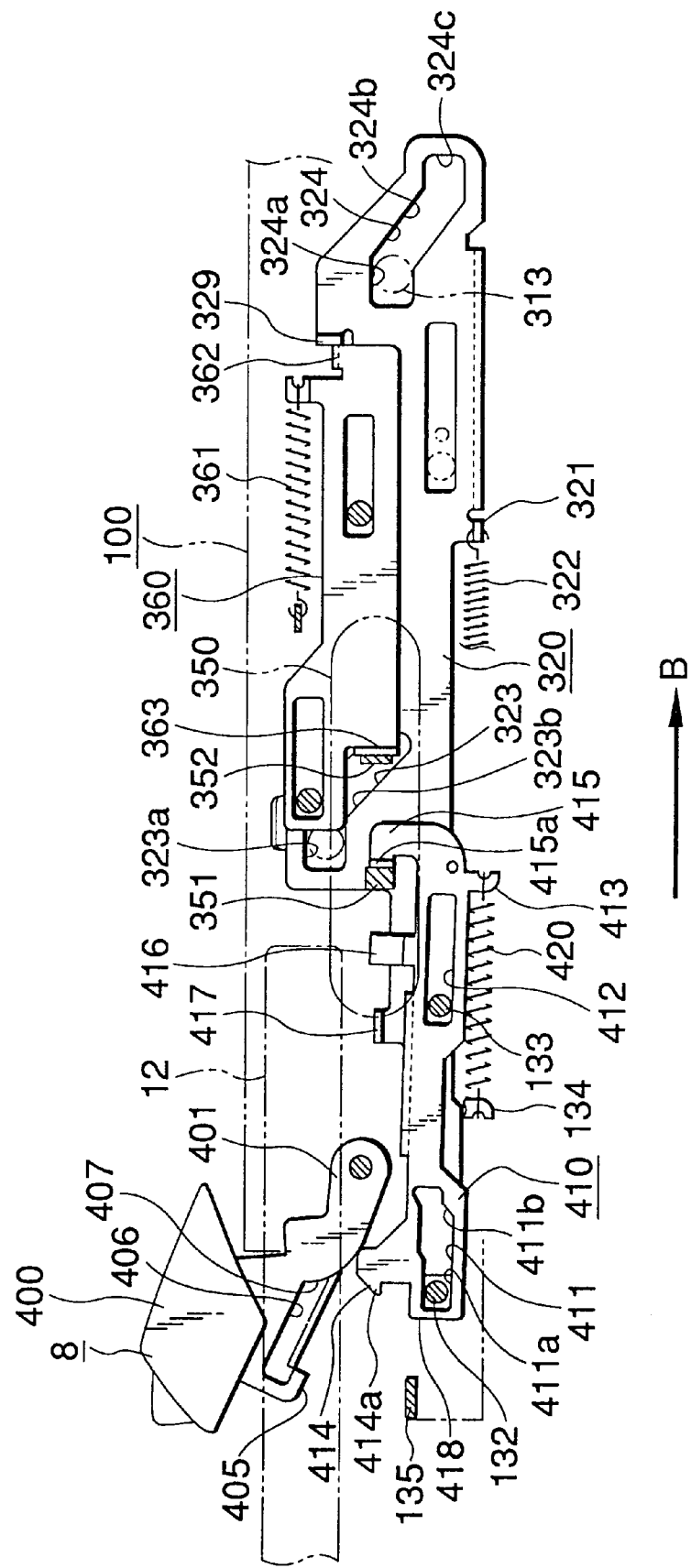
FIG. 49 is a side view showing a state that the lock slider and the slider have been moved to the rear movement ends and the cover body has been opened completely to project the disc cartridge from the apparatus.

The loaded disc cartridge 12 is ejected by moving the ejection knob 350 backward (indicated by arrow B in FIG. 1 or 46). Specifically, when the ejection knob 350 is moved backward (indicated by arrow B), the relay slider 360 is pressed by the press protrusion 352 of the ejection knob 350 and is thereby moved backward as shown in FIGS. 47–49. In turn, the press protrusion 362 of the relay slider 360 presses the piece 329 to be pressed of the slider 320 backward (indicated by arrow B). As a result, the slider 320 is moved backward (indicated by arrow B) and the medium holder 300 is elevated to the unloading position, whereby the disc cartridge 12 is ejected.

Next, opening and closing of the cover body 8 will be described.

Figure 40:
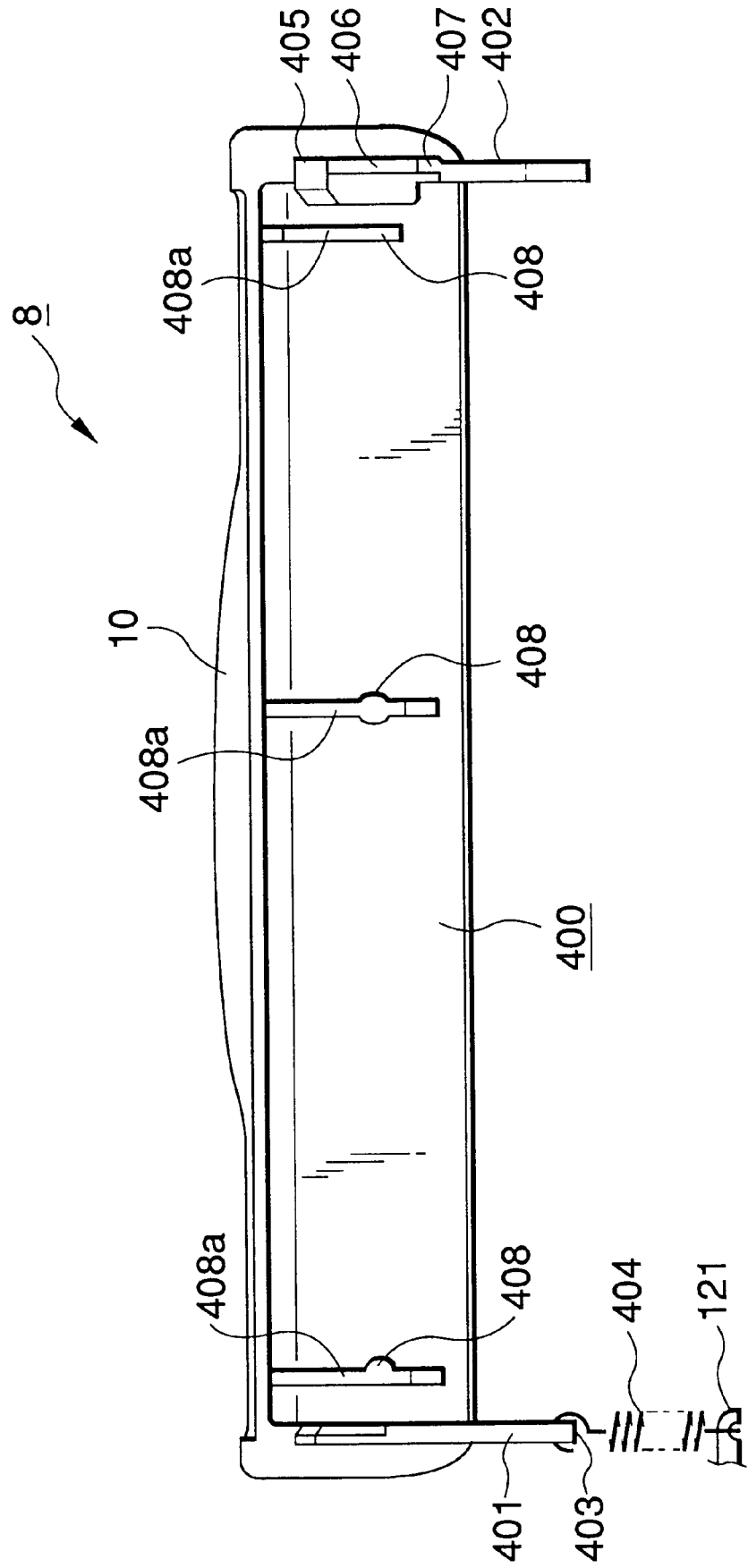
FIG. 40 is an enlarged bottom view of a cover body.

The cover body 8 is rotatably supported by the main chassis 100. As shown in FIG. 40, the cover body 8 is a metal member and is composed of a main portion 400 for closing the opening 7 of the outer chassis 2 and arms 401 and 402 that project approximately backward from left and right side portions of the main portion 400, respectively. Rear end portions of the respective arms 401 and 402 are rotatably supported by front end portions of the left side plate portion 130 and the right side plate portion 120 of the main chassis 100. As shown in FIGS. 4 and 40, a spring hook piece 403 projects backward from the bottom periphery of a portion, close to the rear end, of the right arm 402. A tension coiled spring 404 is tensely provided between the spring hook piece 403 and a spring hook piece 121 that projects from the bottom periphery of a portion, close to the front end, of the right side plate portion 120 of the main chassis 100. In this manner, the cover body 8 is urged counterclockwise (when viewed in FIG. 3 or 41), that is, in the direction of closing the opening 7. The rotational force exerted on the cover body 8 need not be very strong; it is sufficient that the rotational force be strong enough to turn the cover body 8 to the closed position for closing the opening 7.

An engagement piece 405 serving as a portion to be locked projects from the bottom periphery of a front end portion of the left side surface of the left arm 401. The left arm 401 is also formed with a press face 406 that faces the bottom side and is located above the engagement piece 405. The left arm 401 is further formed with a face 407 to be pressed that is continuous with the rear end of the press face 406, faces the bottom side, and is inclined so as to go down toward the rear side.

Three ribs 408 project from the inner surface of the main portion 400 approximately at the same intervals in the right-left direction. Bottom peripheries 408a of the respective ribs 408 are peripheries to be pressed.

Figure 41:
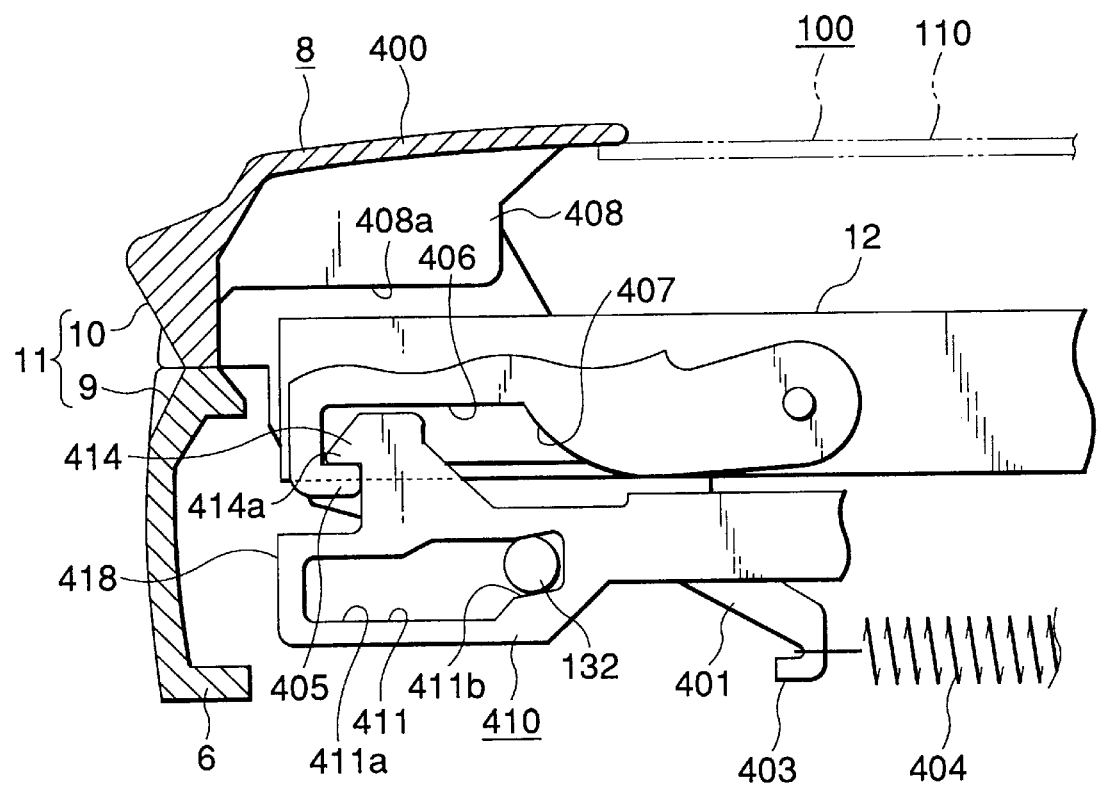
FIG. 41 shows, together with FIGS. 42–45, a cover body opening/closing mechanism, and is specifically an enlarged, partially sectional, side view showing a state that the cover body is locked.

As shown in FIGS. 41–54, a lock slider 410 is supported by the inner surface of the left side plate portion 130 of the main chassis 100 so as to be movable in the front-rear direction. The lock slider 410 is supported so that it can be moved in the front-rear direction (indicated by arrows F and B in FIG. 46) by support pins 132 and 133 that are planted in the left side plate portion 130 and inserted in elongated holes 411 and 412 that are formed in the lock slider 410. As shown in FIG. 41, the front elongated hole 411 consists of a front portion 411a and a rear portion 411b that is continuous with the rear end of the front portion 411a. The rear portion 411b is located slightly above the front portion 411a.

As shown in FIG. 46, a spring hook piece 413 projects from the bottom periphery of a rear portion of the lock slider 410. A tension coiled spring 420 is tensely provided between the spring hook piece 413 and a spring hook piece 134 that projects from the bottom periphery of the left side plate portion 130 of the main chassis 100. In this manner, the lock slider 410 is urged by forward (indicated by arrow F in FIG. 46) moving force. Therefore, the lock slider 410 is located at the front end of its movable range when no backward (indicated by arrow B in FIG. 46) moving force is applied thereto.

A front end portion of the lock slider 410 is provided with a lock piece 414 serving as a lock portion for locking the cover body 8. The lock piece 414 projects upward from the top periphery of the front end portion of the lock slider 410. A lock nail 414a projects forward from a top portion of the lock piece 414.

As shown in FIG. 46, a piece 415 to be pressed projects upward from a rear end portion of the lock slider 410, and a portion 415a to be pressed is formed at the front end of the piece 415 to be pressed. Further, a stopper piece 416 projects upward from the top periphery of the lock slider 410 at a position that is somewhat deviated to the front side from the rear end. A stopper piece 417 projects outward with respect to the apparatus 1, that is, leftward, from the top periphery of the slider 320 at a position close to the front end.

As shown in FIG. 4 or 46, a temporary stop piece 135 projects inward, that is, rightward, from a front end portion of the left side plate portion 130 of the main chassis 100.

In a state that the medium holder 300 is located at the loading position, the cover body 8 is locked at the closed position for closing the opening 7. That is, as shown in FIGS. 41 and 46, the slider 320 is located at the front end of its movable range and the relay slider 360 and the lock slider 410 are also located at the front ends of their movable ranges (i.e., the ends when they have moved in the direction indicated by arrow F in FIG. 46). The ejection knob 350 is also located at the front end of its movable range, receiving the moving force exerted on the relay slider 360 via the piece 363 to be pressed of the relay slider 360 and the press protrusion 352. In the state that the lock slider 410 is located at the front end of its movable range, a rear end portion 411b of the front elongated hole 411 of the lock slider 410 engages the support pin 132 and the lock nail 414a of the lock piece 414 engages the engagement piece 405 of the cover body 8. In this manner, the cover body 8 is locked at the closed position for closing the opening 7 in the state that the medium holder 300 is located at the loading position and the optical disc in the disc cartridge 12 is mounted on the turn table 222.

As described above, in the state that the disc cartridge 12 is loaded, the lock nail 414a of the lock slider 410 engages the engagement piece 405 of the cover body 8. Since the cover body 8 is thereby locked at the closed position, the cover body 8 does not accidentally turn to the open position, that is, clockwise in FIGS. 41 and 46.

In the state that the medium holder 300 is located at the loading position, the piece 329 to be pressed of the slider 320 is located behind the press protrusion 362 of the relay slider 360 and is adjacent to or in contact with it, the piece 363 to be pressed of the relay slider 360 is located behind the press protrusion 352 of the ejection knob 350 and is adjacent to or in contact with it, the portion 415a to be pressed of the lock slider 410 is located behind and is in contact with the press protrusion 351 of the ejection knob 350, and the stopper piece 416 of the lock slider 410 is located behind and is adjacent to the stopper piece 417 of the slider 320.

To eject the disc cartridge 12 from the apparatus 1, a user of the apparatus 1 moves, with his finger or the like, the ejection knob 350 backward (indicated by arrow B in FIG. 1 or 46).

Figure 42:
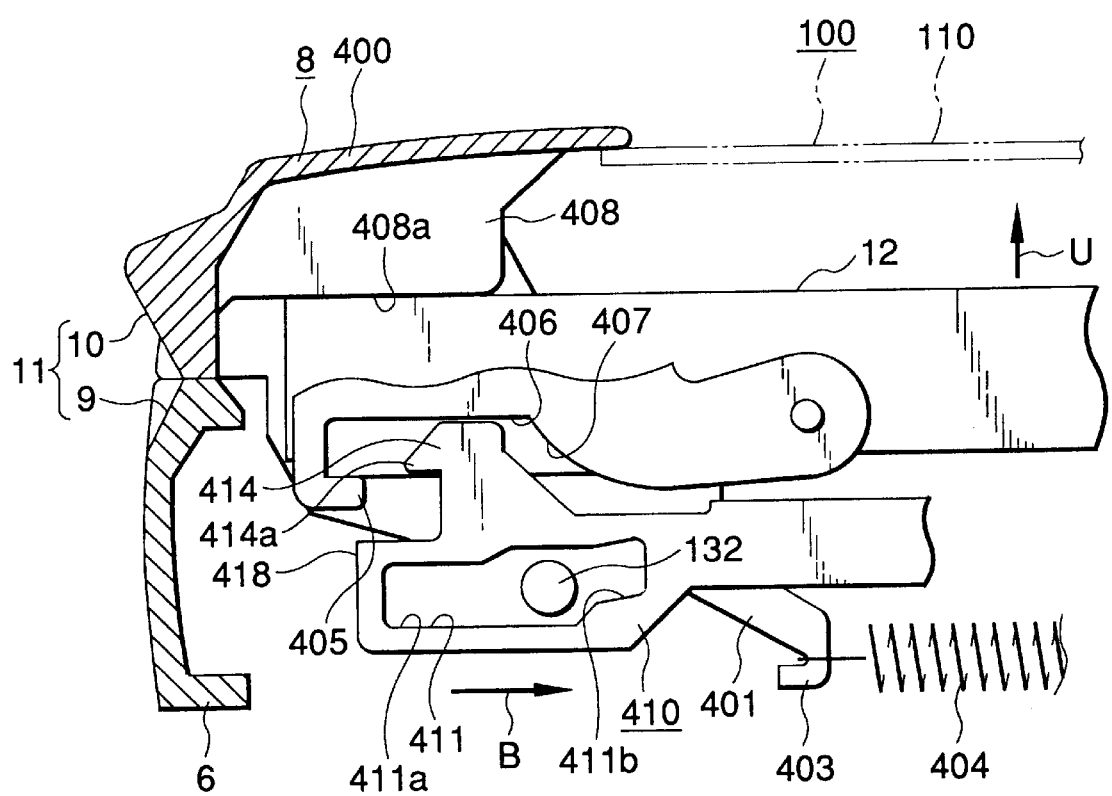
FIG. 42 is an enlarged, partially sectional, side view showing a state that a lock slider has been moved backward to cancel locking of the cover body and the disc cartridge has been elevated to contact peripheries to be pressed of the cover body.

When the ejection knob 350 is manipulated so as to move backward (indicated by arrow B in FIG. 1) by the user, the press protrusion 352 presses the piece 363 to be pressed of the relay slider 360 backward (indicated by arrow B in FIG. 46) to thereby move the relay slider 360 backward (indicated by arrow B). Further, the press protrusion 351 of the ejection knob 350 presses the portion 415a to be pressed of the lock slider 410 backward to thereby move the lock slider 410 backward (indicated by arrow B). As a result, as shown in FIGS. 42 and 47, the lock nail 414a of the lock slider 410 escapes backward from the engagement piece 405 of the cover body 8, whereby the locking at the position for closing the opening 7 of the cover body 8 is canceled. During the above course, the medium holder 300 is moved to the unloading position and the disc cartridge 12 is ejected by the ejection lever 340 from the apparatus 1 via the holder 300 and the opening 7.

When the disc cartridge 12 is ejected, the cover body 8 is turned clockwise against the resilient force of the tension coiled spring 404 that rotationally urges the cover body 8, so as to open the opening 7.

Figure 43:
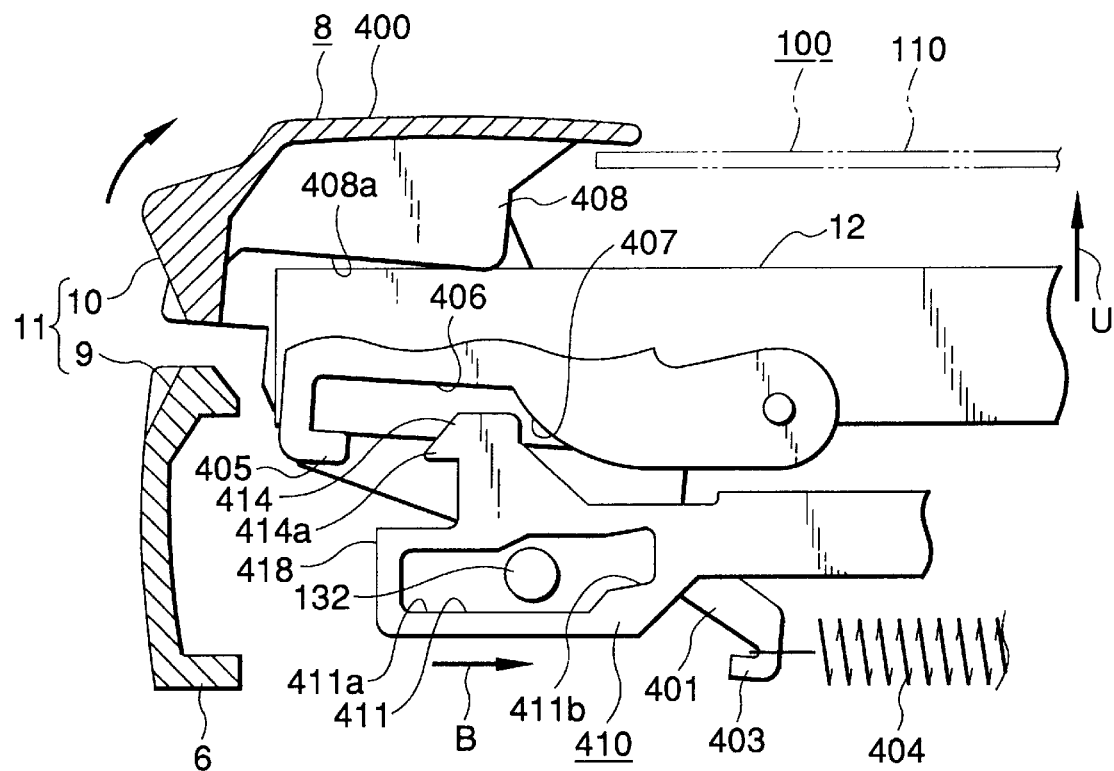
FIG. 43 is an enlarged, partially sectional, side view showing a state that the lock slider has further been moved backward and the disc cartridge has further been elevated to press the peripheries to be pressed of the cover body, to thereby turn the cover body.
Figure 44:
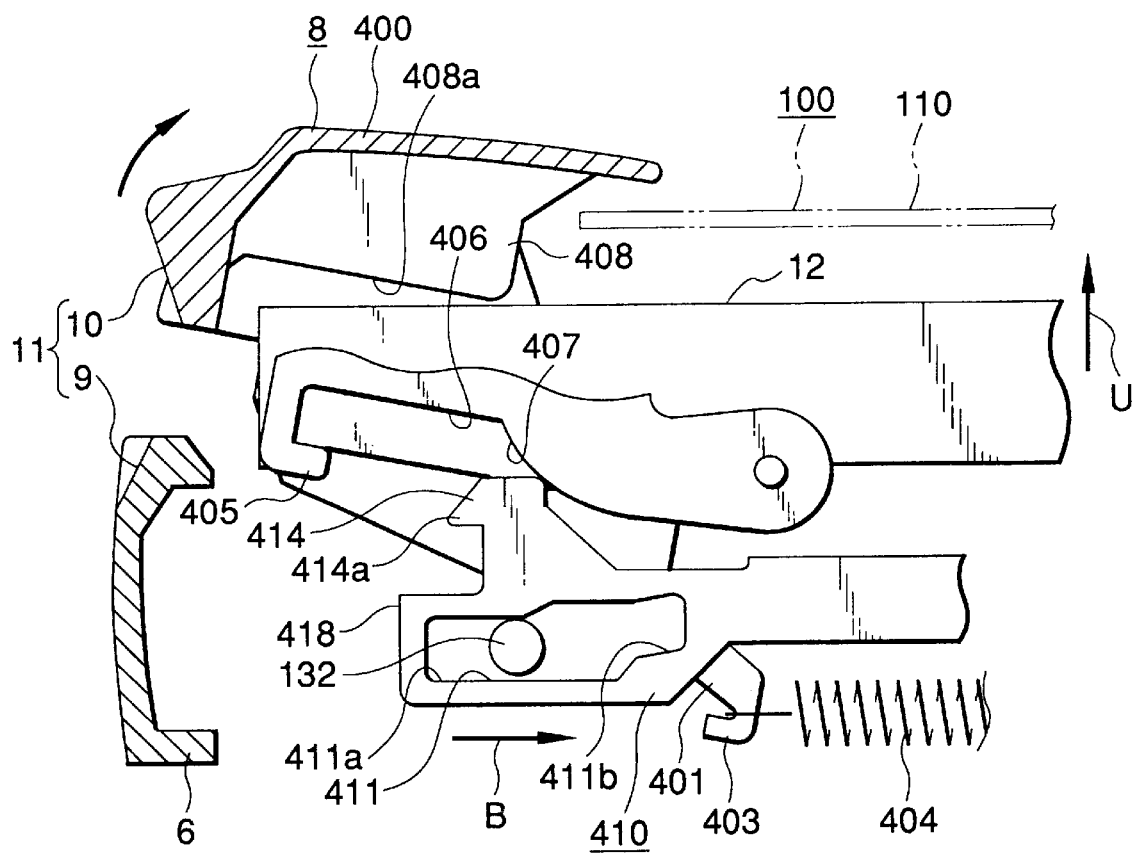
FIG. 44 is an enlarged, partially sectional, side view showing a state that the lock slider has further been moved backward, whereby a face to be pressed of the cover body is pressed by a lock piece and the cover body is further turned.

As the medium holder 300 is elevated toward the unloading position, the bottom peripheries, that is, the peripheries 408a to be pressed, of the respective ribs 408 of the cover body 8 is pressed upward by the disc cartridge 12 that is held by the medium holder 300 as shown in FIGS. 43 and 48, whereby the cover body 8 is turned toward the open position for opening the opening 7, that is, turned clockwise.

Figure 45:
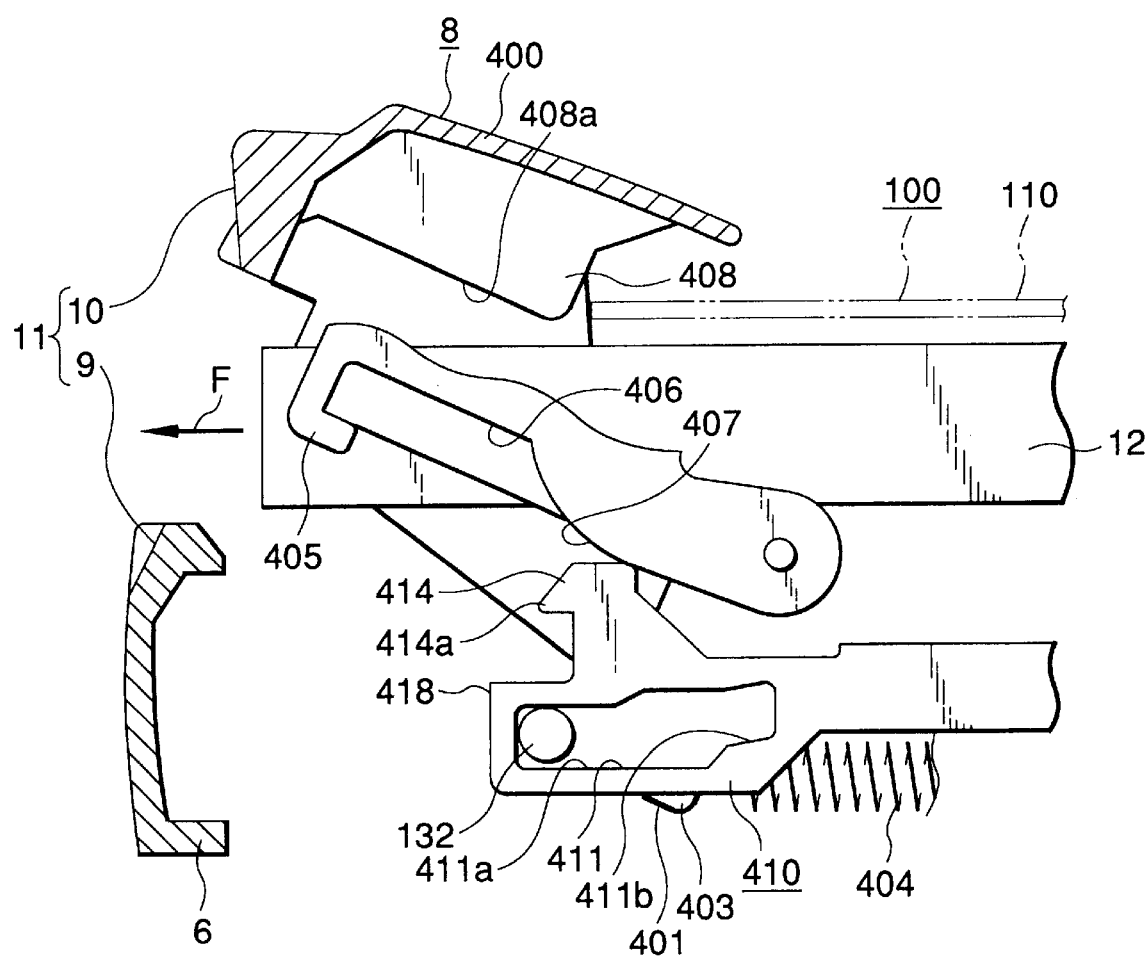
FIG. 45 is an enlarged, partially sectional, side view showing a state that the lock slider has further been moved backward, whereby the cover body is completely opened.

When the cover body 8 has been opened to some extent, the rear end of the top periphery of the lock piece 414 of the lock slider 410 that is in the midst of moving backward (indicated by arrow B in FIG. 44) butts against the face 407 to be pressed of the cover body 8. As the lock slider 410 further moves backward (indicated by arrow B in FIG. 44), the rear end of the top periphery of the lock piece 414 presses the face 407 to be pressed as shown in FIGS. 45 and 49, whereby the cover body 8 is turned to the open position. Therefore, in this case, the lock slider 410 functions as a pressing means and the lock piece 414 functions as a press portion. As a result, part of the disc cartridge 12 is projected to the outside of the opening 7 by the ejection lever 340.

As described above, when the disc cartridge 12 is ejected, first the cover body 8 is turned halfway by the rising disc cartridge 12 and then it is turned by the action that the lock piece 414 presses the face 407 to be pressed. With this configuration, the load imposed on the disc cartridge 12 can be reduced and the disc cartridge 12 can be ejected smoothly without increasing the size of the apparatus.

When the force of pressing the ejection knob 350 backward (indicated by arrow B in FIG. 1) is removed, that is, when the user removes his finger from the ejection knob 350, the ejection knob 350 is returned to the front end of its movable range, receiving the forward moving force of the tension coiled spring 361 that urges the relay slider via the piece 363 to be pressed of the relay slider 360 and the press protrusion 352 of the ejection knob 350.

Figure 50:
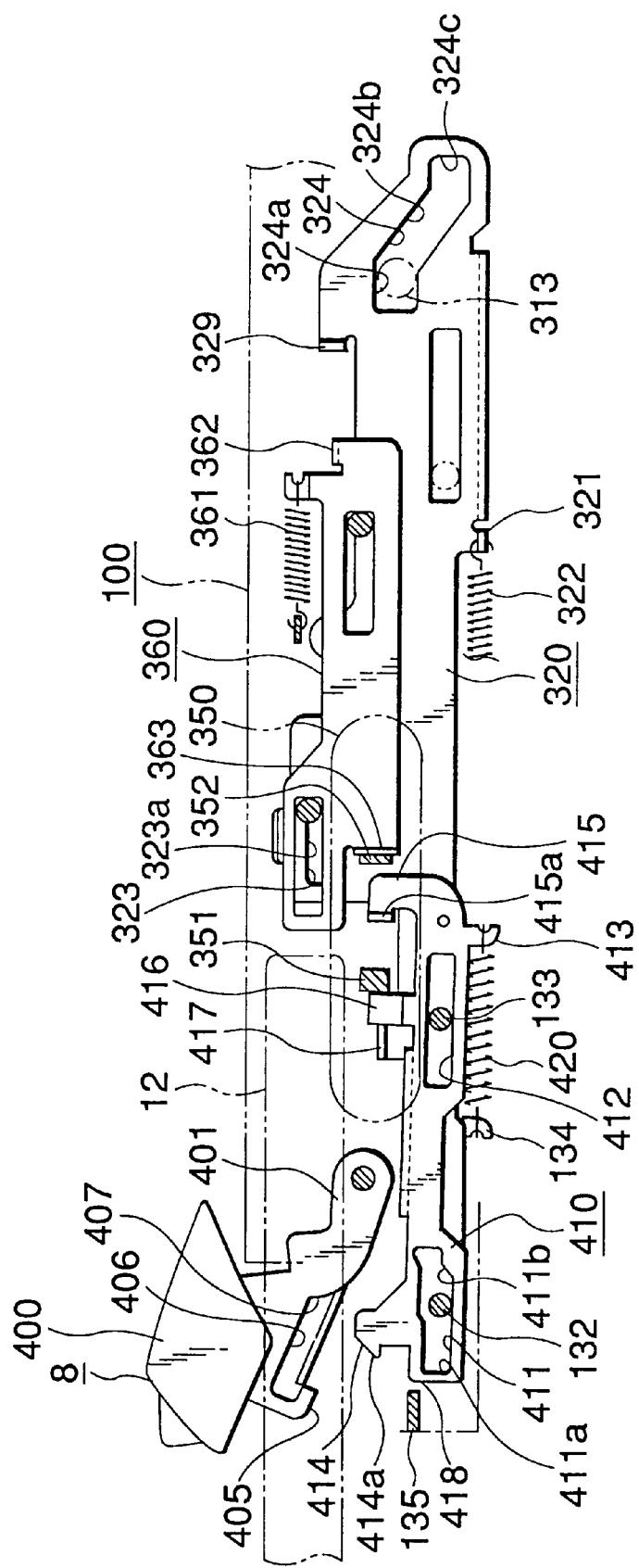
FIG. 50 is a side view showing a state that the manipulation on the ejection knob has been canceled and the lock slider and a relay slider have been moved forward.

As the ejection knob 350 moves toward the front end of its movable range (i.e., the end in the direction indicated by arrow F in FIG. 1 or 46), since its press protrusion 351 separates forward from the portion 415a to be pressed of the lock slider 410, the lock slider 410 is moved forward (indicated by arrow F in FIG. 46) by the pulling force of the tension coiled spring 420. However, since the slider 320 is still locked so as to keep the state that it is located at the rear end of its movable range (i.e., the end in the direction indicated by arrow B in FIG. 46), its stopper piece 417 has been moved backward (indicated by arrow B in FIG. 46) and the stopper piece 416 of the lock slider 410 that is returning forward (indicated by arrow F in FIG. 46) butts against the stopper piece 417 of the slider 320 halfway and is therefore prevented from further moving forward as shown in FIG. 50. Therefore, in this case, the slider 320 functions as a stopping means for preventing movement of the lock slider 410 and the stopper piece 417 functions as a stopper portion.

Figure 51:
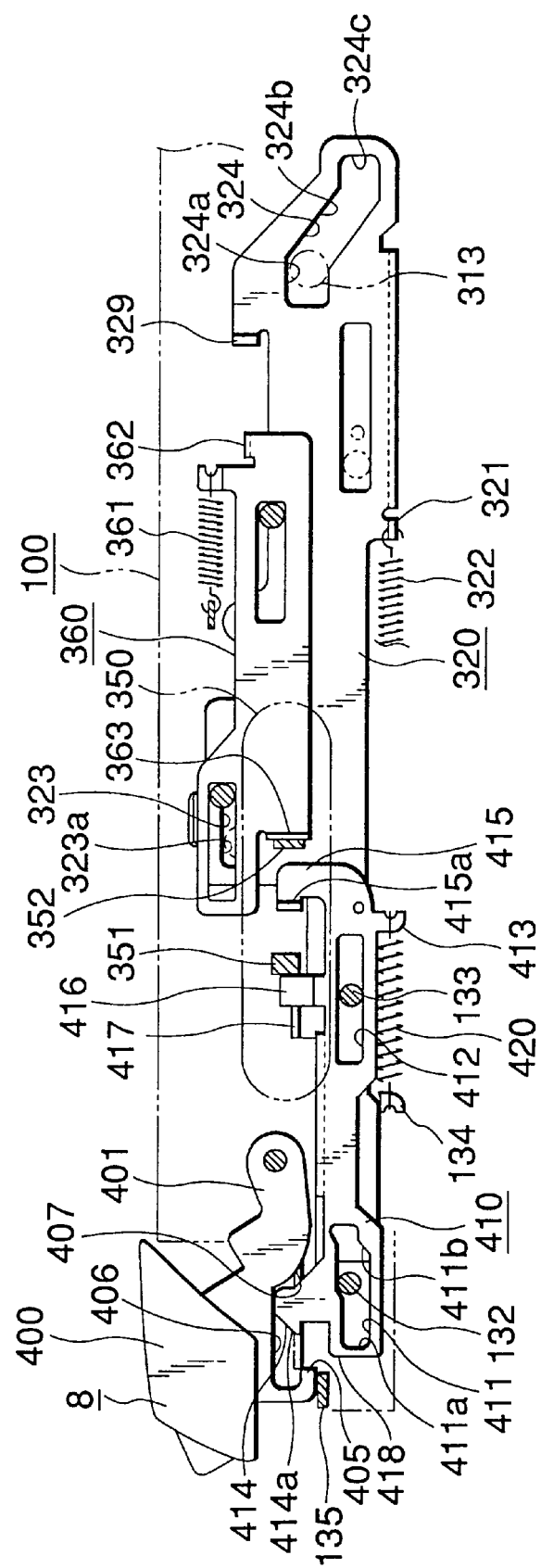
FIG. 51 is a side view showing a state that the disc cartridge has been removed and the cover body is closed.

As shown in FIG. 50, in the state that the stopper piece 416 of the lock slider 410 contacts the stopper piece 417 and the lock slider 410 is prevented from further moving forward, the lock piece 414 of the lock slider 410 is located in front of the face 407 to be pressed of the cover body 8. Therefore, when the disc cartridge 12 has been removed from the playback apparatus 1, there remains no member for holding the cover body 8 at the open position and hence the cover body 8 is turned toward the closed position by the rotational force of the tension coiled spring 404 that urges the cover body 8 as shown in FIG. 51. The opening 7 of the outer chassis 2 is thus closed.

Figure 52:
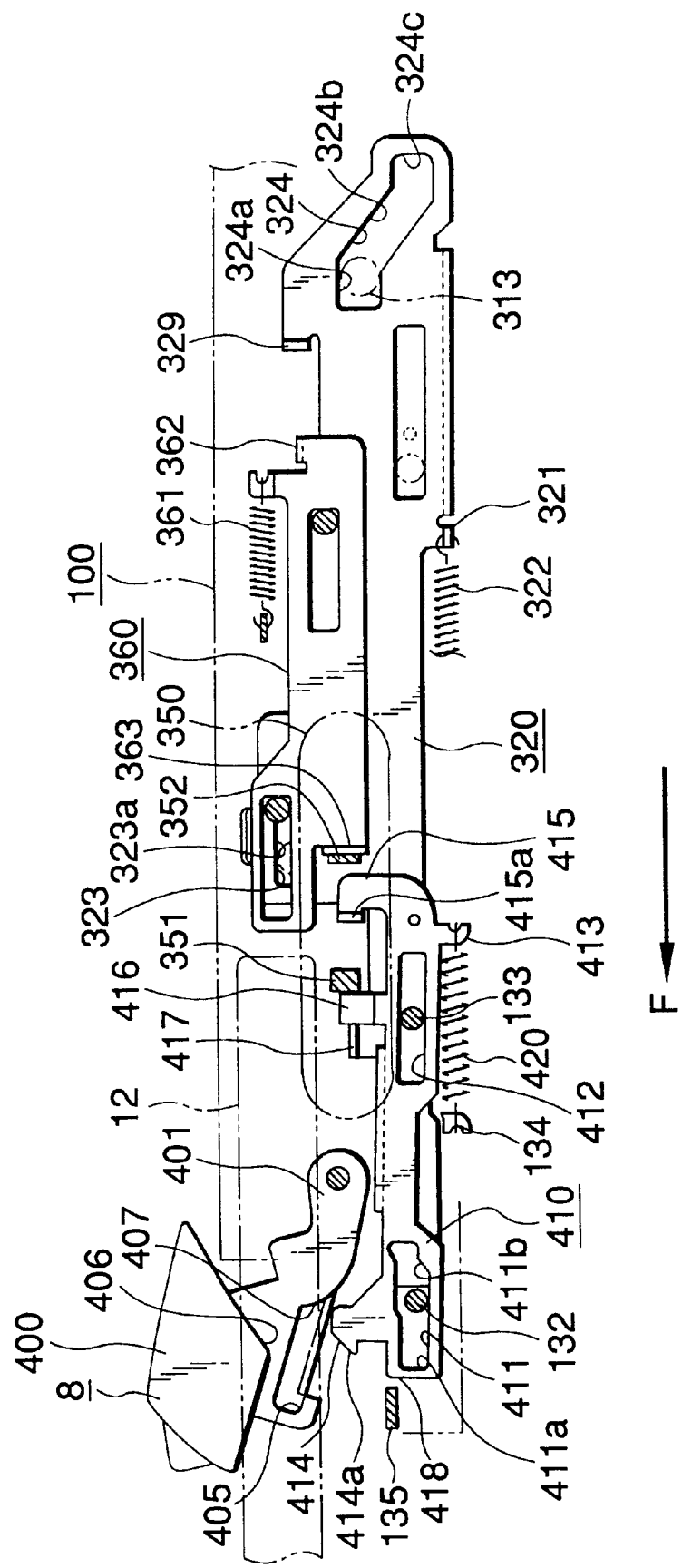
FIG. 52 shows, together with FIGS. 53 and 54, how the respective sliders operate when the disc cartridge is inserted, and is specifically a side view showing a state that the disc cartridge is inserted and the cover body is opened.

In a state that the disc cartridge 12 has been ejected, as described above, the medium holder 300 is located at the waiting position and the cover body 8 is located at the closed position receiving only the urging force of the tension coiled spring 404 as shown in FIG. 51. Therefore, when the insertion tip of the disc cartridge 12 is inserted into the insertion recess 11 and the disc cartridge 12 is further pushed in, the slant face of the cover body 8 is pushed by the above pushing force, that is, the cover body 8 receives rotational force toward the open position as shown in FIG. 52. As a result, the opening 7 is opened and the disc cartridge 12 is inserted into the apparatus 1 through the opening 7.

After the insertion of the disc cartridge 12 into the apparatus 1 has been almost completed, as described above, the disc cartridge 12 is automatically pulled into the apparatus 1. The cover body 8 is moved to the closed position and the disc cartridge 12 is mounted. That is, as the medium holder 300 is lowered, the position of the disc cartridge 12 is determined by the guide shaft 218 and the positioning protrusion 219 and the optical disc in the disc cartridge 12 is mounted on the turn table 222.

A description will now be made of an operation that the cover body 8 is locked at the position for closing the opening 7 in the above process of mounting the disc cartridge 12.

When the disc cartridge 12 is inserted into the medium holder 300 as shown in FIG. 52, the ejection lever 340 is turned by the disc cartridge 12 as described above, whereby the locking of the slider 320 by the stopper periphery 345 of the ejection lever 340 is canceled. As a result, the slider 320 is moved forward (indicated by arrow F in FIG. 52) by the urging force of the tension coiled spring 322 and the medium holder 300 is lowered toward the loading position.

Figure 53:
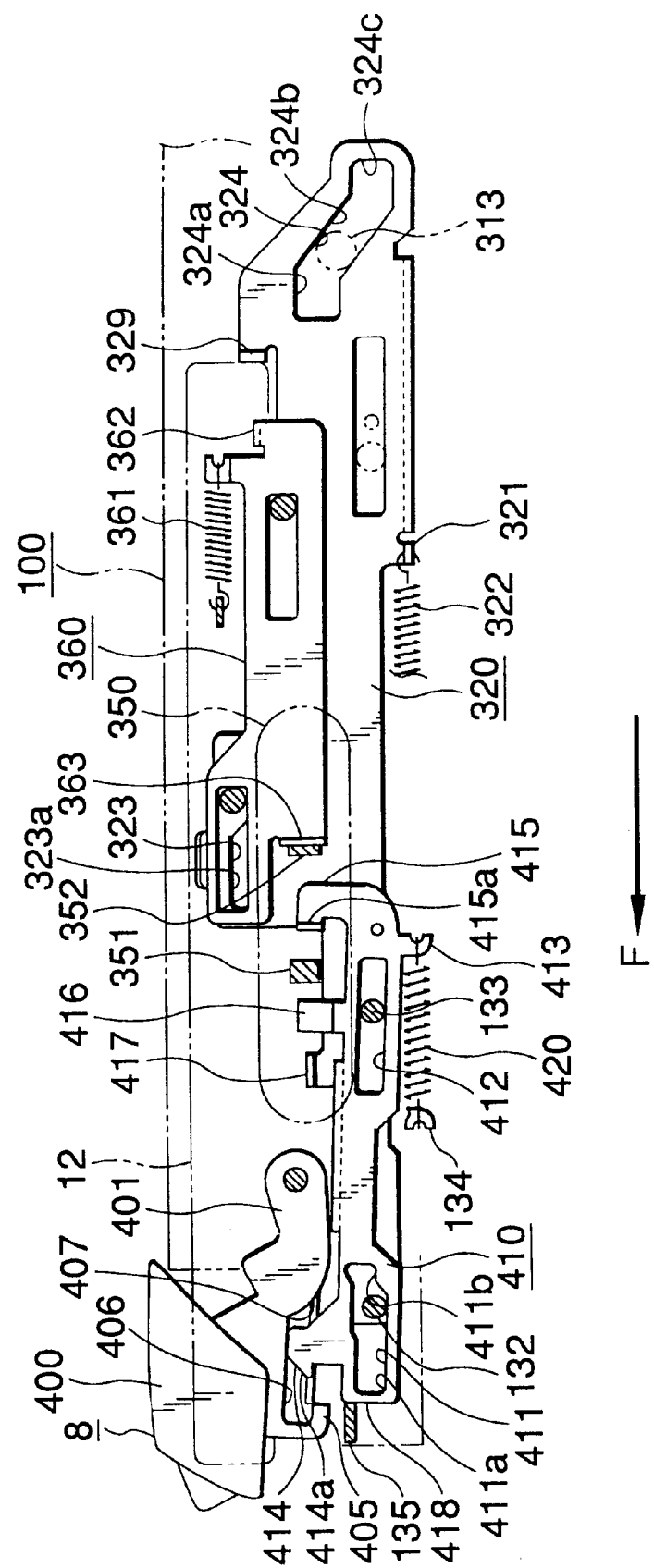
FIG. 53 is a side view showing a state that the disc cartridge has been inserted and the lock slider has been moved forward, whereby the front periphery of the lock slider contacts a temporary stop piece of the main chassis.

As the stopper piece 417 is moved forward (indicated by arrow F in FIG. 52) with the advancement (in the direction indicated by arrow F) of the slider 320, the lock slider 410 is moved forward (indicated by arrow F) by the urging force of the tension coiled spring 420. However, the front elongated hole 411 of the lock slider 410 engages the support pin 132 at the boundary portion between the front portion 411a and the rear portion 411b, and the lock slider 410 is urged by rotational force in a direction of displacing the front end of the lock slider 420 upward, that is, urged clockwise, with the engagement portion between the elongated hole 412 and the support pin 133 serving as a rotation axis because of the position of the spring hook piece 413 that is given the pulling force of the tension coiled spring 420. Therefore, a front periphery 418 of the lock slider 410 butts against the temporary stop piece 135 of the main chassis 100 and is thereby prevented from further moving forward (indicated by arrow F in FIG. 53) as shown in FIG. 53, so that it is located at a position separated from the stopper piece 417 of the slider 320. In this case, the main chassis 100 functions as a stopping means for stopping the lock slider 410 and the temporary stop piece 135 functions as a stopper portion.

Figure 54:
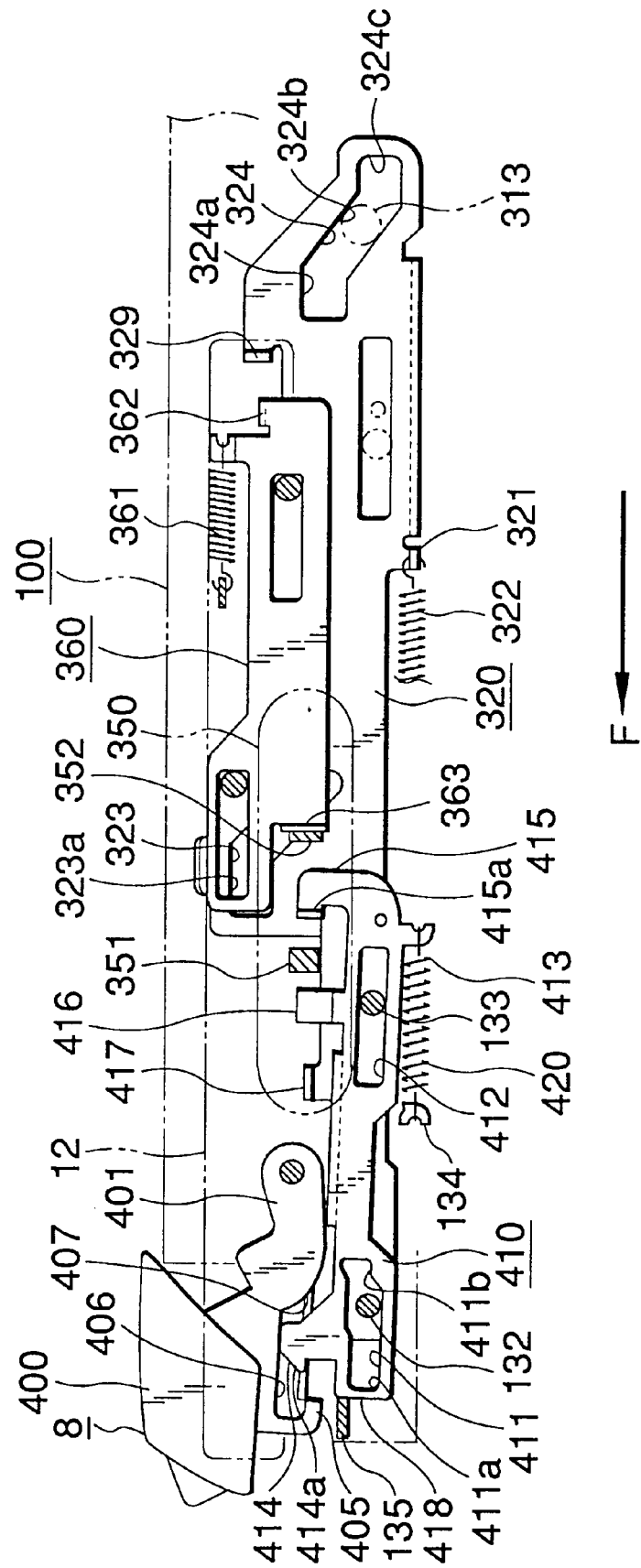
FIG. 54 is a side view showing a state that the cover body has been turned toward the closed position and the lock piece of the lock slider is pressed by a press face of the cover body.

When the disc cartridge 12 is loaded and the cover body 8 is thereby turned toward the closed position, that is, counterclockwise, the press face 406 serving as a canceling portion for canceling the locking of the cover body 8 presses the top periphery of the lock piece 414 of the lock slider 410 downward as shown in FIG. 54, whereby the lock slider 410 is turned so that its front end is moved downward. As a result, the front periphery 418 of the lock slider 410 escapes downward from the temporary stop piece 135 of the main chassis 100, and the lock slider 410 is moved forward (indicated by arrow F in FIG. 54) by the pulling force of the tension coiled spring 420. Then, the lock nail 414a of the lock slider 410 engages the engagement piece 405 of the cover body 8 that is located at the closed position and the cover body 8 is thereby locked at the position for closing the opening 7 as shown in FIG. 46.

Figure 55:
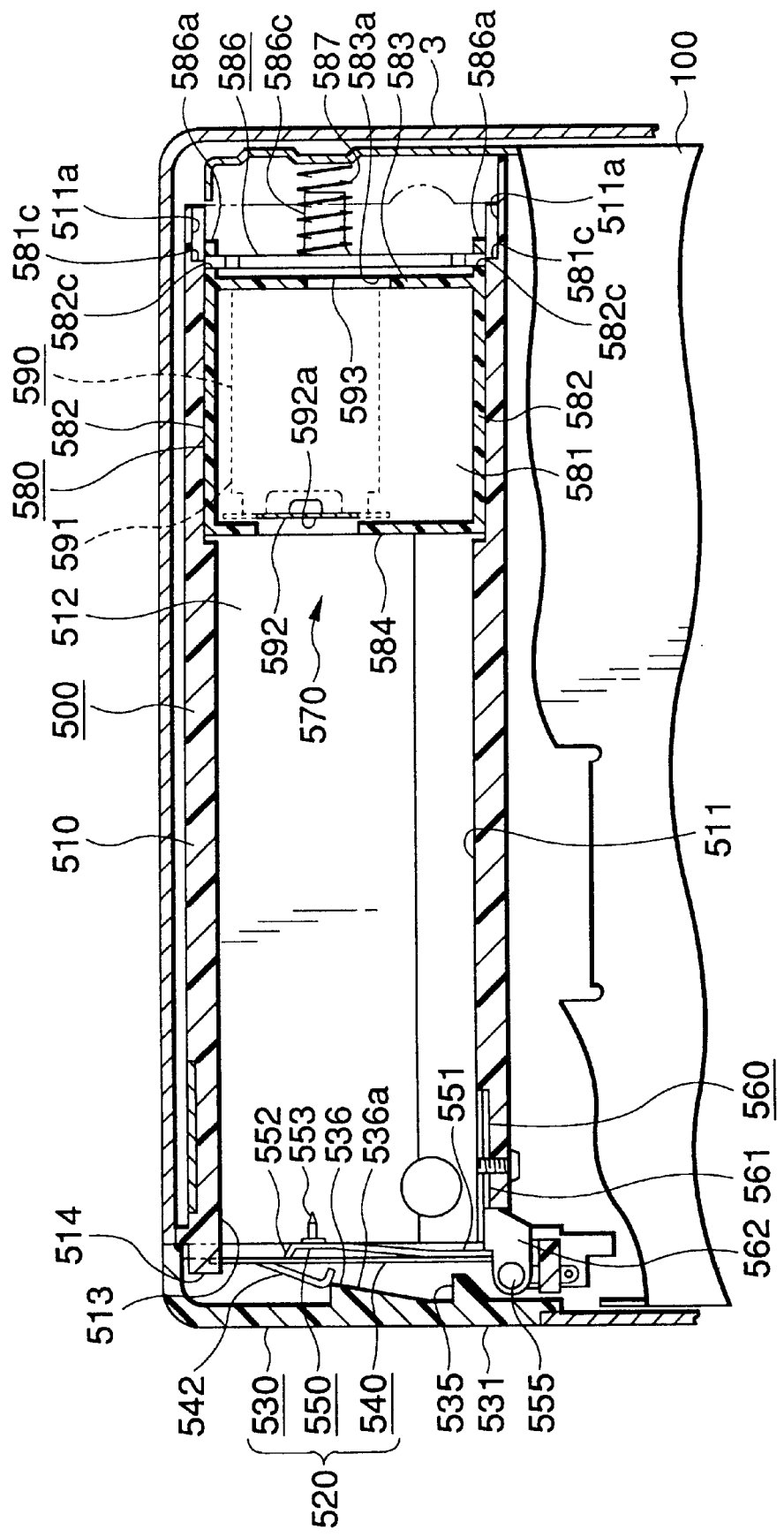
FIG. 55 shows, together with FIGS. 56–62, a battery case, and is specifically an enlarged horizontal sectional view showing a state that the battery case is attached to the main chassis.

As shown in FIG. 55, a battery case 500 as a battery accommodation case for accommodating a battery (described later) is fixed to a rear end portion of the main chassis 100.

Figure 56:
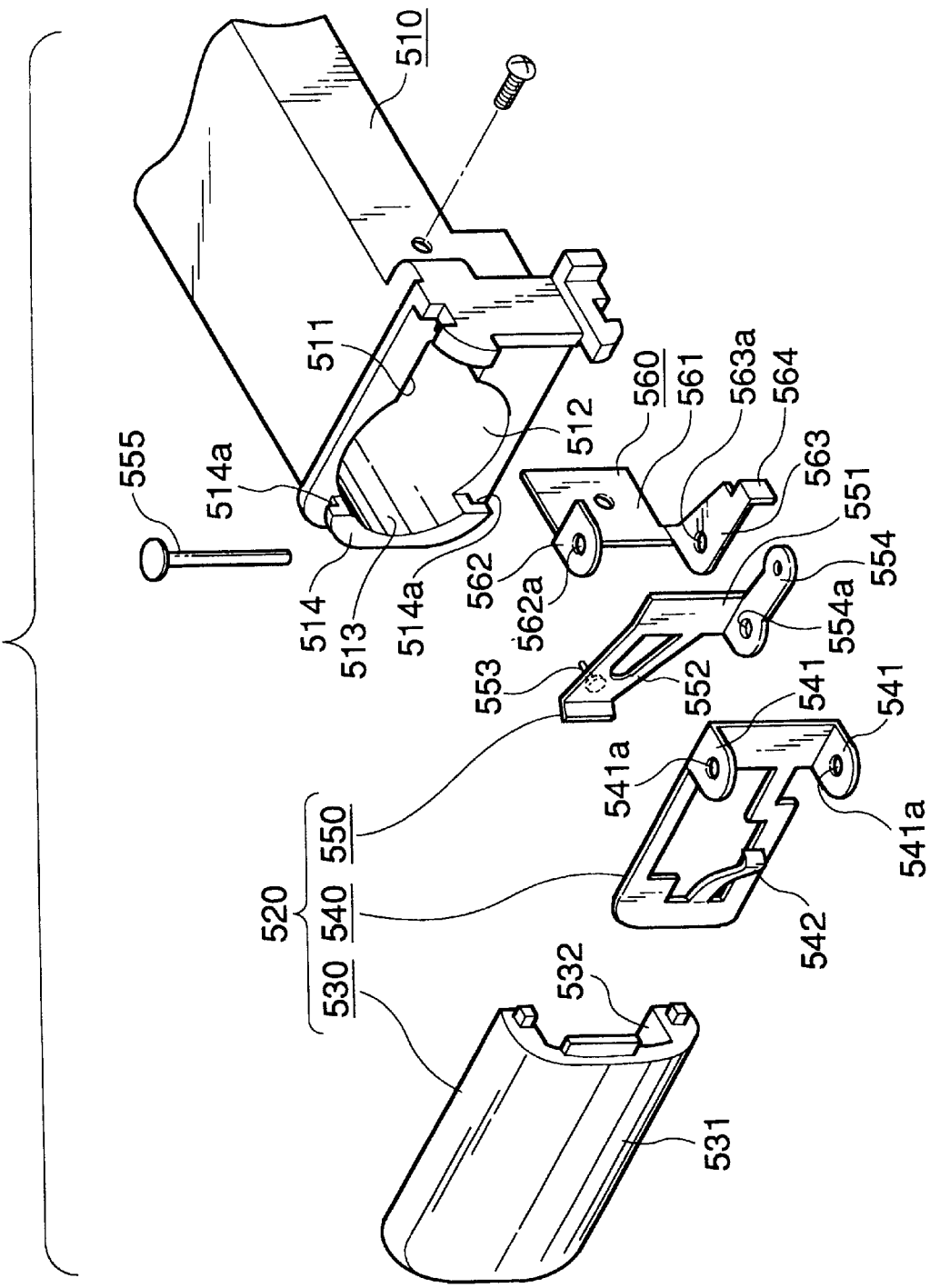
FIG. 56 is an enlarged exploded perspective view showing a lid portion, a supporting point plate, and part of a case main body.

As shown in FIGS. 55 and 56, a case main body 510 is made of an insulating material such as a synthetic resin, and is shaped like a pipe in which the left and right ends are opened. Specifically, the case main body 510 is configured in such a manner that a semi-cylindrical portion is continuous with the bottom surface of a rectangular-pipe-like portion that is thin in the vertical direction and long in the right-left direction. An upper, rectangular-pipe-like first accommodation space 511 and a lower semi-cylindrical second accommodation space 512 as accommodation spaces for accommodating a battery is continuous with each other.

The above-configured case main body 510 is fixed to a rear end portion of the main chassis 100 with vises, for instance.

As shown in FIGS. 1 and 55–58, a right-side opening 513 of the case main body 510 is opened/closed by a lid portion 520. The lid portion 520 is composed of a lid main body 530 made of a synthetic resin, a hinge body 540 made of a conductive material, and a minus contact plate 550 also made of a conductive material. The lid portion 520 is attached to the case main body 510 via a supporting point plate 560 made of a conductive material.

Figure 57:
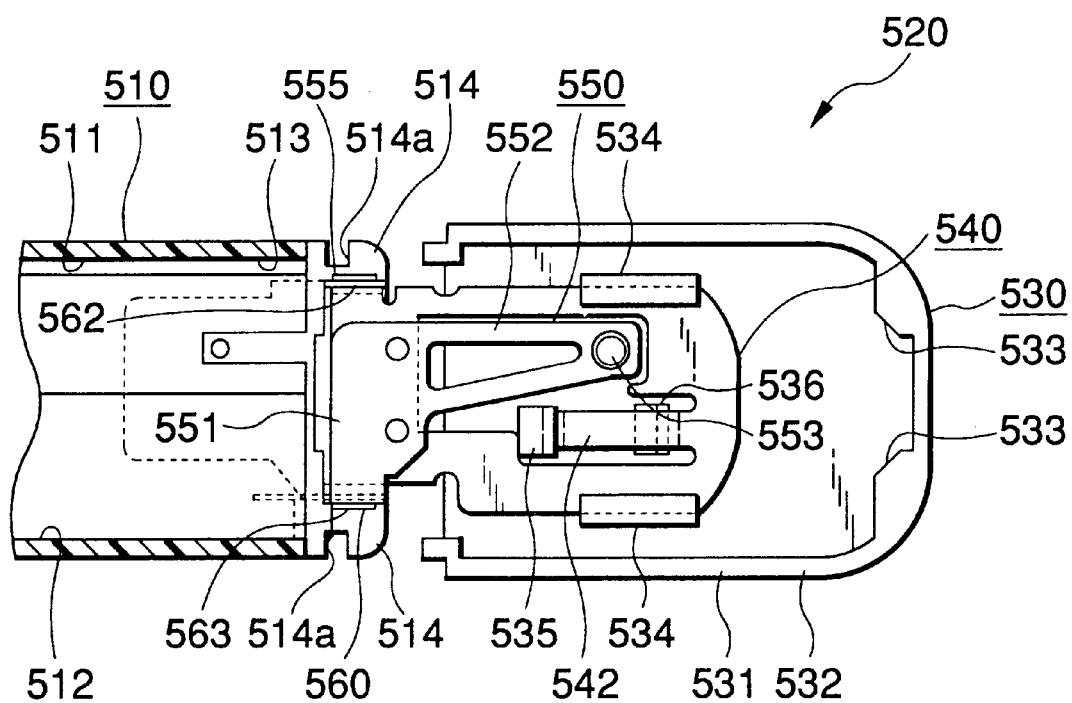
FIG. 57 is an enlarged back view showing a state that the lid portion is opened.

The lid main body 530 is composed of a main portion 531 having approximately the same size as the open end of the case main body 510 and a circumferential wall portion 532 projecting from the circumference of the inner surface of the main portion 531 excluding the front periphery (the portion of the lid portion 520 on this side is called a "proximal portion"). As shown in FIG. 57, two engagement pieces 533 project from the inner surface of top and bottom portions of that portion of the circumferential wall portion 532 which is adjacent to the rear periphery (the portion of the lid portion 520 on this side is called a "tip portion") at positions distant from the main portion 531.

Figure 58:
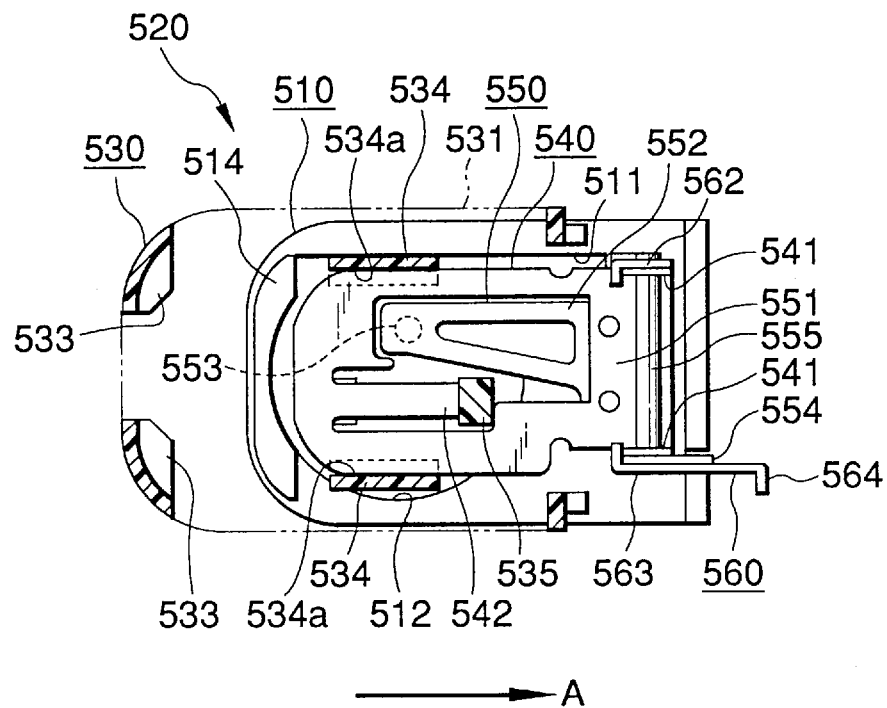
FIG. 58 shows, together with FIG. 59, an operation of locking the lid portion at the closed position, and is specifically an enlarged sectional view showing a state that a lid main body has been moved to a tip portion side with respect to a hinge body.
Figure 59:
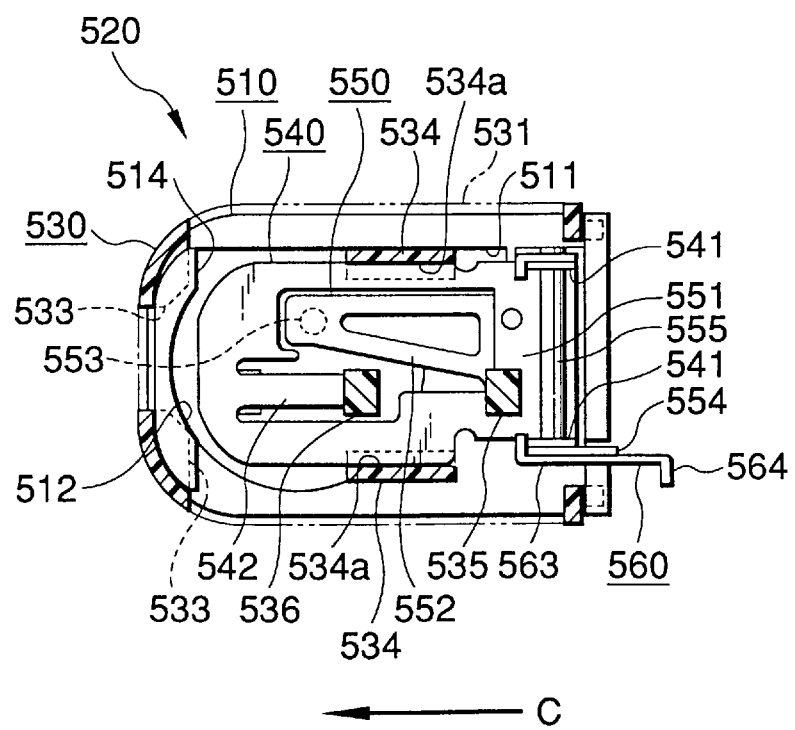
FIG. 59 is an enlarged sectional view showing a state that the lid main body has been slid with respect to the hinge body and the lid portion is locked at the closed position.

Two pieces 534 to be supported that extend in the front-rear direction project from the inner surface of the main portion 531 at positions approximately at the center and close to the top and bottom peripheries, respectively. The length of projection of the pieces 534 to be supported from the main portion 531 is approximately the same as that of the circumferential wall portion 532. The opposed surfaces of the pieces 534 to be supported are formed with respective grooves 534a to be supported that extend in the front-rear direction at positions close to the projection ends as shown in FIGS. 58 and 59. A fall-off-preventive piece 535 projects from the inner surface of the main portion 531 at a position that is closer to the proximal portion side than the pieces 534 to be supported are. A pressure protrusion 536 projects from the inner surface of the main portion 531 at a position that is somewhat closer to the tip portion side than the fall-off-preventive piece 535 is. A surface 536a of the pressure protrusion 536 on the distal portion side is a slant surface in which the length of projection increases toward the tip portion side.

As shown in FIG. 56, the hinge body 540 has a frame-like shape that is a size smaller than the lid main body 530. Two pieces 541 to be supported that project outward at top and bottom positions of the distal portion of the hinge body 540. Two holes 541a to be supported are formed in the respective pieces 541 to be supported. An elastic piece 542 projects from a tip portion of the hinge body 540 toward the distal portion side so as to be somewhat deviated outward.

The top and bottom peripheries of the hinge body 540 are inserted into the grooves 534a to be supported of the lid main body 530 from its proximal portion so as to be slidably engaged with the grooves 534a. As the hinge body 540 is moved toward the tip portion of the lid main body 530, the elastic piece 542 goes over the fall-off-preventive piece 535 of the main body 530 while being bent inward by it. When the elastic piece 542 has just gone over the fall-off-preventive piece 535 to the tip portion side, the bend is canceled and its tip is engaged with the side face of the fall-off-preventive piece 535 on the tip portion side. As a result, as shown in FIGS. 57–59, the lid main body 530 and the hinge body 540 are connected to each other so as to be movable in the front-rear direction with respect to each other but to be prevented from falling off from each other by virtue of the engagement between the fall-off-preventive piece 535 and the elastic piece 542.

As for the minus contact plate 550, as shown in FIG. 56, an elastic piece 552 serving as a minus terminal portion projects toward the tip portion side from the periphery, on the tip portion side, of a distal portion 551 having the same top-bottom width as the distal portion of the hinge body 540. A contact pin 553 projects inward from a tip portion of the elastic piece 552. A connection piece 554 projects outward from the bottom periphery of the distal portion 551. An insertion hole 554a is formed in the connection piece 554.

The distal portion 551 of the minus contact plate 550 is fixed to the inner surface of the distal portion of the hinge body 540 by spot welding. As a result, the elastic piece 552 is placed inside the frame that is formed by the hinge body 540, and the contact pin 553 as the minus terminal is located approximately at the center of the lid portion 520. The connection piece 554 is located under (overlapped with) the bottom piece 541 to be supported of the hinge body 540 so that the insertion hole 554a of the connection piece 554 is aligned with the hole 541a to be supported of the bottom piece 541 to be supported.

As shown in FIG. 56, the supporting point plate 560 has two support pieces 562 and 563 that project forward from the top and bottom peripheries, respectively, of a right end portion of an approximately plate-like main portion 561 extending in the right-left direction. Support holes 562a and 563a are formed in the respective support pieces 562 and 563. A connection piece 564 projects forward from the front periphery of the bottom support piece 563.

The main portion 561 of the supporting point plate 560 is fixed to a right end portion of the front wall of the case main body 510 with a vis. The connection piece 564 is electrically connected, by soldering, to a power circuit of a printed wiring board (not shown) that is fixed to the main chassis 100.

The pieces 541 to be supported of the hinge body 540 and the connection piece 554 of the minus contact plate 550 are overlapped with the support pieces 562 and 563 of the supporting point plate 560. At this time, the connection piece 554 of the minus contact plate 550 is laid on the bottom support piece 563 of the supporting point plate 560. A hinge shaft 555 is inserted into the support hole 562a, the holes 541a to be supported, the insertion hole 554a, and the support hole 563a, whereby the hinge body 540 is rotatably supported by the supporting point plate 560. The minus contact plate 550 is electrically connected to the power circuit of the printed wiring board (not shown) via the supporting point plate 560.

An engagement portion 514 projects outward from the rear periphery of the open end face, that is, the right end face, of the case main body 510. The top-bottom width of the engagement portion 514 is somewhat smaller than the top-bottom interval of the circumferential wall portion 532 of the lid main body 530. Two slits 514a are formed in top and bottom end portions of the engagement portion 514, respectively.

To close the opening 513 as a battery insertion mouth of the case main body 510 by the lid portion 520, first the lid main body 530 is moved toward the tip portion side with respect to the hinge body 540 as shown in FIG. 58 and, in this state, turned with respect to the supporting point plate 560 so as to close the opening 513. As a result, the opening 513 is closed by the lid main body 530 and the engagement portion 514 of the case main body 510 is covered with the portion, on the tip portion side, of the circumferential wall portion 532. If the lid main body 530 is moved toward the distal portion side (indicated by arrow A in FIG. 58) with respect to the hinge body 540, the engagement pieces 533 of the lid main body 530 are engaged with the slits 514a of the case main body 510, respectively. During this course, the elastic piece 542 of the hinge body 540 relatively moves toward the tip portion side on the slant surface 536a of the pressure protrusion 536 of the lid main body 530 and is thereby bent leftward. As a result, the frictional force between the elastic piece 542 and the slant surface 536a increases, whereby the lid portion 520 is locked in the state of closing the opening 513 of the case main body 510 as shown in FIG. 59.

To open the opening 513 of the case main body 510, the lid main body 530 is moved toward the tip portion side (indicated by arrow C in FIG. 59) with respect to the hinge body 540 to cause the engagement pieces 533 of the lid main body 530 to escape from the respective slits 514a of the case main body 510, as well as to cancel the pressurized contact state of the elastic piece 542 of the hinge body 540 and the slant surface 536a of the pressure protrusion 536 of the lid main body 530 as shown in FIG. 58. Since the locking of the lid portion 520 at the closed position is now canceled, the opening 513 can be opened by turning the lid portion 520 about the hinge shaft 555.

A terminal block 570 is slidably provided in a left end portion of the case body 510.

Figure 60:
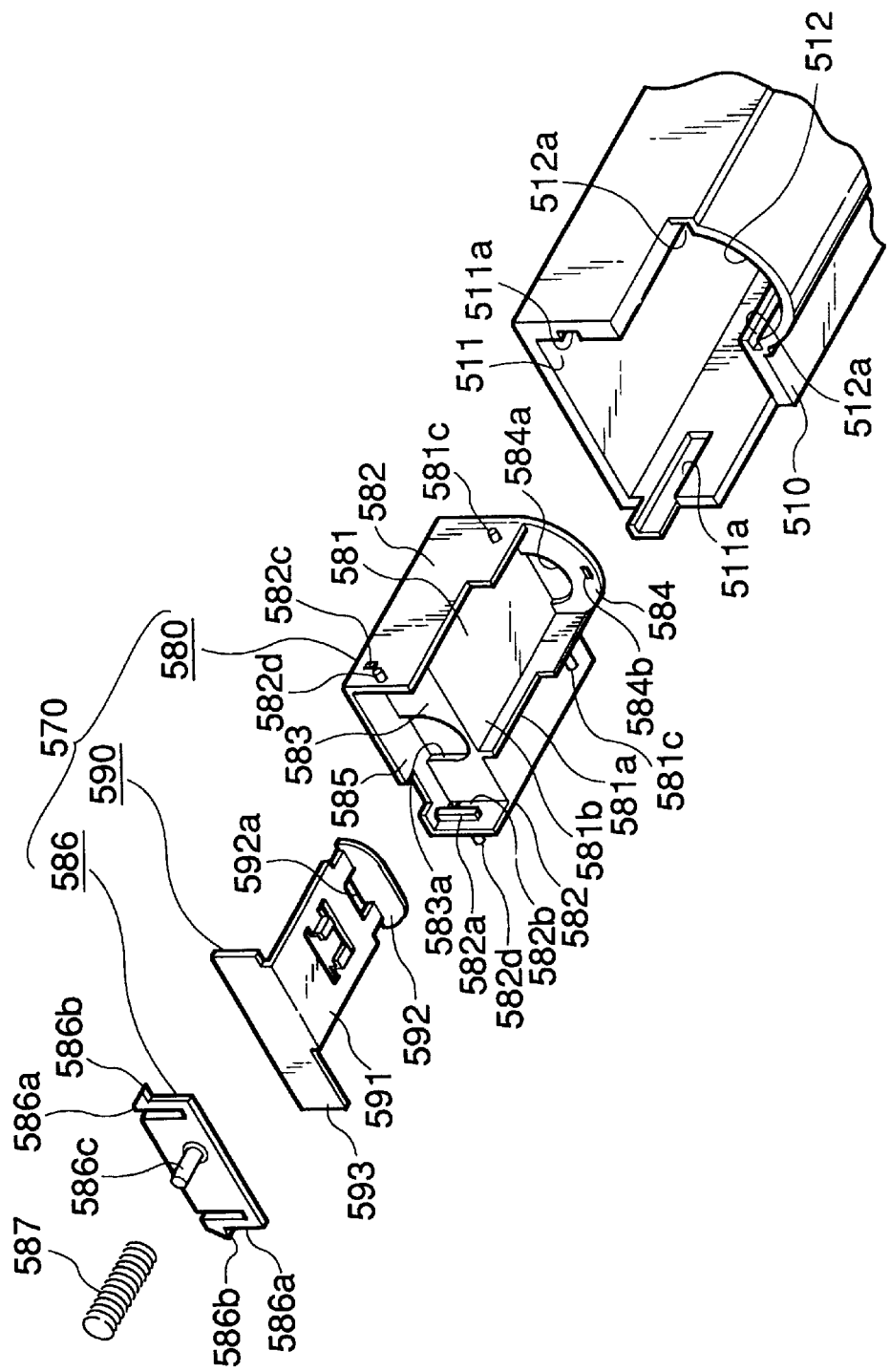
FIG. 60 is an enlarged exploded perspective view showing a terminal block and part of the case main body.

As shown in FIG. 60, the terminal block 570, which serves as a plus terminal portion, has a terminal holder 580 made of an insulating material and a plus terminal plate 590 that is supported by the terminal holder 580.

The terminal holder 580, which is made of an insulating material such as a synthetic resin, is integrally composed of a base portion 581 that is shaped like a planar, rectangular plate, two side plate portions 582 that project upward from the front and rear peripheries of the base portion 581, a left side plate portion 583 that connects a left-side portion of the base portion 581 and left-side portions of the side plate portions 582, and a right side plate portion 584 that projects downward from the right periphery of the base portion 581 excluding a front end portion. Left end portions of the respective side plate portions 582 slightly project leftward from the left periphery of the base portion 581, and a visor portion 585 is integrally formed so as to connect the top peripheries of those left end portions and the top periphery of the left side plate portion 583.

Two protrusion strips 582a extending in the vertical direction project from the opposed surfaces of the left end portions of the respective side plate portions 582, whereby grooves 582b are formed between the left side plate portion 583 and the respective protrusion strips 582a. Two engagement holes 582a are formed in the groove portions of the side plate portions 582 at top positions, respectively. Protrusions 582d project from the outer surfaces of the left end portions of the side plate portions 582 approximately at the centers in the vertical direction, respectively.

A bottom portion of the rear side plate portion 582 somewhat projects downward. A protrusion strip 581a projects from the bottom surface of the base portion 581 so as to extend from the position corresponding to the front end of the right side plate portion 584 to the left end. In this manner, an arrangement recess 581b is formed on the side of the bottom surface of the base portion 581. Respective right end portions of the protrusion strip 581a and the side plate portion 582 project downward with respect to the other portions, and protrusions 581c to be guided project outward from those respective projected portions.

An access hole 584a is formed at the center of a top portion of the right side plate portion 584. A stopper protrusion 584b projects from a bottom portion of the left-side surface of the right side plate portion 584. The access hole 584a has such a size as to allow insertion of the plus electrode of either a thin, rectangular-prism-like secondary battery or a size-AA battery (described later).

An access hole 583a is formed in the left side plate portion 583 at a central position. Like the access hole 584a, the access hole 583a has such a size as to allow insertion of the plus electrode of either a thin, rectangular-prism-like secondary battery or a size-AA battery.

The plus terminal plate 590, which is made of a conductive metal plate, is integrally composed of a planar, approximately rectangular intermediate portion 591, a size-AA terminal portion 592 that projects downward from the right periphery of the intermediate portion 591 and serves as a plus terminal for a size-AA battery (described later), and a thin, rectangular-prism-like secondary battery terminal portion 593 that projects upward from the left periphery of the intermediate portion 591 and serves as a plus terminal for a thin, rectangular-prism-like secondary battery (described later).

The intermediate portion 591 has such a size as to just fit the arrangement recess 581b of the terminal holder 580. The size-AA terminal portion 592 has such a size as not to stick out of the right side plate portion 584 of the terminal holder 580, and a protrusion 592a slightly projects upward with respect to the top surface of the intermediate portion 591 from a central portion of the top periphery of the size-AA terminal portion 592. The thin, rectangular-prism-like secondary battery terminal portion 593 is a size smaller than the left side plate portion 583 of the terminal holder 580.

The plus terminal plate 590 is disposed so that its size-AA terminal portion 592 is brought into close contact with the left-side surface of the right side plate portion 584 of the terminal holder 580. The protrusion 592a of the size-AA terminal portion 592 contacts the front end of the base portion 581 of the terminal holder 580. The bottom periphery of the size-AA terminal portion 592 engages the stopper protrusion 584b that is formed on the left-side surface of the right side plate portion 584 of the terminal holder 580. In this manner, the plus terminal plate 590 is prevented from moving leftward and downward. Part of the size-AA terminal portion 592 is accessible from the right side through the access hole 584a formed in the right side plate portion 584.

The terminal portion 593 is brought into close contact with the left-side surface of the left side plate portion 583 of the terminal holder 580, and part of the terminal portion 593 is accessible from the right side through the access hole that is formed in the left side plate portion 583.

A flexible printed wiring board, which is connected to the power circuit of the printed wiring board (not shown), is connected to the plus terminal plate 590.

A press plate 586 is attached to the left end portion of the terminal holder 580 on which the plus terminal plate 590 has been mounted in the above-described manner. The press plate 586 is made of an insulating material such as a synthetic resin, and is shaped like a plate that is a size smaller than the left side plate portion 583. Two engagement pieces 586a project upward from bottom portions of the front and rear peripheries of the press plate 586, respectively. Two engagement nails 586b project forward and backward from top portions of the respective engagement pieces 586a. A positioning protrusion 586c projects from the left side surface of the press plate 586 approximately at the center.

The press plate 586 is inserted from below into the grooves 582b that are formed in the left end portion of the terminal holder 580, so as to be located on the left of the terminal portion 593 of the plus terminal plate 590. When the press plate 586 has been inserted in the grooves 582b to the predetermined position, the engagement nails 586b of the press plate 586 engage the respective engagement holes 582c of the terminal holder 580, whereby the press plate 586 is prevented from falling off the terminal holder 580. The left side surface of the terminal portion 593 of the plus terminal plate 590 is pressed by the press plate 586, whereby the plus terminal plate 590 is also prevented from moving leftward with respect to the terminal holder 580. The terminal block 570 is thus completed.

The front and rear inner surfaces of the rectangular-pipe-like first accommodation space 511 of the case main body 510 are formed with respective guide grooves 511a that extend rightward from the left ends over a relatively short length. The front inner surface of the semi-cylindrical second accommodation space 512 is formed with two guide grooves 512a that extend rightward from the left end over a relatively short length at positions close to the rectangular-pipe-like first accommodation space 511.

The protrusions 582d to be guided of the terminal block 570 are slidably engaged with the respective guide grooves 511a of the case main body 510. The protrusions 581c to be guided are slidably engaged with the respective guide grooves 512a of the case main body 510. In this manner, the terminal block 570 is supported by the case main body 510 so as to be slidable in the right-left direction in the range corresponding to the length of the guide grooves 511a and 512a. A compression coiled spring 587 that is fitted to from outside and supported by the positioning protrusion 586c is provided, in a compressed state, between the inner surface of a rear end portion of the left side plate portion 130 of the main chassis 100 and the left-side surface of the press plate 586 of the terminal block 570. In this manner, the terminal block 570 is urged by rightward moving force.

What is called a thin, rectangular-prism-like secondary battery 601 or a size-AA dry cell or secondary battery 602 can selectively be mounted in the battery case 500.

Figure 61:
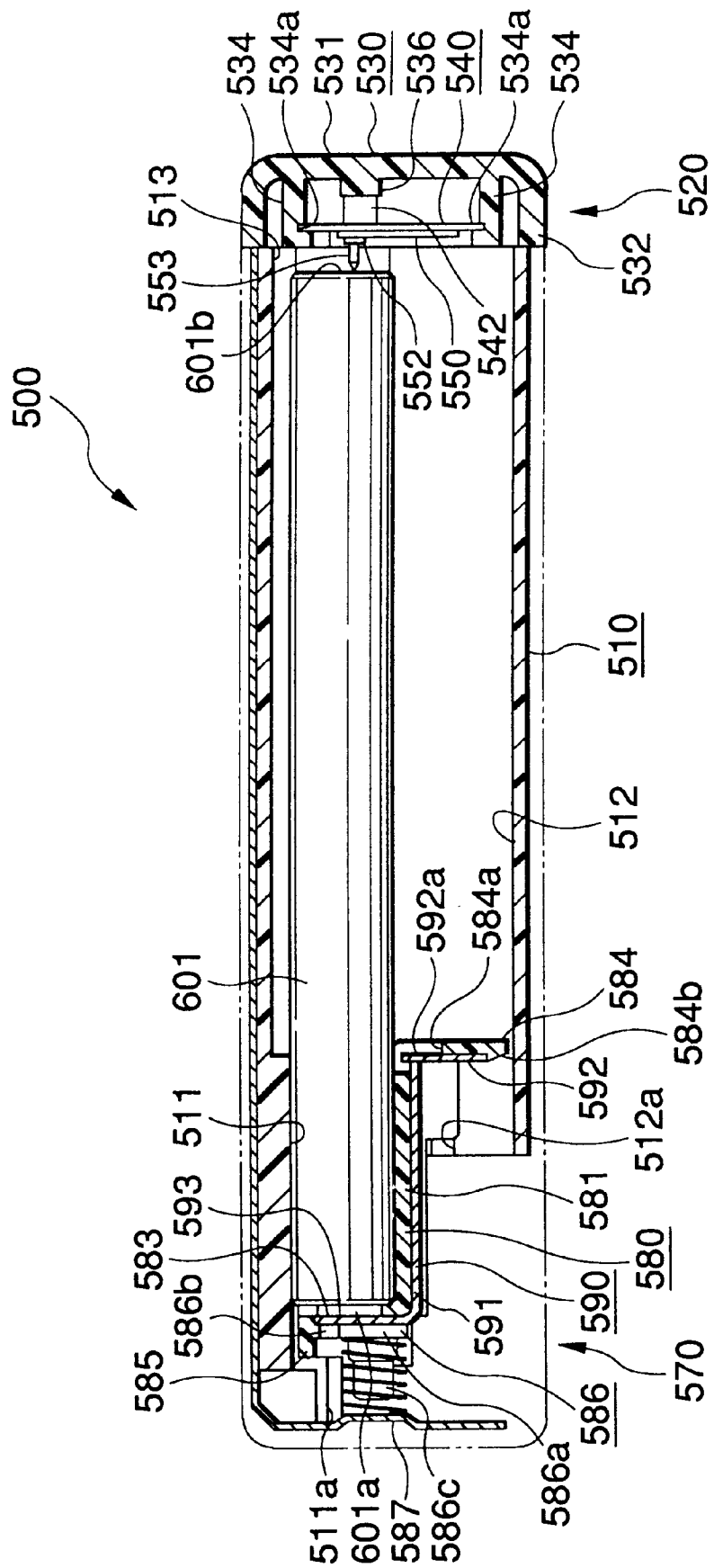
FIG. 61 is a vertical sectional view showing a state that a thin, rectangular-prism-like secondary battery is accommodated.

As shown in FIG. 61, the thin, rectangular-prism-like secondary battery 601 is mounted in the rectangular-pipe-like space 511 with such an orientation that a plus electrode 601a is located on the left side. When the thin, rectangular-prism-like secondary battery 601 is inserted in the rectangular-pipe-like space 511 and the lid portion 520 is closed, the contact pin 553 of the minus terminal plate 550 that is provided in the lid portion 520 is brought into resilient contact with a minus electrode 601b of the battery 601. The plus electrode 601a of the battery 601 contacts the terminal portion 593 of the terminal block 570 through the access hole 583a and presses it rightward. Therefore, the terminal block 570 moves leftward while compressing the compression spring 587. In this manner, the battery 601 is resiliently held from both sides of the plus electrode 601a and the minus electrode 601b, and is thereby connected reliably to the power circuit of the printed wiring board (not shown).

Figure 62:
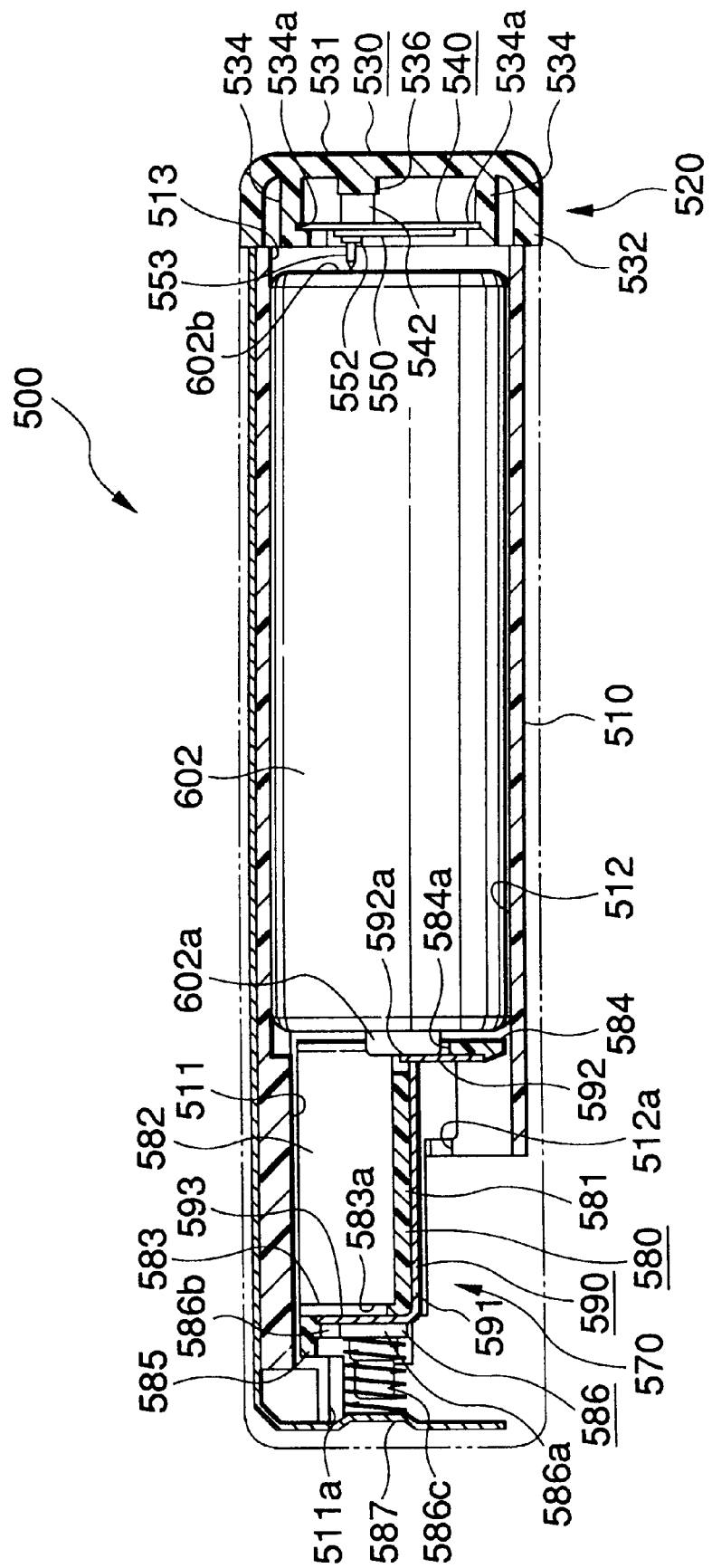
FIG. 62 is a vertical sectional view showing a state that a size-AA battery is accommodated.

As shown in FIG. 62, a size-AA battery 602 is mounted in the space consisting of the semi-cylindrical second accommodation space 512 and the rectangular-pipe-like first accommodation space 511 with such an orientation that a plus electrode 602a is located on the left side. When the size-AA battery 602 is inserted in the first and second accommodation spaces 511 and 512 and the lid portion 520 is closed, the contact pin 553 of the minus terminal plate 550 that is provided in the lid portion 520 is brought into resilient contact with a minus electrode 602b of the size-AA battery 602. The plus electrode 602a of the size-AA battery 602 contacts the size-AA terminal portion 592 of the terminal block 570 through the access hole 584a and presses it rightward. Therefore, the terminal block 570 moves leftward while compressing the compression spring 587. In this manner, the size-AA battery 602 is resiliently held from both sides of the plus electrode 602a and the minus electrode 602b, and is thereby connected reliably to the power circuit of the printed wiring board (not shown).

As described above, the battery case 500 allows selective use of the thin, rectangular-prism-like secondary battery 601 and the size-AA battery 602. Since the terminal block 570 is movable in the right-left direction, that is, in the longitudinal direction of the battery 601 or 602, it can absorb a size variation of the batteries 601 and 602. Since the terminal portions 593 and 592 resiliently contact the plus electrodes 601a and 602a of the batteries 601 and 602, respectively, and the contact pin 553 resiliently contacts the minus electrodes 601b and 602b of the batteries 601 and 602, respectively, even if the battery 601 or 602 is moved instantaneously by an external shock, the terminal portion 593 or 592 and the contact pin 553 instantaneously follow the terminal 601a or 602a and the terminal 601b or 602b of the battery 601 or 602. Therefore, an instantaneous power shutdown can be prevented.

As described above, the access holes 583a and 584a are formed in the left and right side plate portions 583 and 584 of the terminal holder 580, respectively, and have such sizes as to allow insertion of the plus electrodes 601a and 602a of the thin, rectangular-prism-like secondary battery 601 and the size-AA battery 602, respectively. This is intended to prevent such an event that when the battery 601 or the size-AA battery 602 is erroneously inserted in such a manner that the minus electrode 601b or 602b is opposed to the access hole 583a or 584a, the minus electrode 601b or 602b contacts the terminal portion 593 or the size-AA contact portion 594 of the plus terminal plate 590. Therefore, no short-circuiting occurs even if the thin, rectangular-prism-like secondary battery 601 or the size-AA battery 602 is erroneously inserted in this manner. Therefore, in this case, the left side plate portion 583 or the right side plate portion 584 of the terminal holder 580 functions as an insulating portion.

Although the above-described embodiment of the invention is directed to the case of the disc playback apparatus for playing back an optical disc as a recording medium, the invention can also be applied to a disk recording/playback apparatus for performing recording or playback on an optical disc as a recording medium and a tape recording and/or playback apparatus using a tape cassette that accommodates a magnetic tape as a recording medium. It goes without saying that various modifications are possible without departing from the spirit and scope of the invention.

What is claimed is:

1. A recording and/or playback apparatus of a recording medium, comprising:

an apparatus main body having a recording and/or playback section for performing recording and/or playback on a recording medium, the apparatus main body further having an opening portion through which the recording medium is to be inserted into and ejected from the apparatus main body;

a loading mechanism for mounting the recording medium that has been inserted through the opening portion on the recording and/or playback section, and for ejecting the recording medium mounted on the recording and/or playback section through the opening portion;

a lid body for opening or closing the opening portion, the lid body movably provided on the apparatus main body; and a lock mechanism for locking the lid body at a closing position for closing the opening portion, wherein when the recording medium is ejected through the opening portion, the lid body is moved in a direction of opening the opening portion by the recording medium being ejection-operated by the loading mechanism, and then moved further in the direction of opening the opening portion by the lock mechanism.

2. The recording and/or playback apparatus according to claim 1, wherein the lid body has a first portion to be operated that is to be operated by the recording medium being ejection-operated by the loading mechanism, and a second portion to be operated that is to be operated by the lock mechanism.

3. The recording and/or playback apparatus according to claim 2, wherein the lock mechanism has a lock portion for locking the lid body at the closing position and an operating portion for press-operating the second portion to be operated, and wherein the lid body further has a portion to be engaged that is to be engaged with the lock portion.

4. The recording and/or playback apparatus according to claim 3, wherein the lock mechanism has a slider that has the lock portion and the operating portion and moves between a position where the lock portion and the portion to be engaged are engaged with each other and a position where the lock portion and the portion to be engaged are disengaged from each other, and an urging mechanism for urging the slider in such a direction that the lock portion is engaged with the portion to be engaged.

5. The recording and/or playback apparatus according to claim 4, wherein when the recording medium is ejected from the apparatus main body, the slider of the lock mechanism is movement-operated in such a direction that the lock portion and the portion to be engaged are disengaged from each other, and the operating portion of the slider press-operates the second portion to be operated.

6. The recording and/or playback apparatus according to claim 3, wherein when the recording medium has been inserted through the opening portion and the lid body is moved in a direction of closing the opening, the operating portion is pressed by the second portion to be operated and the lock portion and the portion to be engaged are engaged with each other, whereby the lock mechanism locks the lid body at the closing position.

7. The recording and/or playback apparatus according to claim 1, wherein the lock mechanism locks the lid body at the closing position in a state that the recording medium has been mounted on the recording and/or playback section by the loading mechanism.

8. A recording and/or playback apparatus using a disc cartridge that accommodates a disc-shaped recording medium, the apparatus comprising:

an apparatus main body having a recording and/or playback section for performing recording and/or playback on a disc that is accommodated in the disc cartridge, the apparatus main body further having an opening portion through which the disc cartridge is to be inserted into and ejected from the apparatus main body;

a loading mechanism for mounting the disc accommodated in the disc cartridge that has been inserted through the opening portion on the recording and/or playback section, and for ejecting, through the opening portion, the disc that is mounted on the recording and/or playback section and accommodated in the disc cartridge;

a lid body for opening or closing the opening portion, the lid body rotatably provided on the apparatus main body; and a lock mechanism for locking the lid body at a closing position for closing the opening portion, the lock mechanism locking the lid body at the closing position in a state that the disc accommodated in the disc cartridge has been mounted on the recording and/or playback section by the loading mechanism, wherein when the disc cartridge is ejected through the opening portion, the lid body is turned in a direction of opening the opening portion by the recording medium being ejection-operated by the loading mechanism, and then turned further in the direction of opening the opening portion by the lock mechanism.

9. The recording and/or playback apparatus according to claim 8, wherein the lock mechanism has a lock portion for locking the lid body at the closing position and a press-operating portion for turning the lid body in the direction of opening the opening portion, and wherein the lid body has a portion to be engaged that is to be engaged with the lock portion.

10. The recording and/or playback apparatus according to claim 9, wherein the apparatus further comprises an operating portion for performing an operation of ejecting the disc cartridge from the apparatus main body by operating the loading mechanism and the lock mechanism.

11. The recording and/or playback apparatus according to claim 10, wherein the lock mechanism has a slider that has the lock portion and the press-operating portion and moves between a position where the lock portion and the portion to be engaged are engaged with each other and a position where the lock portion and the portion to be engaged are disengaged from each other, and an urging mechanism for urging the slider in such a direction that the lock portion is engaged with the portion to be engaged.

12. The recording and/or playback apparatus according to claim 11, wherein when the disc cartridge is ejected from the apparatus main body, the slider of the lock mechanism is movement-operated in such a direction that the lock portion and the portion to be engaged are disengaged from each other, and the press-operating portion of the slider turns the lid body in the direction of opening the opening portion.

13. The recording and/or playback apparatus according to claim 11, wherein the apparatus main body has a restricting portion for restricting movement of the slider, and wherein the slider butts against the restricting portion and is thereby prevented from moving in such a direction that the lock portion and the portion to be engaged are engaged with each other when the loading mechanism mounts the disc that is accommodated in the disc cartridge on the recording and/or playback section.

14. The recording and/or playback apparatus according to claim 13, wherein when the disc cartridge has been inserted through the opening portion and the lid body is turned in a direction of closing the opening, the press-operating portion is pressed by the lid body and the lock portion and the portion to be engaged are engaged with each other, whereby the lock mechanism locks the lid body at the closing position.

* * * * *